(12) United States Patent
Messinger

(10) Patent No.: US 10,522,959 B2
(45) Date of Patent: Dec. 31, 2019

(54) SYSTEM AND METHOD FOR METERED PUBLIC ELECTRICAL WALL CHARGER

(71) Applicant: Samuel Messinger, Ramot Beit Shemesh Gimmel (IL)

(72) Inventor: Samuel Messinger, Ramot Beit Shemesh Gimmel (IL)

( * ) Notice: Subject to any disclaimer, the term of this patent is extended or adjusted under 35 U.S.C. 154(b) by 0 days.

(21) Appl. No.: 16/429,106

(22) Filed: Jun. 3, 2019

(65) Prior Publication Data
US 2019/0288469 A1 Sep. 19, 2019

Related U.S. Application Data

(63) Continuation-in-part of application No. 15/706,799, filed on Sep. 18, 2017, now Pat. No. 10,355,424.

(51) Int. Cl.
*H01R 31/06* (2006.01)
*H02J 7/00* (2006.01)
(Continued)

(52) U.S. Cl.
CPC ........... *H01R 31/065* (2013.01); *G06Q 20/08* (2013.01); *G06Q 20/32* (2013.01); *G06Q 30/04* (2013.01); *G06Q 50/06* (2013.01); *H01R 24/28* (2013.01); *H02J 7/007* (2013.01); *H02J 7/0044* (2013.01); *H02J 7/02* (2013.01); *H02J 2007/0062* (2013.01)

(58) Field of Classification Search
CPC .... H01R 31/06; H01R 25/00; H01R 13/6675; H02J 7/0045
See application file for complete search history.

(56) References Cited

U.S. PATENT DOCUMENTS

| | | | | |
|---|---|---|---|---|
| 5,075,615 A | * | 12/1991 | Dantis | H01R 31/02 320/111 |
| 6,938,867 B2 | * | 9/2005 | Dirks | H01R 13/72 248/309.1 |

(Continued)

OTHER PUBLICATIONS

Office Action dated Jul. 27, 2018 in connection with U.S. Appl. No. 15/706,799.

(Continued)

*Primary Examiner* — Tulsidas C Patel
*Assistant Examiner* — Marcus E Harcum
(74) *Attorney, Agent, or Firm* — Carrie M. Stroup

(57) ABSTRACT

The invention is directed to an electrical device charger comprising at least one stopper that is configured to hold one electrically powered device in position on the charger while the charger is coupled to a power source, and housing a wireless payment processing system. The stopper may be a channel, groove and or protrusion. The charger may be formed of two separate parts that can be connected via snap, clamp and/or press fit mechanism. The electrical device charger may include a mechanism to compensate for non-horizontal electrical outlets and/or a horizontal level keychain charger. The payment processing system comprises: an electric power sensor for determining a quantity of power used; the rate charging processor, which calculates a power rate to charge the user based on the quantity of power used and vendor fees; and a transaction mechanism, which facilitates a wireless card payment online or via a card swipe reader.

20 Claims, 63 Drawing Sheets

(51) Int. Cl.
*G06Q 50/06* (2012.01)
*G06Q 30/04* (2012.01)
*G06Q 20/32* (2012.01)
*H01R 24/28* (2011.01)
*H02J 7/02* (2016.01)
*G06Q 20/08* (2012.01)

(56) References Cited

U.S. PATENT DOCUMENTS

| | | | |
|---|---|---|---|
| 2010/0291786 A1 | 11/2010 | Hopwood et al. | |
| 2011/0187323 A1* | 8/2011 | Gourley | H02J 5/00 |
| | | | 320/111 |
| 2011/0227535 A1* | 9/2011 | Caskey | H01R 13/6675 |
| | | | 320/111 |

OTHER PUBLICATIONS

Office Action dated Dec. 14, 2018 in connection with U.S. Appl. No. 15/706,799.
Office Action dated Mar. 29, 2018 in connection with U.S. Appl. No. 15/706,801.
TP-LINK User's Guide; TL-PA 210; AV200 Nano Powerline Adapter.
Office Action dated Dec. 14, 2018 in connection with U.S. Appl. No. 15/706,801.

\* cited by examiner

SYSTEM AND METHOD FOR METERED PUBLIC ELECTRICAL WALL CHARGER

CROSS REFERENCE TO RELATED APPLICATIONS

The application is a continuation-in-part of U.S. patent application Ser. No. 15/706,799, now allowed; and of which the entire contents are incorporated herein by reference in its entirety.

FIELD OF THE INVENTION

The present invention generally relates to the field of electrical device charger. The various embodiments of the present invention particularly relate to an electrical device charger having at least one stopper configured to hold electrical devices on the charger; and with electrical power metering system.

BACKGROUND OF THE INVENTOR

The Inventor and his Family have a long and meritorious history of invention starting at the United States Patent Office in 1904 and spanning over a century of distinguished accomplishment and manufacturing summarized in STATIONARY BEARNG RACE WITH UNIFORM DISTRIBUTION OF WEAR U.S. Pat. No. 9,631,673 B2 issued Apr. 25, 2017 to the Inventor, Samuel Messinger.

BACKGROUND OF THE INVENTION

There was a time when every mobile device, for example, mobile phone, iPad, and tablet, seemed to come with its own unique charger. These mobile devices were powered by batteries. Mobile devices are more commonly used now at every level of socio-economic society. Because of the frequent even constant use of these mobile devices, their batteries need to be re-charged frequently. Mobile device chargers are usually provided by the manufacturers along with the device. Previously one has had to remember to bring the right charging cable if you wanted to continue using your device while away from home. However, the Micro USB has combatted the industry's use of custom ports and now charging your phone on-the-go is no longer a problem with the standardized connector.

A conventional charger for a cell phone comprises a charger body, a plug and an electric cord. However, when the charger is carried outdoors, the plug is not positioned and stored easily. In addition, the electric cord is easily tangled, thereby causing inconvenience to the user when using the charger. A conventional charger reel (or box) can be used to wind and store the electric cord. However, the conventional charger reel has a larger volume, thereby causing inconvenience in packaging, storage and transportation of the charger reel, so that the user cannot carry the charger reel easily and conveniently.

A number of different type of the electrical charger for mobile devices are available in the prior art. Different types of electrical chargers are already available in the market, some of them are depicted in FIGS. 4 to 7 show casing 220 V electrical plugs some of them have fixed cable or wire attached with the electrical plugs and some of them may have a cable or wire. Prior art document, US20150018049 discloses a USB cable used to hold a cell phone/electronic device in a standing position while it is used to synchronize, and charge said cell phone/electronic device. It has two unique features. On the front end there is a removably attachable sleeve that allows for the USB cord to flex and stay in a bent position. This allows the user of the cord to create a stand for his or her electronic device for ease of use on a table or flat surface. On the back end of the cord is a removable attachable docking station for a cell phone or electronic device so when the device is being charged it can sit next to the wall outlet. This patent is only used flex and stay to hold cell phone.

Another prior art document, US20150188591 discloses a cell phone charger holder that can completely receive and store the plug and the electric cord of a charger. The cell phone charger holder includes a main body, a plug, and an electric cord. The plug has two pins referred to as male which fit into matching slots or holes called male. The main body has a front face provided with a receiving chamber for receiving the plug. The main body has a side provided with an annular groove for winding the electric cord. The main body has a lower portion provided with two positioning hooks for placing a cell phone. This reference discusses only for cell phone charger holder.

Yet another prior art document, apple's recently issued U.S. Pat. No. 9,614,378 discloses an inductive charging interface with magnetic retention can be used for charging electronic devices and accessories. For example, a magnetic core of an inductive charging configuration may be divided into two magnetic elements, one element can be housed within a receptacle or receiving connector of housing of an electric device and the other element can be housed within a plug or transmission connector. The poles of the two elements of the magnetic core may create a magnetic field to retain the plug connector in an aligned, mated position with the receptacle connector of the electronic device.

Yet another prior art document, US20160211609 discloses a charger adaptor for a mobile device that has a connection socket, the charger adaptor includes: an insertion plug formed with a plurality of contact electrodes, the insertion plug having a shape complementary to an interior shape of the connection socket; a plug body extending away from the insertion plug and extending outside the connection socket, the plug body having exteriorly facing electrical contacts that are in respective electrical continuity with the contact electrodes. The reference discusses use of magnet in the charger adaptor to hold mobile devices.

Yet another prior art document, US20140117922 discusses a portable power tool adapter device used to power and charge an electronic device. The power tool adapter device may include adapter housing with mechanical fittings configured to mate with various power tool battery types, a charger board circuit for controlling various functions of the adapter device, a DC-to-DC step down converter and regulator for converting the high voltage from the power tool to a low voltage. The reference discusses portable DC power tool battery charger.

Yet another prior art document, US20150072555 discloses a docking station for an elongate rectangular mobile device.

Yet another prior art document, US20140139183 discloses a mobile device charger comprising a stand member which can support the mobile device in either a standing horizontally or vertical position for easy viewing of the device screen. The reference discusses mobile device charger having extra support stand.

Yet another prior art document, US20130187606 discloses a charger for a cell phone or tablet personal computer with function of winding a wire. The charger includes a main unit, a power plug that is put in a groove of the main unit, a transmission wire that is wound in a double C-slot at a side of the main unit, and a charging connector that is fixed in a positioning dip or a containing groove of the main unit.

In the other case, there is the problem of the cost of energy that is offered free to users, not to mention the cost of maintaining the electrical outlets.

A number of different types of the electrical chargers for mobile devices are available in the prior art. Further, there are number of devices also available for electrical power metering devices and method thereof. Such a solution is described for example in international patent application PCT/EP20121053032. The system described in PCT/EP2012/053032 enables the billing of electric energy used when charging an electric vehicle. This system allows the identification of the vehicle recharging and billing of the charging operation. The described solution is complex and relies on standardized communication between the charging station and the vehicle, for example via a CAN bus (Controller Area Network, ISO 11898) on board the vehicle.

Another solution is presented in US patent application US2010332308. Such a solution enables billing of for use of a recharging operation, where payment can be made directly by the owner of the smartphone, for example by credit card on a payment terminal located next to the charging station. This system has the drawback of relying on adding a payment terminal, which greatly increases the cost of such an installation, not to mention the maintenance costs of such payment terminals.

Yet another prior art document, US20100306033 discloses a method and system for facilitating the purchase of electricity between a static provider (e.g., an Outlet Owner (OO)) and dynamic/mobile customer (e.g., a Plug Holder (PH)).

Another prior art document, US20150188591 discloses a cell phone charger holder that can completely receive and store the plug and the electric cord of a charger. The cell phone charger holder includes a main body, a plug, and an electric cord. The plug has two pins referred to as male which fit into matching slots or holes called male. The main body has a front face provided with a receiving chamber for receiving the plug. The main body has a side provided with an annular groove for winding the electric cord. The main body has a lower portion provided with two positioning hooks for placing a cell phone. This reference discusses only for cell phone charger holder.

Yet another prior art document, Apple's recently issued U.S. Pat. No. 9,614,378 discloses a inductive charging interface with magnetic retention can be used for charging electronic devices and accessories. For example, a magnetic co re of an inductive charging configuration may be divided into two magnetic elements, one element can be housed within a receptacle or receiving connector of housing of an electric device and the other element can be housed within a plug or transmission connector. The poles of the two elements of the magnetic core may create a magnetic field to retain the plug connector in an aligned, mated position with the receptacle connector of the electronic device.

Yet another prior art document, US20160211609 discloses a charger adaptor for a mobile device that has a connection outlet, the charger adaptor includes: an insertion plug formed with a plurality of contact electrodes, the insertion plug having a shape complementary to an interior shape of the connection outlet; a plug body extending away from the insertion plug and extending outside the connection outlet, the plug body having exteriorly facing electrical contacts that are in respective electrical continuity with the contact electrodes. The reference discusses use of magnet in the charger adaptor to hold mobile devices.

Yet another prior art document U.S. Pat. No. 9,421,880 discloses an add-on communication device attached to a cable installment type charging control device attached to a cable assembly for charging an electric vehicle.

Yet another prior art document, WO2015124854 discloses a device allowing the electrical powering of an electrical appliance, having a remote control module allowing the activation of the electrical supply of the electrical appliance and allowing the reception of messages, the device comprising means for detecting the connection of the electrical appliance, the detection of the connection triggering a phase of electrical powering of the electrical appliance for a first duration, and, on receipt of a message during the first duration, maintaining the electrical supply of the electrical appliance beyond the first duration.

Yet another prior art document, US20150317755 discloses an electric power information management apparatus includes a power meter that measures electric power data on electric power to be supplied from a storage battery of a vehicle to an electric power facility; a security module that associates and encrypts identification information corresponding to the vehicle and the measured electric power data; a communication device that transmits to an electric power management database the identification information corresponding to the vehicle and the electric power data encrypted by the security module to store the electric power data associated with the identification information in the electric power management database; and an electric power control device that extracts necessary electric power from the electric power facility and supplies the electric power to the storage battery of the vehicle.

Yet another prior art document, US20160031339 discloses a location-based charging/discharging power mediation system of an electric vehicle, and more particularly to a module, an electric vehicle, and an intermediate server for location-based charging/discharging power mediation.

Yet another non-patent literature (NPL) prior art document discloses a product available in market, which is plug-in energy monitor power meter electricity electric usage monitoring socket Yet another non-patent literature (NPL) prior art document discusses another product available in the market, which is a power consumption meter energy monitor KWH calculator usage plug in electricity Yet another non-patent literature (NPL) prior art document discloses another product available in the market for monitoring energy consumption by wireless device. Using this device one can monitor energy usage of any device plugged into the HS 110 right from your phone. One can also turn electronics on or off from anywhere with your tablet or smartphone using the free Kasa app (Compatible w/ Android 4.1 or higher & iOS8 or higher). Use Away-Mode to turn devices on and off at different times to give the appearance that someone is home while you are away However, above mentioned references have one or more of the following shortcomings: (i) they apply only to electrical power metering device for electrical vehicles; (ii) they require long cables; (iii) proprietary charging cables are required; (iv) they require a physically separate docking station; (v) they are not easy to carry during travel; and (vii) they are not able to easily pay with debit/credit card automatedly in areas that require payment for charging devices.

Hence, there is prolong and a dire need for a metered electrical charging apparatus to provide a solution for all the problems mentioned in the background, to include providing the charger device the ability to automatedly compute how much electricity a user's device consumed while charging, then billing and receiving payment for the electricity usage (e.g. online via a mobile application, website, or via a card swipe reader on the charge device). The billing should also comprise any additional fees the vendor adds (e.g. state and local taxes, convenience fee, currency conversion fees, etc.).

SUMMARY OF THE INVENTION

In the view of the foregoing disadvantages inherent in the known types of electrical chargers now present in the prior art, the present invention provides an improved electrical charger. As such, the general purpose of the present invention, which will be described subsequently in greater detail, is to provide a new, improved, simple and easy to use electrical device chargers with means of holding electrical devices which has all the advantages of the prior art and none of the disadvantages.

Payment Processing System:

All electrical charger devices of the present invention comprise a payment processing system housed within the charger, to immediately bill and receive payment for the amount of electricity the user's device consumed, as well as any additional vendor fees. The payment processing system comprises: an electric power sensor for determining a quantity of power used; the rate charging processor, which calculates a power rate to charge the user using the quantity of power used and any additional fees (e.g. taxes, vendor's convenience-service fee, etc.); and a transaction mechanism, which facilitates a wireless card payment online (e.g. via a vendor's mobile application, or going to a vendor's website) or via a card swipe reader.

In an aspect, the charging device further consists of an electric power sensor for sensing a quantity of power used during the charging of an electric appliance. The electric power will also calculate the total units of power consumed using a rate charging processor by the electric appliance while connecting to the charging device.

In an aspect, the charging device further consists of a transaction mechanism to facilitate a payment transaction by receiving a payment card and utilizing the network connectivity provided by the network elements to connect to a payment server. In an embodiment, the transaction mechanism comprises a card swipe reader positioned on the outside surface of the charger's housing, and configured for a user to slide their debit/credit card through, which receives and transmits the card billing information to the payment server using the electrical circuit and WiFi transmitter within the charger's housing. The card swipe reader, in an embodiment, is built-into the housing (e.g. FIGS. 2, 17, 21). In another embodiment, a third-party card swipe reader is attached to the outer charger housing via a USB or audio port or slot (e.g. Square®).

In another embodiment, the transaction mechanism comprises the user via their mobile electronic computing device (e.g. smartphone, laptop, tablet, etc.) opening a vendor's mobile application of the present invention, or visiting a vendor's website, to manually enter their debit/credit card billing information.

In an aspect, the charging device further consists of at least one processing unit to utilize the available network elements to process the payment by analyzing the payment mode and by connecting to the payment server.

In an aspect, the charging device also consists of a cradle or a stopper stop to hold the portable device. The cradle is housed on the outer periphery on the charging device. The cradle is able to hold portable device of multiple dimensions or sizes.

In an aspect, the charging device utilizes the network elements such as Wi-Fi, RIFD chip and/or cellular chip. The network elements will enable to charging device to communicate with the payment server and the user device wirelessly.

In an aspect, the charging device comprises: a computer processor(s), a memory, network elements; an AC/DC converter (optional), and non-transitory computer readable storage media. The computer readable instructions are able at a minimum to calculate the units of power consumed by the user device and facilitating the payment are stored in the memory.

In an aspect, the computer implemented instructions can be implemented by an application or software running on the user device or the nearby kiosk.

In an aspect, the computer implemented instructions running on the user device as application or software will provide access to the user to display the charging done, how much time left for complete charging and payment due on the screen of the user device.

In an aspect, the charging device has connector slot such as USB slot and audio slot on the outer periphery of the charging device to connect to user's electrical devices to charge and also to connect to external payment devices to facilitate the payment.

In an aspect, the charging device can be utilized and or established in an establishment like restaurants, coffee shops, railway stations, bus stations and other public places.

In an aspect, the cost of the charging will be borne by the user who will be using the charging device at a public establishment that is owned by a vendor (e.g. café owner), and the vendor is charging a fee for the service-convenience of using their wall outlet and electricity, in addition to the actual cost of the electricity paid by the vendor to the supplier (e.g. local utility company).

An object of the invention is to provide an electrical device charger with means of holding a plurality of electrical devices which comprises: a main unit/housing with at least one stopper; a cable cord for connecting main unit with said electrical devices; and pin for fitting said main unit with an electric power source.

It is another object of the present invention to provide the electrical device charger with means of holding a plurality of electrical devices, wherein said main unit has a top side provided with at least one holding stopper.

Yet another object of the present invention to provide the electrical device charger with means of holding a plurality of electrical devices, wherein said main unit has a side provided with one or more than one space for connecting the cable cord to said electrical devices.

Yet another object of the present invention to provide the electrical device charger with means of holding a plurality of electrical devices, wherein said main unit has a rear side provided at least two pins for fitting said main unit into the electric power source.

Yet another object of the present invention to provide the electrical device charger with means of holding a plurality of electrical devices, wherein said main unit acts as a single unit of 220 V electrical plug or 110 V electrical plug.

Yet another object of the present invention to provide the electrical device charger with means of holding a plurality of electrical devices, wherein said main unit comprise two parts including 220 V adapters and/or 110 V adapters, wherein both parts are connected.

Yet another object of the present invention to provide the electrical device charger with means of holding a plurality of electrical devices, wherein said holding stopper may be in the shape of a protrusion or channel.

Yet another object of the present invention to provide the electrical device charger with means of holding a plurality of electrical devices, wherein said stopper may be in vertical position or in an angled position.

Yet another object of the present invention to provide the electrical device charger with means of holding a plurality of electrical devices, wherein said holding stopper comprises an adjustable device holding stopper assembly mechanism with an adjustable dial.

Yet another object of the present invention to provide the electrical device charger with means of holding a plurality of electrical devices, wherein said electric power source may include, but not limited to, AC or directional electric power, and the connection to the electric power source may be a direct connection, via a DC adapter, or via a USB connection.

Yet another object of the present invention to provide an adjustable electrical device charger with means of holding a plurality of electrical devices, wherein said main unit of the device may be held securely to compensate for electrical plugs which are non-horizontal.

Yet another object of the present invention to provide the electrical device charger with means of holding a plurality of electrical devices, wherein said main unit of the device comprises two separate parts which can be connected by Snap-On mechanism.

Yet another object of the present invention to provide the electrical device charger with means of holding a plurality of electrical devices, wherein said main unit of the device further comprises a retractable plug.

Yet another object of the present invention to provide the electrical device charger with means of holding a plurality of electrical devices, wherein said electrical device may include, but not limited to, a mobile phone, i-Pad, a music player, a CD player, tablet, a laptop, a personal computer or other electrical devices alike.

Yet another object of this invention is to provide the electrical device charger with means of holding a plurality of electrical devices, wherein main unit comprises said adjustable keychain to provide leveling to the electrical device charger to place on to the non-horizontal electrical outlets.

In one embodiment, the present invention is directed to an electrical device charger, comprising: at least one housing comprised of an outer surface from which a plurality of prongs protrude to couple to and receive power from a power source, where the outer surface is defined by least one stopper that is configured to hold at least one electrically powered device in position on the housing while the at least one housing is coupled to the power source.

In one embodiment, the present invention is directed to an electrical cord for connecting the housing to the electrically powered device.

In one embodiment the at least one stopper extends into a top of the at least one housing.

In one embodiment the at least one stopper comprises extends from a top of the at least one housing.

In one embodiment the stopper comprises a protrusion that extends from a top of the at least one housing.

In one embodiment the at least one stopper comprises a channel extending into a top of the at least one housing.

In one embodiment, the stopper is disposed completely across the top surface of the housing.

In one embodiment, along an entire length of the stopper, the stopper comprises a cross-sectional shape selected from the group consisting of: a right angle, an angle other than a right angel, a curve, and a combination thereof.

In one embodiment the at least one housing comprises a connector for electrically connecting the cable cord to the at least one electrical device.

In one embodiment the plurality of prongs are configured to couple to a 220 V or 110 V wall outlet.

In one embodiment the at least one housing is comprised of an electrically connected 220 V part and a 110 V part.

In one embodiment wherein the channel is configured to allow an angle of the channel to be adjusted relative to a bottom of the outer surface of the at least one housing.

In one embodiment the present invention further comprises a user adjustable mechanism coupled to the channel and configured to adjust the angle of the channel.

In one embodiment when the power source comprises a vertical surface, and when the electrical device charger is mounted against the vertical surface, the angle of the channel is adjustable relative to the vertical surface.

In one embodiment the electric power source is selected from the group consisting of: an alternating current (AC) source and a direct current (DC) source.

In one embodiment the least one housing is comprised of a first part and a second part, wherein the second part comprises the at least one stopper, and wherein the second part is configured to rotate relative to the first part.

In one embodiment the present invention further comprises a securing mechanism configured to maintain the rotation of the first part relative to the second part.

In one embodiment the at least one stopper comprises a channel.

In one embodiment the securing mechanism is configured to maintain the stopper in a horizontal orientation when the at least one housing is coupled to the power source.

In one embodiment the at least one housing is comprised of a first part and a second part that are connected by a press-fit mechanism.

In one embodiment the securing mechanism comprises a dial with an indicator.

In one embodiment the press-fit comprises a spring.

In one embodiment the invention further comprises the at least one electrically powered device, wherein the at least one electrically connected device comprises, a mobile phone, an i-Pad computer device, a music player device, a CD player, a tablet computer, or a laptop computer.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

These together with other objects of the invention, along with the various features of novelty which characterize the invention, are pointed out with particularity in the disclosure. For a better understanding of the invention, its operating advantages and the specific objects attained by its uses, reference should be had to the accompanying drawings and descriptive matter in which there are illustrated embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein there is at least one stopper able to hold an electrically powered device on top of the device, and WiFi payment processing system within the housing in all embodiments of the present invention, and in some embodiments there is also a card swipe reader on the housing's external surface.

DETAILED DESCRIPTION OF EXEMPLARY EMBODIMENTS

Figure 1:
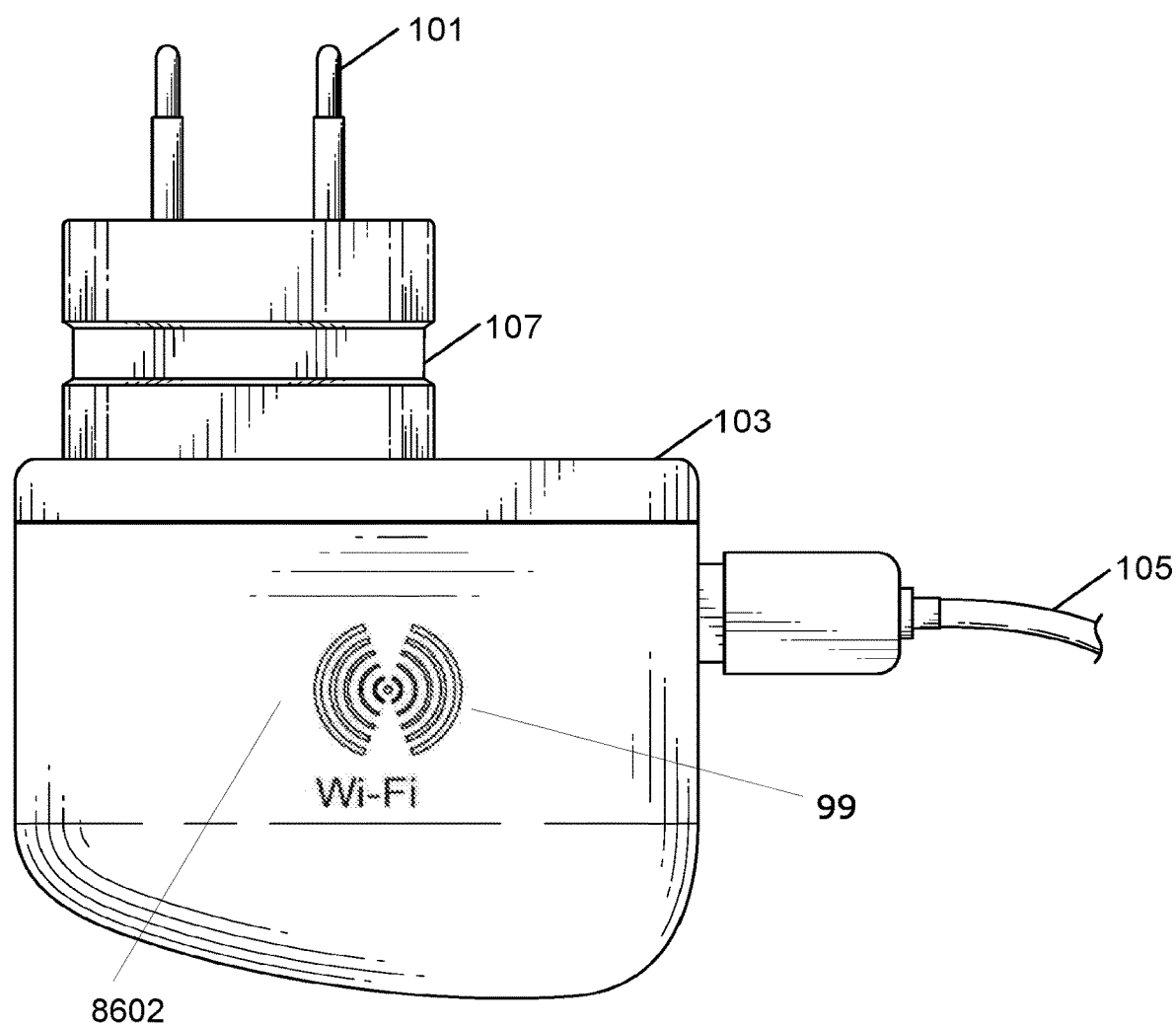
FIG. 1 depicts a top view of the electrical device charger (220 V electrical plug) with a holding channel in one of the embodiments of the present invention.

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that the embodiments may be combined, or that other embodiments may be utilized and that structural and logical changes may be made without departing from the spirit and scope of the present invention. The following detailed description is, therefore, not to be taken in a limiting sense, and the scope of the present invention is defined by the appended claims and their equivalents.

The present invention is described in brief with reference to the accompanying drawings. Now, refer in more detail to the drawings for the purposes of illustrating non-limiting embodiments of the present invention.

As used herein, the term "comprising" and its derivatives including "comprises" and "comprise" include each of the stated integers or elements but does not exclude the inclusion of one or more further integers or elements.

As used herein, the singular forms "a", "an", and "the" include plural referents unless the context clearly dictates otherwise. For example, reference to "a device" encompasses a single device as well as two or more devices, and the like.

As used herein, the terms "for example", "like", "such as", or "including" are meant to introduce examples that further clarify more general subject matter. Unless otherwise specified, these examples are provided only as an aid for understanding the applications illustrated in the present disclosure, and are not meant to be limiting in any fashion.

As used herein the terms "prongs" and "pins" are intended to encompass a class of structures provided to the housing of a electrical device charger to enable electrical connection of the housing to an electrical power sources.

As used herein the term "stopper" is intended to apply to slots, channels, grooves, protrusions, stops and other similar structures that are provided to the housing of a device charger to enable holding and retaining of electrical devices on or in the housing. In one embodiment, a stopper can be defined by opposing sides that are parallel, with open ends to allow the user's electrical device (e.g. laptop, smartphone, tablet, etc.) to extend outward through the open ends.

In another embodiment, a stopper can be defined by opposing sides that are non-parallel, with open ends. In one embodiment, a stopper may be defined by sides that have portions that are both parallel and non-parallel. In embodiments, the stopper comprises a cross-section with a u-shape or a V-shape or both a V-shape and a u-shape. In embodiments, a stopper may be outside or inside the housing of an electrical device charger and/or adapter. In one embodiment, a cross-sectional shape of the stopper is defined by a shape selected from the group consisting of a right angle, an angle other than a right angel, a curve, and a combination thereof.

Embodiments will now be described more fully hereinafter with reference to the accompanying drawings, in which embodiments are shown. These embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein.

Various modifications will be readily apparent to persons skilled in the art. The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the hardware, software, processes, methods, and/or operating systems described herein are for illustrative purposes and, thus, are not intended to be limited to any particular named element.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases, it will be recognized that references to the "invention" will refer to subject matter recited in one or more, but not necessarily all, of the claims.

All methods described herein can be performed in any suitable order unless otherwise indicated herein or otherwise clearly contradicted by context. The use of any and all examples, or language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various terms as used herein are shown below. To the extent a term used in a claim is not defined below, it should be given the broadest definition persons in the pertinent art have given that term as reflected in printed publications and issued patents at the time of filing.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

Figure 9:
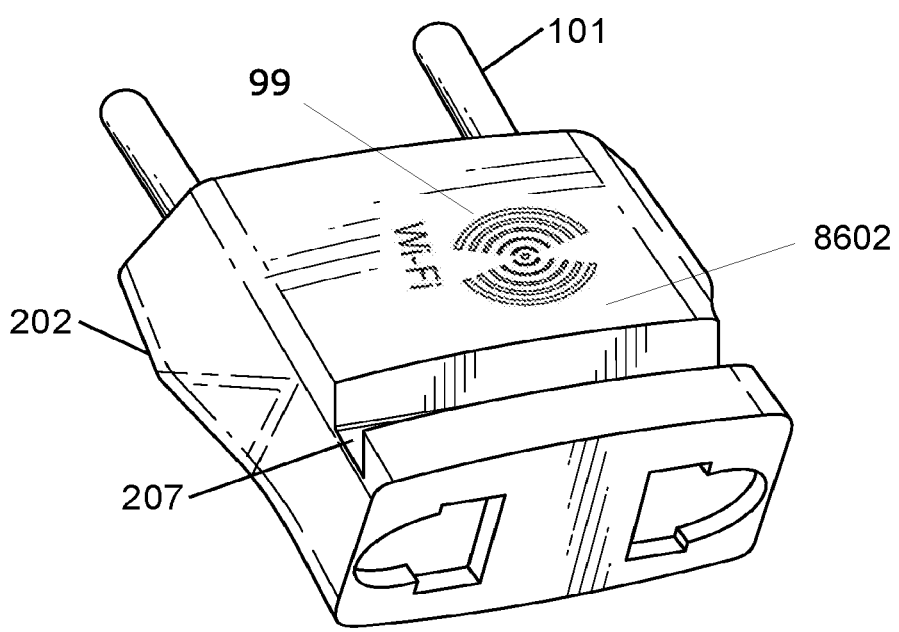
FIG. 9 depicts a perspective view of the 220 V electrical adapter having embodiment of device holding stopper and a socket arrangement for 110 V electrical plug.

In the present invention, the following embodiments are discussed, wherein each embodiment comprises a wireless payment processing system. The first embodiment is electrical plug that goes into the outlet, with device holding slot(s) (see FIGS. 2 and 3). The second embodiment is the electrical adapter that goes into the outlet with the device holding channel/stopper (see FIGS. 9 and 13). The third embodiment is the assembling of the electrical adapter and the electrical plug (see FIGS. 22 and 24). The fourth embodiment is the arrangement having two separate parts which can be connected via snap on clamp mechanism (see FIG. 76). The fifth embodiment which is an adjustable device holder to compensate for non-horizontal electrical outlets with horizontal level keychain charger (see FIG. 76). Further, the device holding slot can be either vertical or angled (see FIGS. 50, 51, 53, and 55). Further, different types of various arrangements are provided in the Figures and are explained herein.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, and firmware and/or by human operators.

The present invention discloses a charging device for charging a portable electrical device such as mobile phone, tablet, smart phone, tablet and other similar devices. The charging device consists of an outer housing having a plurality of prongs configured to receive power from the power sources. The charging device consists of an USB slot and an audio slot. The charging device further connect with a plurality of charging cables extendable from the USB slot and/or audio slot to connect a charging slot of electrical device such as mobile phone, tablet, smart phone etc.

In an exemplary embodiment, the charging device further consists of an electric power sensor for sensing a quantity of power used during the charging of an electric appliance. The electric power will also calculate the total units of power consumed using a rate charging processor by the electric appliance while connecting to the charging device.

In an exemplary embodiment, the charging device further consist a transaction mechanism to facilitate a payment transaction by receiving a payment card and utilizing the network connectivity provided by the network elements to connect to a payment server.

In an exemplary embodiment, the transaction mechanism of charging device can receive a payment card such as credit card, debit card, gift card, prepaid card and/or reward card to facilitate transaction by swiping the card on the outer periphery of the charging device.

In an exemplary embodiment, the user can also use net banking, payment wallets and any other mode of banking to pay for the charging units consumed by the user while connected to the charging device.

Figure 85:
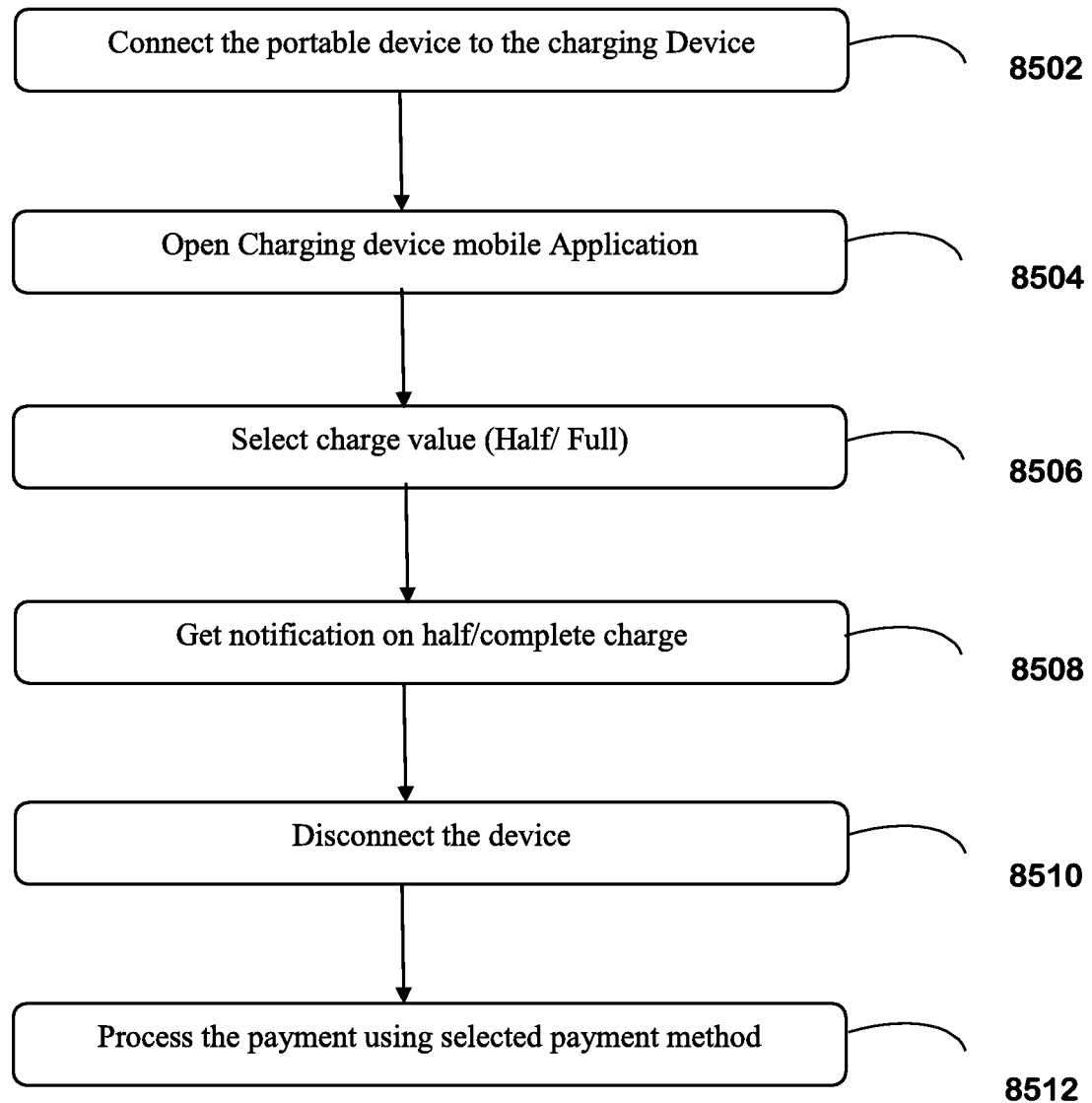
FIG. 85 illustrates a flow chart for facilitate a transaction utilizing the method described, in accordance with an exemplary embodiment of present invention.

FIG. 85 illustrates a flow chart for facilitate a transaction utilizing the method.

Step 8502: A user connects the mobile phone to metered charging device at a location.

Step 8504: The user initializes the mobile application to start the charging operation.

Step 8506: The user selects the charge value. The charge value can be half or full based on the user's need or the time you have to charge the portable device. The user can also charge based on the amount, the user is willing to spend for it. An estimated amount may be shown to the user based on the expected/approximate charging units consumed to charge the user's device.

Step 8508: The user gets notified by an audible alert or a tone. Also, a notification can be sent to secondary device to alert the user for the charging value selected by the user in previous step.

Step 8510: The user disconnects the device from the charging apparatus.

Step 8512: The user makes the payment by the mode selected by the user. The user can make the payment using transaction mechanism available on the outer periphery on the charging device. Also, the use can make the payment using the mobile application coupled with the charging device.

In an exemplary embodiment, the charging device can also have a touch-screen display to see the charging progress, issues command/instructions to control the charging device and also to process the payment using banking or payment details without using the swiping payment mechanism.

Figure 86:
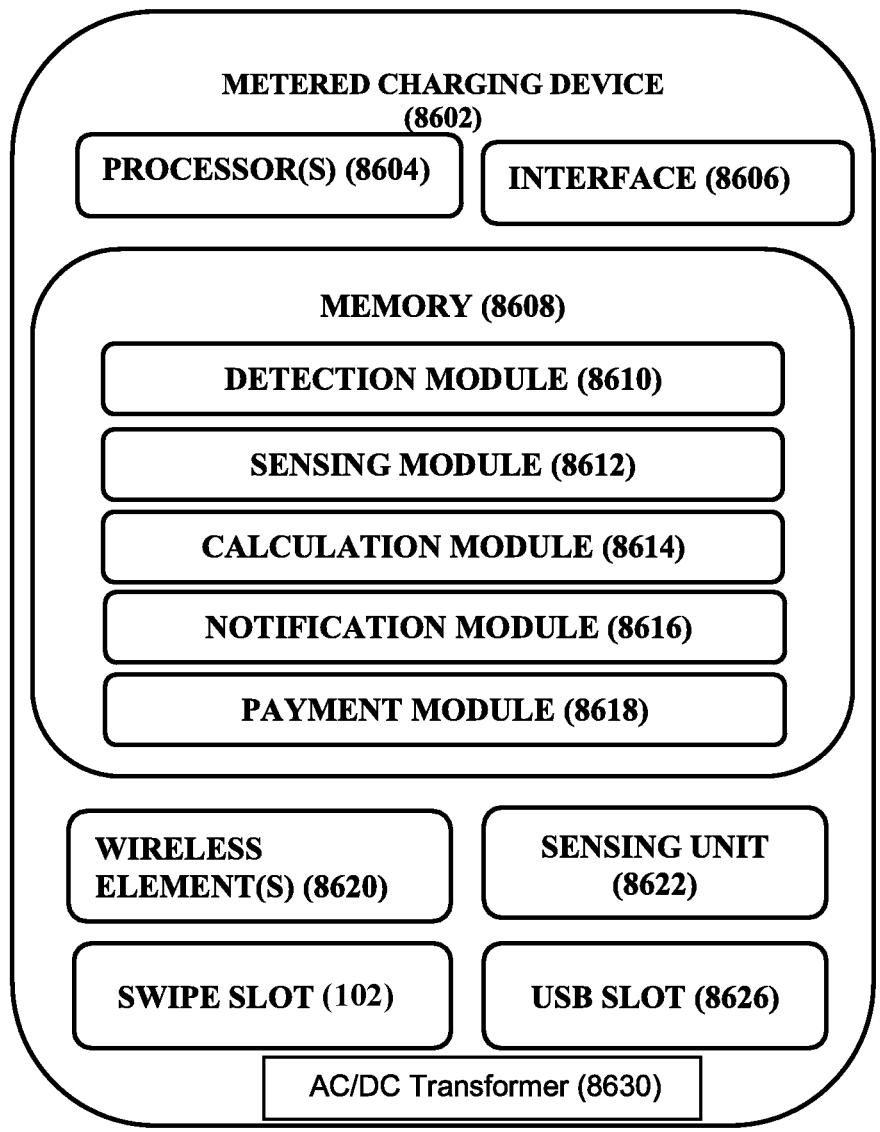
FIG. 86 illustrates a block diagram of a metered charging device block diagram, in accordance with an exemplary embodiment of the present invention.

FIG. 86 illustrates a block diagram of a metered charging device electrical circuit having various hardware elements along with its working module in accordance with an exemplary embodiment of the present invention. In one embodiment, the metered charging device 8602 may include one or more processor(s) 8604, an input/output (I/O) interface(s) 8606 and a memory 8608 for example, non-transitory storage device. The processor may be implemented as one or more microprocessors, microcomputers, microcontrollers, digital signal processors, central processing units, state machines, logic circuitries, and/or any devices that manipulate signals based on operational instructions. Among other capabilities, the at least one processor is configured to fetch and execute computer-readable instructions stored in the memory. The I/O interface may include a variety of software and hardware interfaces, for example, a web interface, a graphical user interface, and the like. The I/O interface may allow system to interact with a user directly. The I/O interface can facilitate multiple communications within a wide variety of networks and protocol types, including wired networks, for example, LAN, cable, etc., and wireless networks, such as WLAN, cellular, or satellite. The I/O interface may include one or more ports for connecting a number of devices to one another or to another server. The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory may include modules and data. The modules include routines, programs, and objects, components, and data structures etc., which perform particular tasks or implement particular abstract data types. The metered charging device further consists of wireless elements (1218) such as WI-FI, RFID, NFC or Cellular components to provide wireless connectivity to the remote or payment server.

The metered charging device further consists of a payment processing system comprising an electrical circuit 8602 comprising hardware and software components comprising: a power meter sensing unit 8622; a rate charging unit 8614; and a transaction mechanism 8618 that facilitates receiving a user's billing information and processing a payment online immediately.

The power meter sensing unit 8622 will determine the total power consumed by the user's portable device while connected to the charging device; and it may comprise power meters well known in the art and/or within the user's portable device.

The rate charging unit 8614 utilizes the processor 8604 to calculate how much to bill a user based on the power amount consumed to recharge their portable device, and any additional fees charged by the vendor (e.g. taxes, store fees for service provided and charger rental, etc.).

The transaction mechanism comprises one or more of: a debit/credit card payment online via a mobile application of the present invention (e.g. payment module 8618); or via a vendor's or a third-party payment website (e.g. CreditCardProcessing®, Payment Depot®, Payment Cloud®, etc.); or via an internal debit/credit card swipe slot 102 (e.g. FIGS. 2, 17) and the payment module 8618; or via a third-party debit/credit card reader hardware device (e.g. Square®, Leaders Merchant Services®, Flagship Merchant Services®, ProMerchant®, etc.) that is temporarily attached to the electrical charger, or a vendor's or user's portable device.

The USB/AUDIO slot 8626 is configured to receive charging cables to connect to a user's portable device and/or to also act as a connector for external third-party payment processing hardware device (e.g. Square®, Leaders Merchant Services®, Flagship Merchant Services®, ProMerchant®, etc.).

In an exemplary embodiment, the memory of metered charging device 8602 consists of various modules which describe the overall working of it. The detection module 8610 detect when the portable device is connected to the charging device. The sensing module 8612 senses the power distribution from the charging device to the portable electric device. The calculation module 8614 further calculates the total power consumed while charging using one or more processing units. The notification module 8616 notifies or alerts the user for the charge completed or any other notifications. The payment module 8618 collects the payment from the user device using swipe slot 102 or any other mode selected by the user using the transaction mechanism.

The electrical device charger's payment processing system further comprises a non-transitory computer-readable medium storing a set of computer instructions for execution by the at least one processor, for: displaying on the charger and/or on the electrically powered device, how much time left for complete charging; and the amount of a payment due.

The electrical device charger's payment processing system further comprises a non-transitory computer-readable medium storing a set of computer instructions for execution by the at least one processor, for: receiving user input for debit/credit card billing information; wirelessly transmitting the billing information to a remote payment processing computer; and wirelessly receiving confirmation of a payment.

Electrical device 8602 further comprises an alternating current (from the wall outlet) to a direct current transformer 8630 and computer instructions within the memory 8608 that is well known in the art for being able to instruct the processor (8604) to charge a variety of types of portable devices (e.g. laptops, smartphones, tablets, etc.) at each type of device's required voltage and amperage.

In an exemplary embodiment, the user can utilize the mobile application to track the progress of the charging on another or secondary device running the application.

In the specification, the charging device and charging apparatus are used interchangeably. However, both charging device and charging apparatus is same as described in various embodiments of the invention.

In the specification, the electric device, electronic device and portable device are used interchangeably. However electric device, electronic device and portable device are such as mobile device, smart phone, and handheld device.

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein. Various modifications will be readily apparent to persons skilled in the art. The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named element.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosure as set forth in the appended claims.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

In an implementation, one or more computing device(s) used herein may be any of a variety of types of computing device, including without limitation, a desktop computer system, a data entry terminal, a laptop computer, a notebook computer, a tablet computer, a handheld personal data assistant, a smartphone, a body-worn computing device incorporated into clothing, a computing device integrated into a vehicle (e.g., a car, a bicycle, etc.), a server, a cluster of servers, a server farm, etc.

In various embodiments, a computing device used herein can comprise a storage storing a control routine, a processor circuit, controls, a display, and a link interface for various uses of the proposed system including, without limitation, running application programs and communicating with various networks and devices such as the Internet and beacon devices. It is envisioned that some computing devices are likely to be relatively portable computing devices able to be carried on the person of its operator (e.g., a smartphone, a personal data assistant (PDA), a tablet computer, a watch or wearable computer, etc.). It is therefore further envisioned that the links formed between the various computing devices used herein is likely to be a wireless or a wired link.

The link may be based on any of a variety (or combination) of communications technologies by which signals may be exchanged, including without limitation, wired technologies employing electrically and/or optically conductive cabling, and wireless technologies employing infrared, radio frequency or other forms of wireless transmission. It is envisioned that one or more of these links may be implemented as channels of communication (e.g., virtual private network (VPN) channels or other forms of virtual channels) formed between computing devices through portions of the Internet.

Generally, and in various embodiments, the link will use signaling and/or protocols conforming to any of a variety of industry standards, including without limitation, RS-232C, RS-422, USB, Ethernet (IEEE-802.3) or IEEE-1394. Alternatively or additionally, where one or more portions of the link employ wireless signal transmission, one or more of the interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

The computing devices may store instructions to be executed by processor in storage, such as control routine. The storage may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. As such, and in various embodiments, storage may provide volatile and/or nonvolatile storage of data, data structures, computer-executable instructions, and so forth. For example, a number of program modules can be stored in memory units, including an operating system, and control routine.

The processor circuit may be caused by control routine to initiate a registration process. During the registration process, a user is prompted for various pieces of personal information concerning the user such as a name, an address, contact information, account information, etc. The user may also be prompted to choose whether to opt-in, and if so, to which kinds of messages.

In an aspect, the proposed system (interchangeably termed as system herein) can be operatively configured as a website accessible by any Internet enabled computing device, and can as well be configured as a mobile application that can be downloaded on a mobile device that can connect to Internet. In such manner, the proposed system can be available 24*7 to its users. Any other manner of implementation of the proposed system or a part thereof is well within the scope of the present disclosure/invention. The computing device can be a PC, a tablet, a smart phone and other like devices.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various terms as used herein are shown below. To the extent a term used in a claim is not defined below, it should be given the broadest definition persons in the pertinent art have given that term as reflected in printed publications and issued patents at the time of filing.

Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

Electronic Device

In some embodiments, the platforms, media, methods and applications described herein include an electronic device, a processor, or use of the same. In further embodiments, the electronic device includes one or more hardware central processing units (CPU) that carry out the device's functions. In still further embodiments, the electronic device further comprises an operating system configured to perform executable instructions. In some embodiments, the electronic device is optionally connected a computer network. In further embodiments, the electronic device is optionally connected to the Internet such that it accesses the World Wide Web. In still further embodiments, the electronic device is optionally connected to a cloud computing infrastructure. In other embodiments, the electronic device is optionally connected to an intranet. In other embodiments, the electronic device is optionally connected to a data storage device. In accordance with the description herein, suitable electronic devices include, by way of non-limiting examples, server computers, desktop computers, laptop computers, notebook computers, subnotebook computers, netbook computers, net pad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the electronic device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the electronic device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In some embodiments, the non-volatile memory comprises magneto-resistive random-access memory (MRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the electronic device includes a display to send visual information to a subject. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In some embodiments, the display is E-paper or E ink. In other embodiments, the display is a video projector. In still further embodiments, the display is a combination of devices such as those disclosed herein.

In some embodiments, the electronic device includes an input device to receive information from a subject. In some embodiments, the input device is a keyboard. In some embodiments, the input device is a pointing device including, by way of non-limiting examples, a mouse, trackball, trackpad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Non-Transitory Computer Readable Storage Medium

In some embodiments, the platforms, media, methods and applications described herein include one or more non-transitory computer readable storage media encoded with a program including instructions executable by the operating system of an optionally networked digital processing device. In further embodiments, a computer readable storage medium is a tangible component of an electronic device. In still further embodiments, a computer readable storage medium is optionally removable from an electronic device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiment, the platforms, media, methods and applications described herein include at least one computer program, or use of the same. A computer program includes a sequence of instructions, executable in the electronic device's CPU, written to perform a specified task. Computer readable instructions may be implemented as program modules, such as functions, objects, Application Programming Interfaces (API's), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application for one or more of the following functions: In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA® or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile electronic device to carry out at a minimum the functions of the payment processing system of the present invention. In some embodiments, the mobile application is provided to a mobile electronic device at the time it is manufactured. In other embodiments, the mobile application is provided to a mobile electronic device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof Compilation is often performed, at least in part, to create an executable program. In some embodiments, a computer program includes one or more executable compiled applications.

Software Modules

In some embodiments, the platforms, media, methods and applications described herein include software, server, and/or database modules (hardware and software), or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of barcode, route, parcel, subject, or network information. In various embodiments, suitable databases include, by way of non-limiting examples, relational databases, non-relational databases, object-oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

Web Browser Plug-in

In some embodiments, the computer program includes a web browser plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected electronic devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile electronic devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

As used herein, and unless the context dictates otherwise, the term "coupled to" is intended to include both direct coupling (in which two elements that are coupled to each other or in contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While some embodiments of the present disclosure have been illustrated and described, those are completely exemplary in nature. The disclosure is not limited to the embodiments as elaborated herein only and it would be apparent to those skilled in the art that numerous modifications besides those already described are possible without departing from the inventive concepts herein. All such modifications, changes, variations, substitutions, and equivalents are completely within the scope of the present disclosure. The inventive subject matter, therefore, is not to be restricted except in the spirit of the appended claims.

EXPLANATION OF DRAWINGS

It is noted that all of the electrical device chargers of the present invention (e.g. as exemplified in FIGS. 1-3, and 8-84) comprise a WiFi payment processing system as part of the electrical circuit within the charger's housing.

In an embodiment, a mobile application of the present invention, and/or a website, enables a user to enter their debit/credit card information in order to pay wirelessly for the electricity used to charge their electrical device (e.g. see FIGS. 1, 8-16, 18-24, and 26-84).

In another embodiment, the electrical device chargers comprise a debit/credit card swipe reader 102 (e.g. 2, 17, and 25) for a user to enter their billing information in lieu of manually entering it online.

Figure 2:
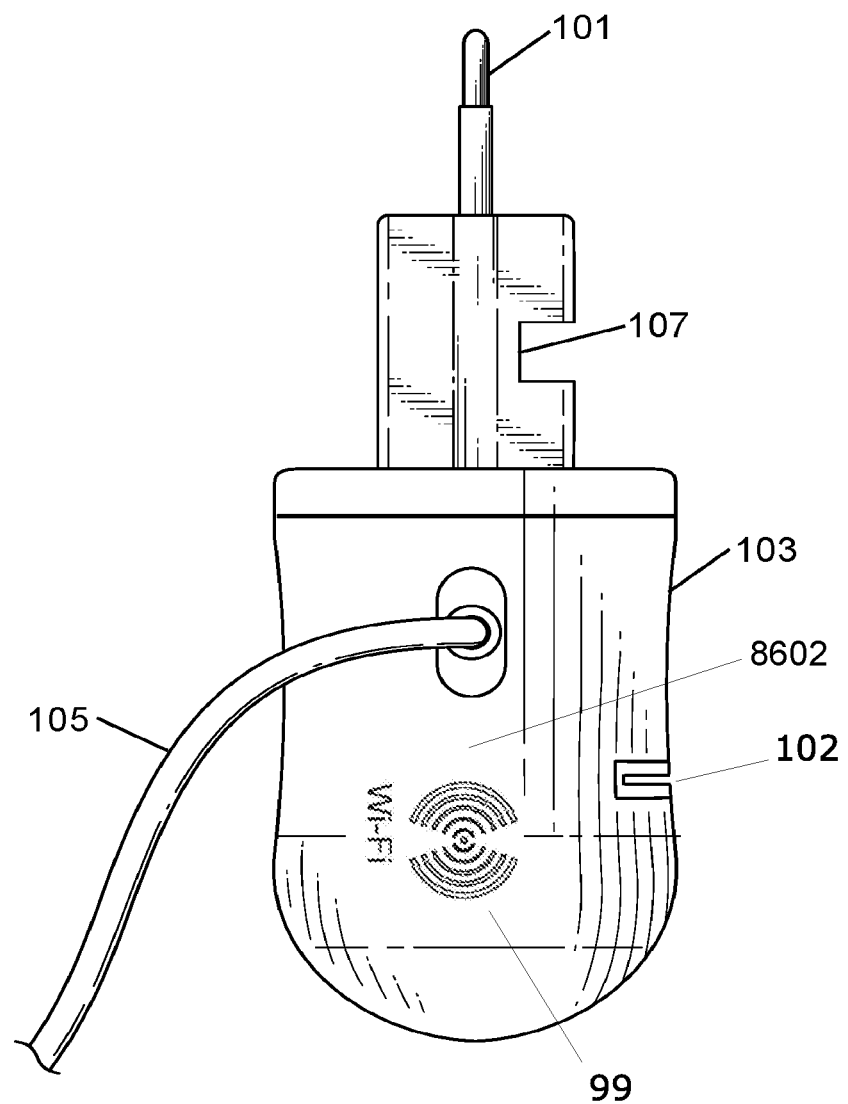
FIG. 2 depicts a side view another embodiment of the electrical device charger (220 V electrical plug) with a holding channel and a card swipe reader.

FIG. 1 depicts top view of the 220 V electrical device charger with vertical channel type device holding slot, one of the embodiments of the present invention. FIG. 2 depicts side view of FIG. 1 embodiments of the present invention. An electrical device charger with means of holding a plurality of electrical devices (not shown in the picture) which comprises: a main unit/housing 103 with at least one holding slot 107; a cable cord 105 for connecting main unit with said electrical devices; and Pins 101 for fitting said main unit 103 with an electric power source. The electrical device charger (i.e. main unit) in the present embodiment is 220 V electrical plug. The holding slot 107 in this embodiment is channel type and it is vertical. The holding slot 107 is located at the top side of the main unit 103. Further, the cable cord 105 is connected to the main unit 103 from one of the side. The pins 101 in the present embodiment are of round type (normally used for providing 220 V electrical power sources). The electrical devices can be held vertically in the holding slot 107, in an embodiment when it is of channel type, in which an electrical device can held securely. The electrical device charger with means of holding a plurality of electrical devices as per the present invention, wherein said electric power source may include, but not limited to, alternating current AC or DC direct current also referred as constant polarity directional electric power, and the connection to the electric power source may be a direct connection, via a DC adapter, or via a USB connection.

Figure 3:
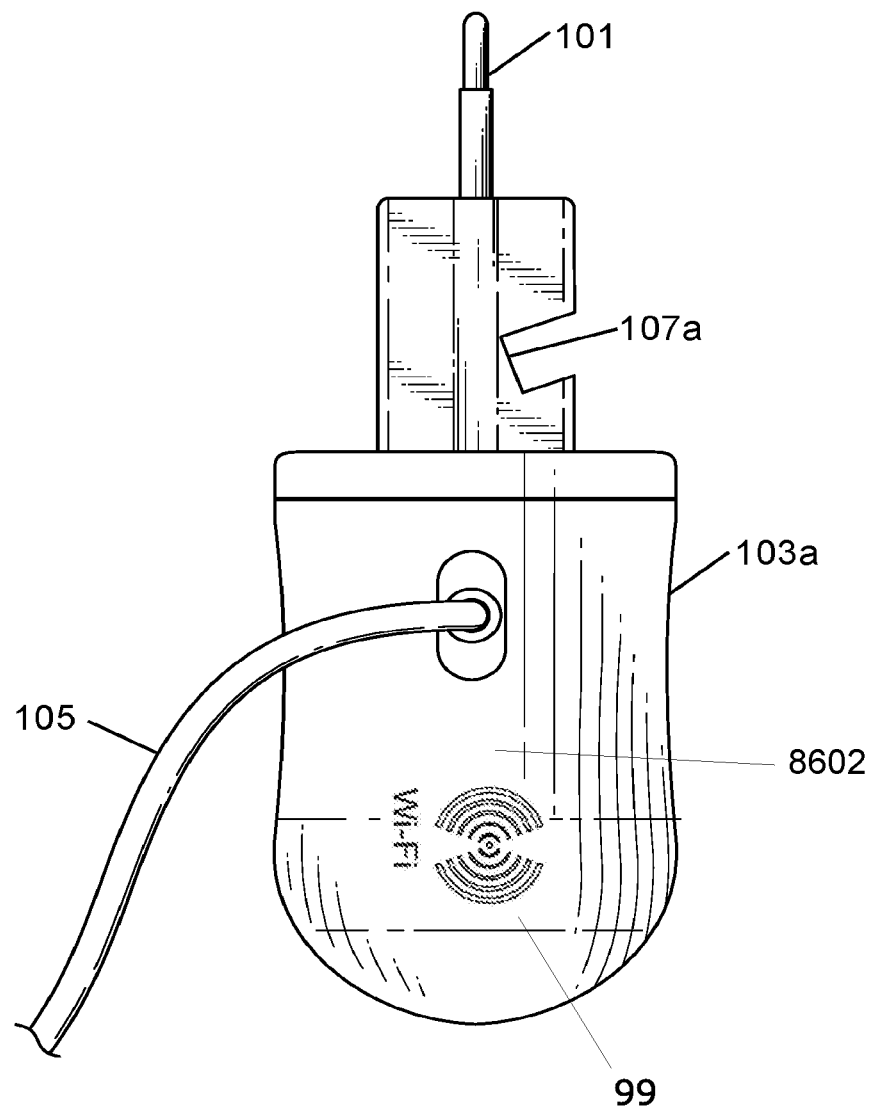
FIG. 3 depicts a side view of the electrical device charger (220 V electrical plug) with angled holding stopper in one of the embodiments of the present invention.

In an embodiment, as shown in FIG. 3, side view of the 220 V electrical device charger with angled channel type device holding slot. An electrical device charger with means of holding a plurality of electrical devices (not shown in the picture) which comprises: a main unit 103*a* with at least one holding slot 107*a*; a cable cord 105 for connecting main unit with said electrical devices; and Pins 101 for fitting said main unit 103*a* with an electric power source. The electrical device charger (i.e. main unit) in the present embodiment is 220 V electrical plug. The holding slot 107*a* in this embodiment is channel type and it is angled. This embodiment encourages the device being charged to lean against the wall near the electrical outlet. Among other considerations this promotes stability by moving the center of mass closer to the wall. The holding slot 107*a* is located at the top side of the main unit 103*a*. Further, the cable cord 105 is connected to the main unit 103*a* from one of the side. The pins 101 in the present embodiment are of round type (normally used for providing 220 V electrical power sources). The electrical devices can be held or on an angle in the holding slot 107*a*, in the present embodiment it is of channel type, in which an electrical device securely rests.

Figure 4:
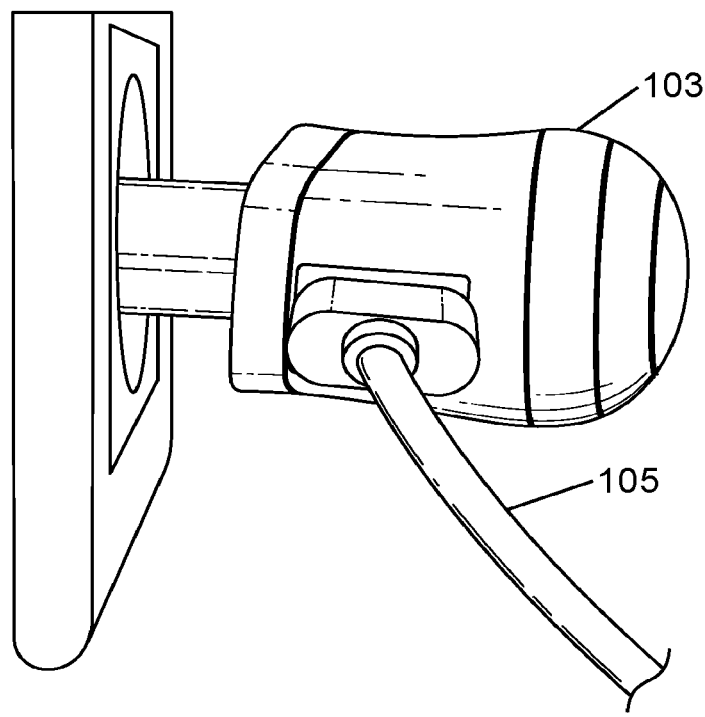
FIG. 4 depicts a 220 V electrical device charger with a cable cord according to prior art, which lacks a payment processing system.
Figure 5:
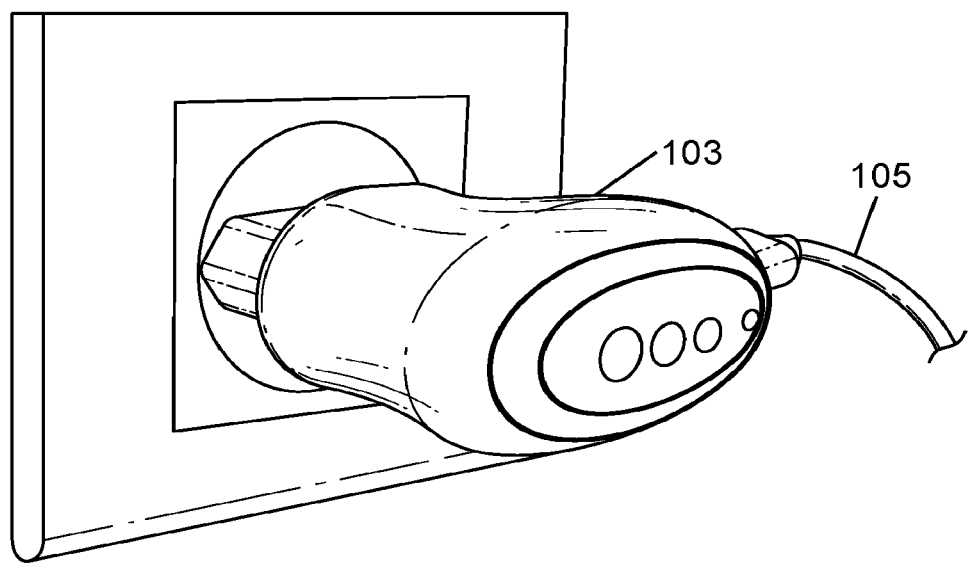
FIG. 5 depicts another 220 V electrical charger according to prior art, which lacks a payment processing system.
Figure 6:
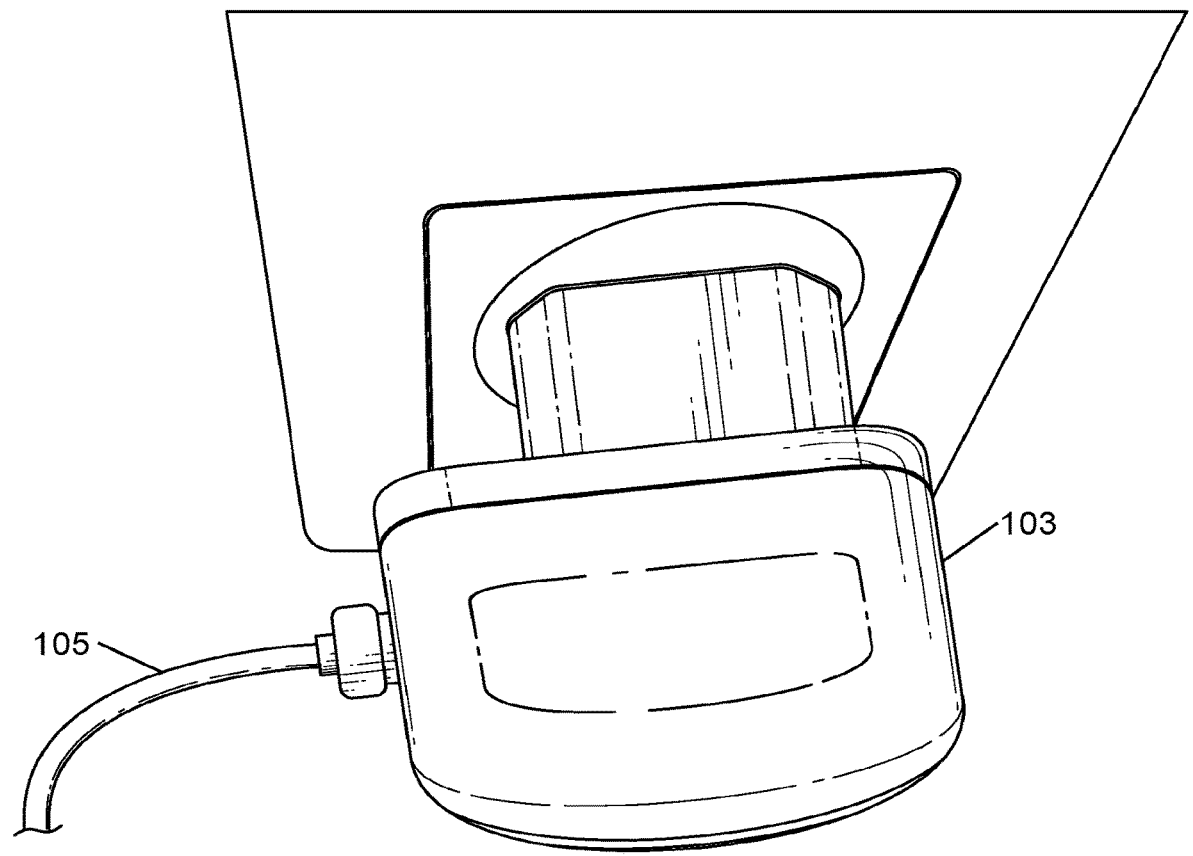
FIG. 6 depicts a top view of the 220 V electrical charger with a cable cord according to prior art, which lacks a payment processing system.
Figure 7:
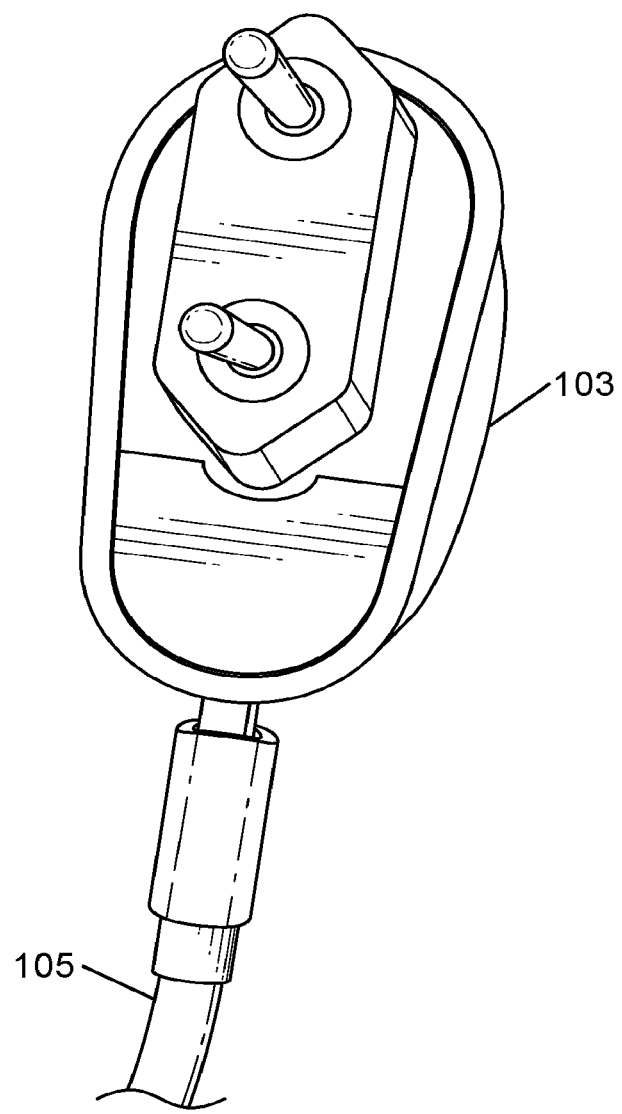
FIG. 7 depicts a frontal view of the 220 V electrical charger with a cable cord according to prior art, which lacks a payment processing system.

FIGS. 4, 5, 6, and 7 depicts prior art 220 V electrical chargers in the market, which lack a wireless payment processing system housed within the devices. 110 V electrical chargers may also have similar kinds of arrangements. FIG. 4 depicts 220 V electrical device charger with a cable cord according to prior art. FIG. 5 depicts another 220 V electrical charger according to prior art. FIGS. 6 and 7 depicts top view and frontal perspective view of the 220 V electrical charger with a cable cord according to prior art, respectively.

Figure 8:
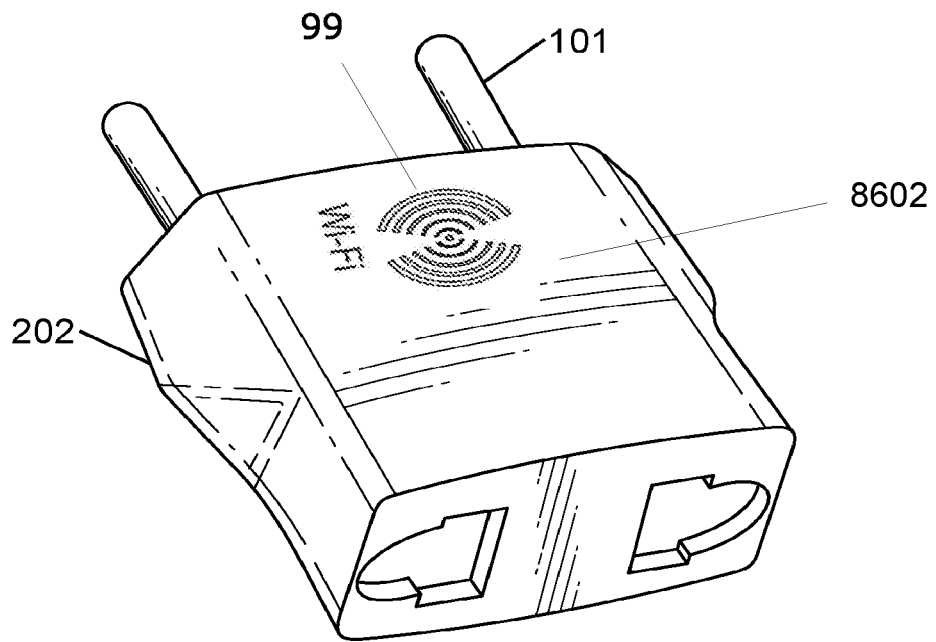
FIG. 8 depicts a 220 V electrical adapter having socket arrangement for normal 110 V electrical plug.

FIG. 8 depicts perspective view (from front side raised) of the 220 V electrical adapter having socket arrangement for 110 V electrical plug. In an embodiment, as shown in the FIG. 9, the 220 V electrical adapter has a holding slot and a socket arrangement for 110 V electrical plug (from front side raised). The electrical device charger 202 (i.e. main unit) in the present embodiment is 220 V electrical adapter. The 220 V electrical adapter 202 has socket arrangement at the front side of the unit to which 110 V flat pin electrical plug can be attached (optionally, there is also possibility of making an arrangement to have socket to which 220 V electrical plug can fit). The holding slot 207 in this embodiment is channel type and it is vertical. The holding slot 207 is located at the top side of the main unit 202. The pins 101 in the present embodiment are of round type (normally used for providing 220 V electrical power sources). The electrical devices can be held or on an angle in the holding slot 207, in the present embodiment it is of channel type, in which an electrical device is securely held.

Figure 10:
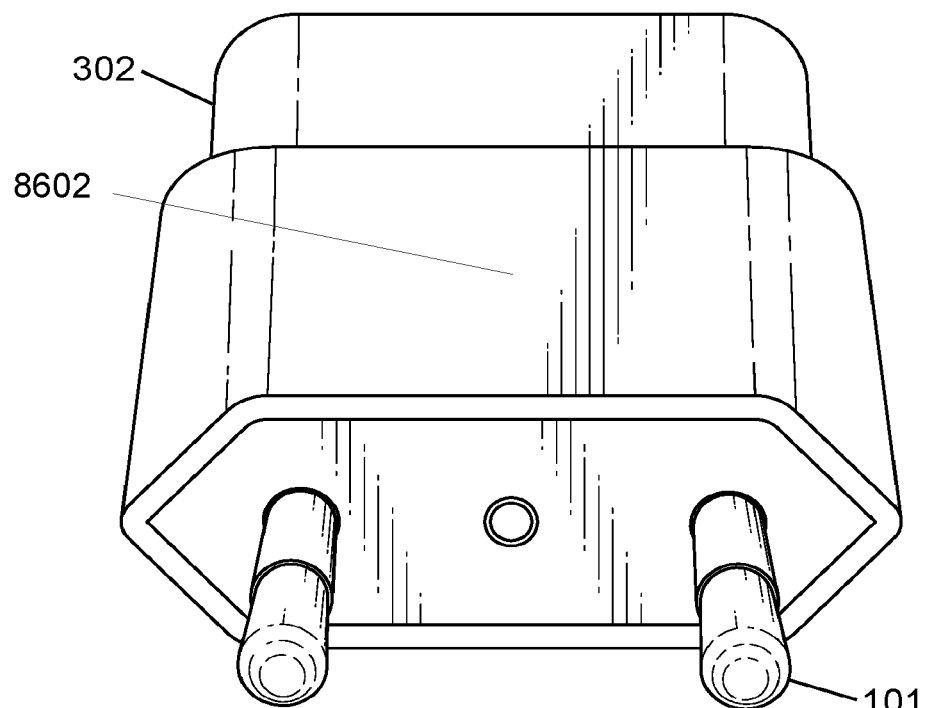
FIG. 10 depicts another 220 V electrical adapter having socket arrangement for normal 110 V electrical plug.
Figure 11:
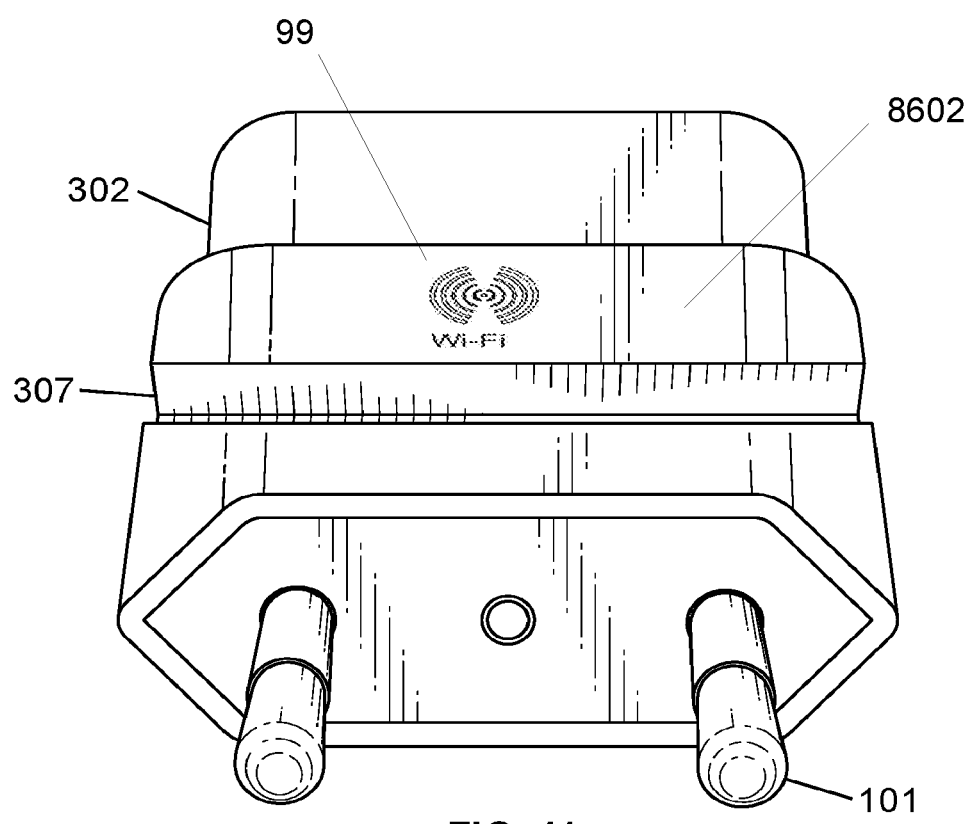
FIG. 11 depicts an elevated end view of another 220 V electrical adapter having embodiment of device holding stopper and a socket arrangement for 110 V electrical plug according to one of the embodiments of the present invention.

FIG. 10 depicts perspective view (from rear side elevated) of the 220 V electrical adapter having socket arrangement for 110 V electrical plug. In an embodiment, as shown in the FIG. 11, the 220 V electrical adapter having a holding slot and a socket arrangement for 110 V electrical plug (from rear side elevated). The electrical device charger 302 (i.e. main unit) in the present embodiment is 220 V electrical adapter. The 220 V electrical adapter 302 has socket arrangement at the front side of the unit to which 110 V flat pin electrical plug can be attached (optionally, there is also possibility of making an arrangement to have socket to which 220 V electrical plug can fit). The holding slot 307 in this embodiment is a channel type and it is vertical. The holding slot 307 is located at the top side of the main unit 302. The pins 101 in the present embodiment are of round type (normally used for providing 220 V electrical power sources). The electrical devices can held vertically or on an angle in the holding slot 307, in the present embodiment it is of channel type, in which an electrical device, which is being charged, can held securely.

Figure 12:
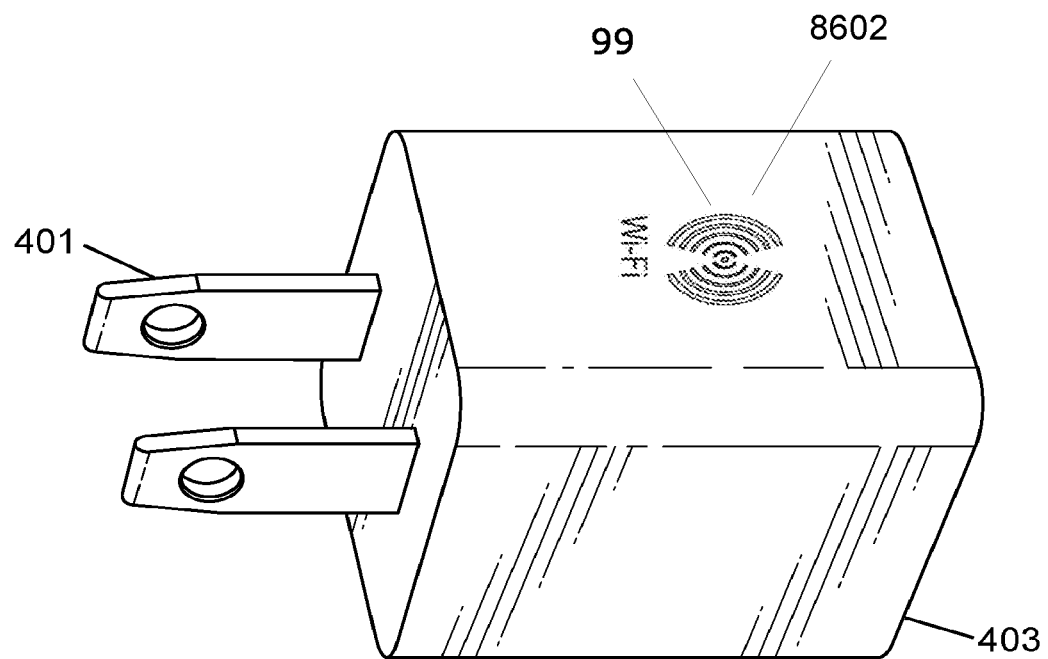
FIG. 12 depicts a 110 V electrical plug for charging electrical device (USB is in rear view—not shown).
Figure 13:
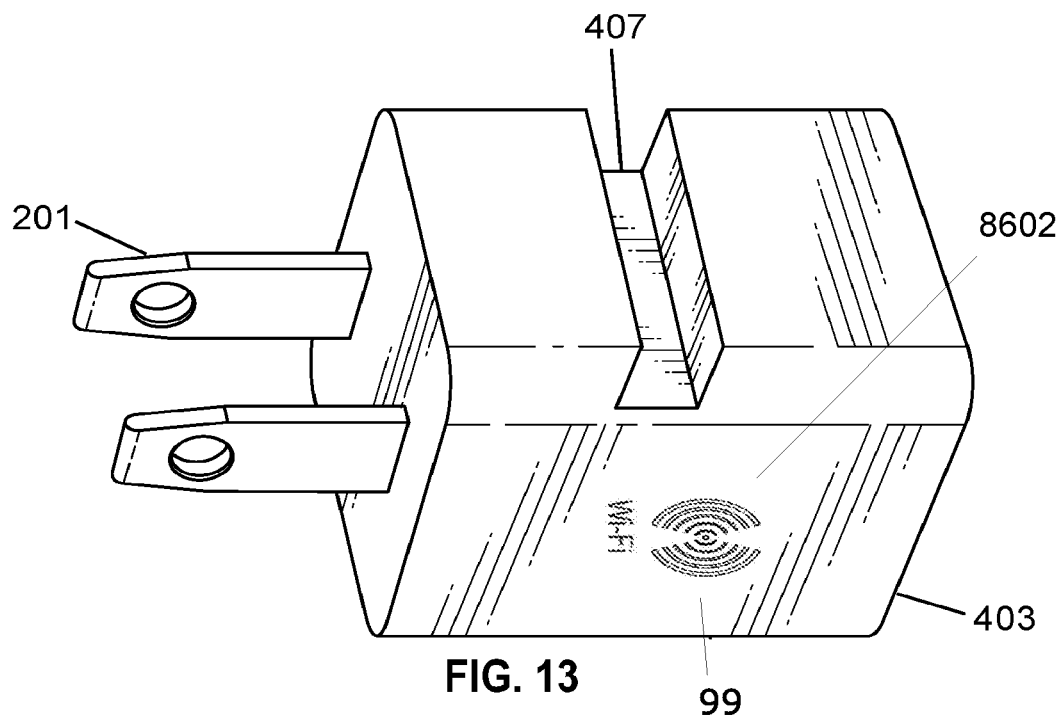
FIG. 13 depicts an isometric view of 110 V electrical plug having an embodiment of a vertical channel.
Figure 14:
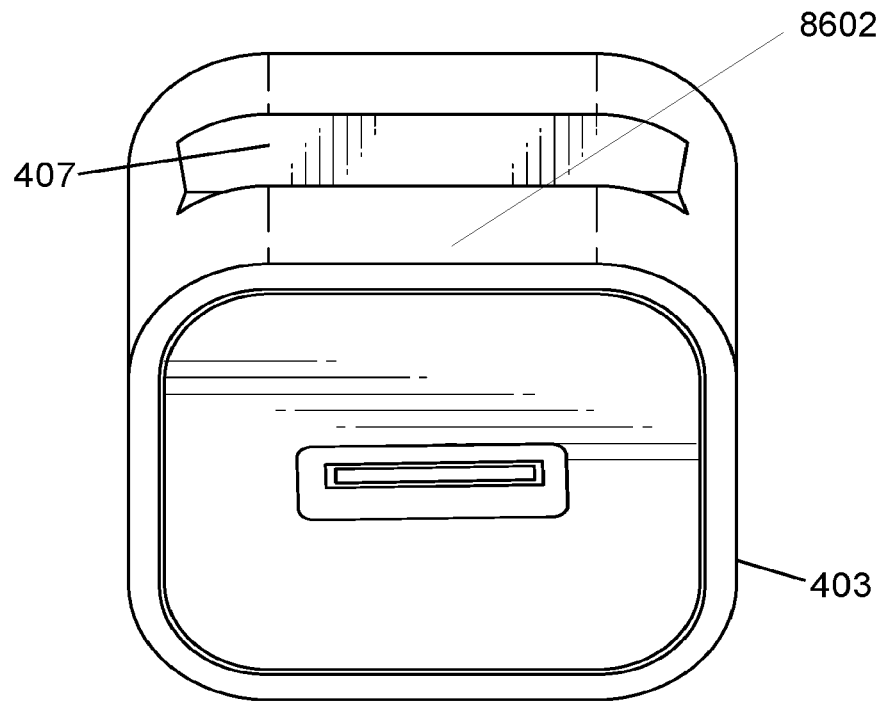
FIG. 14 depicts a rear elevated view of FIG. 13 according to one of the embodiments of the present invention.
Figure 15:
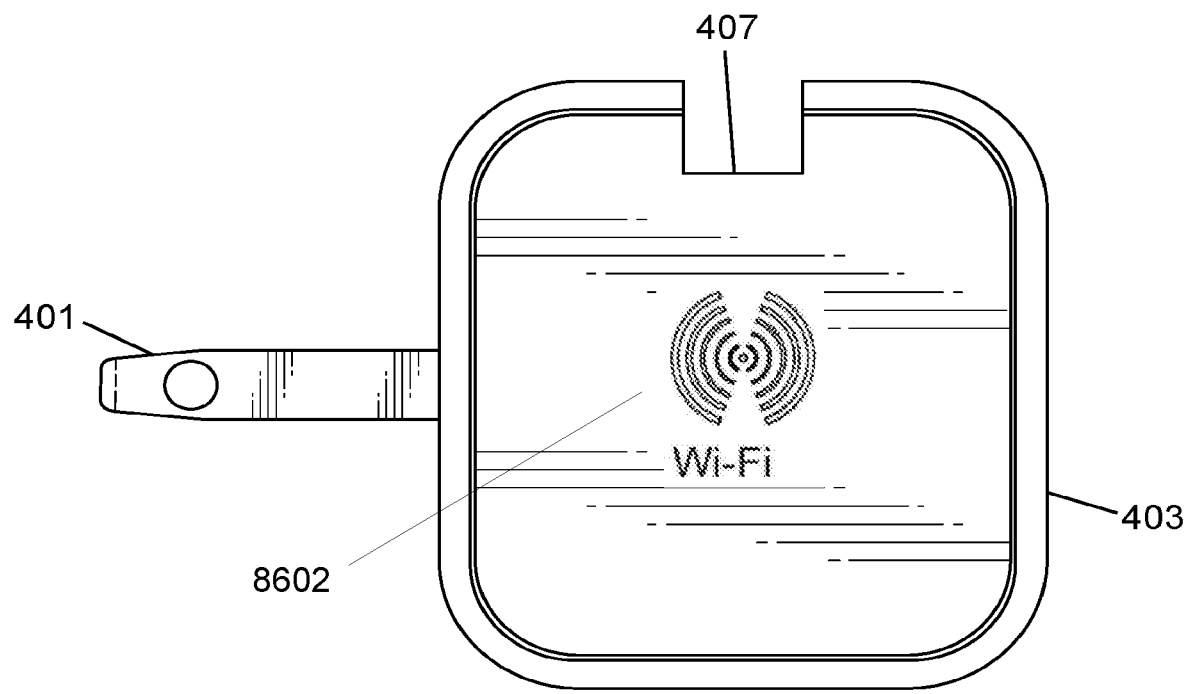
FIG. 15 depicts a side view of FIG. 13 according to one of the embodiments of the present invention.

FIG. 12 depicts perspective view of 110 V electrical plug. In an embodiment, FIGS. 13 to 15, shows different views of 110 V electrical plug having a holding slot on top of the electrical plug. An electrical device charger with means of holding a plurality of electrical devices (not shown in the picture) which comprises: a main unit 403 with at least one holding slot 407; and Pins 201 for fitting said main unit 403 with an electric power source. The electrical device charger (i.e. main unit) in the present embodiment is 110 V electrical plug. The holding slot 407 in this embodiment is channel type and it is vertical.

The holding slot 407 is located at the top side of the main unit 403. Further, the cable cord (not shown) can be connected to the main unit 403 from front side (see. FIG. 14). The pins 201 in the present embodiment are of round type (normally used for providing 110 V electrical power sources). The electrical devices can be held vertically in the holding slot 307, in the present embodiment it is of channel type, in which an electrical device is securely placed.

Figure 16:
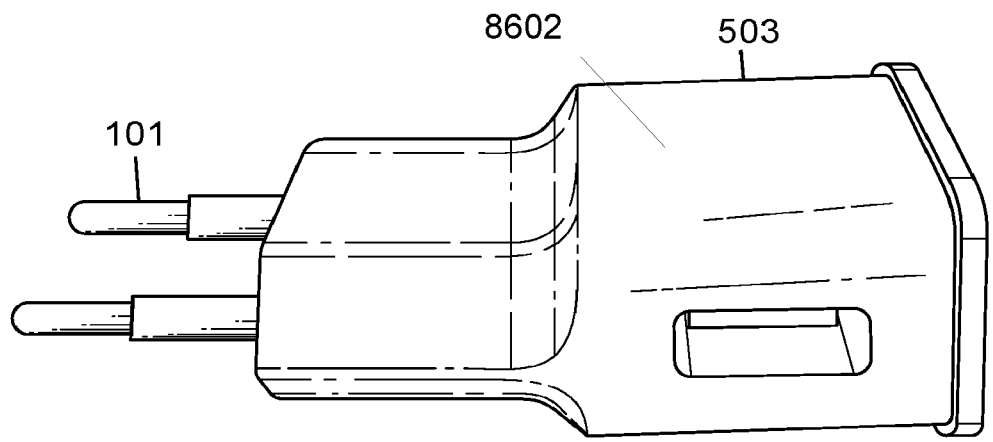
FIG. 16 depicts an elevated side view and elevated rear view of 220 V electrical plug.
Figure 17:
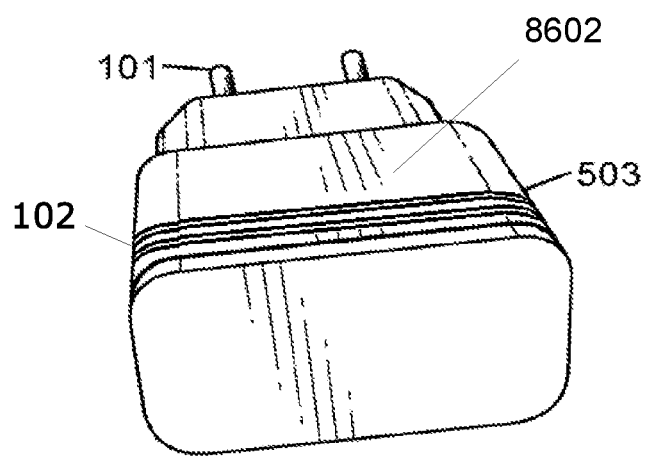
FIG. 17 depicts an elevated rear view of the 220 V electrical plug, in an embodiment which further comprises a top card swipe slot.
Figure 18:
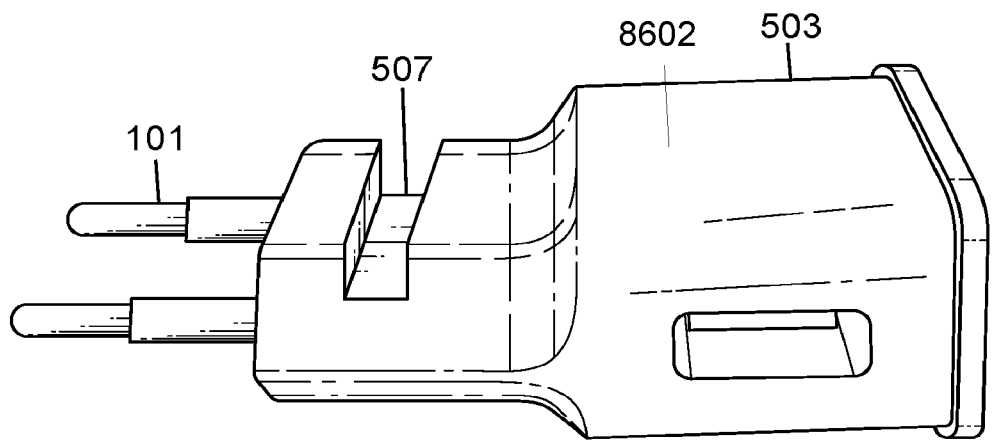
FIG. 18 depicts an elevated side view of the 220 V electrical plug having an embodiment of vertical holding stopper.

FIGS. 16 and 17 depicts elevated side view and elevated rear view of 220 V electrical plug. In an embodiment, FIG. 18 depicts perspective view of the 220 V electrical plug according to one of the embodiments of the present invention. Another different type of the 220 V electrical charger 503 with at least one holding slot 507; and Pins 101 for fitting said main unit 503 with an electric power source. The electrical device charger (i.e. main unit) in the present embodiment is 220 V electrical plug. The holding slot 507 in this embodiment is channel type and it is vertical. The holding slot 507 is located at the top side of the main unit 503. Further, the cable cord (not shown) can be connected to the main unit 503 from front side (see. FIG. 14). The pins 101 in the present embodiment are of round type (normally used for providing 220 V electrical power sources). The electrical devices can be held vertically in the holding slot 507, in the present embodiment it is of channel type, in which an electrical device is securely placed.

Figure 19:
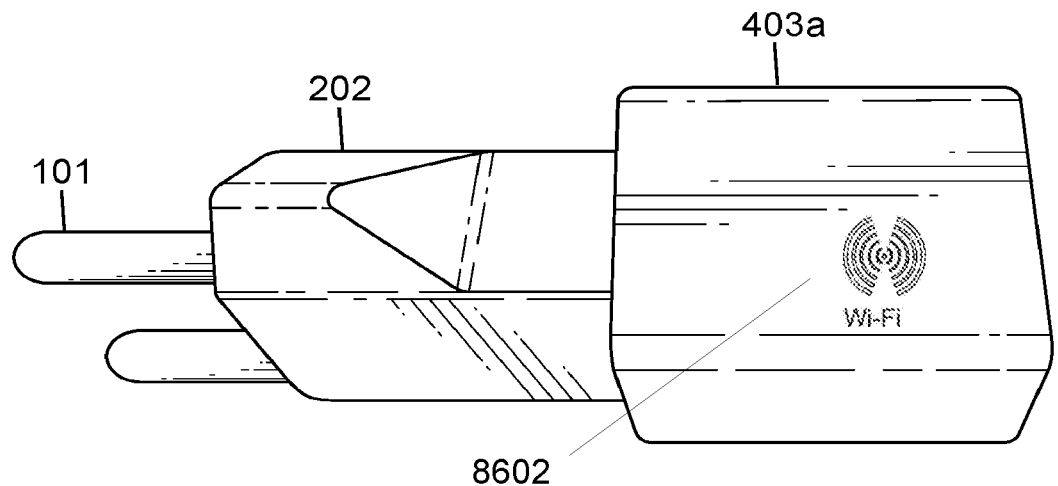
FIG. 19 depicts an elevated side view of the normal assembled arrangement including 220 V electrical adapter and 110 V electrical plug.
Figure 20:
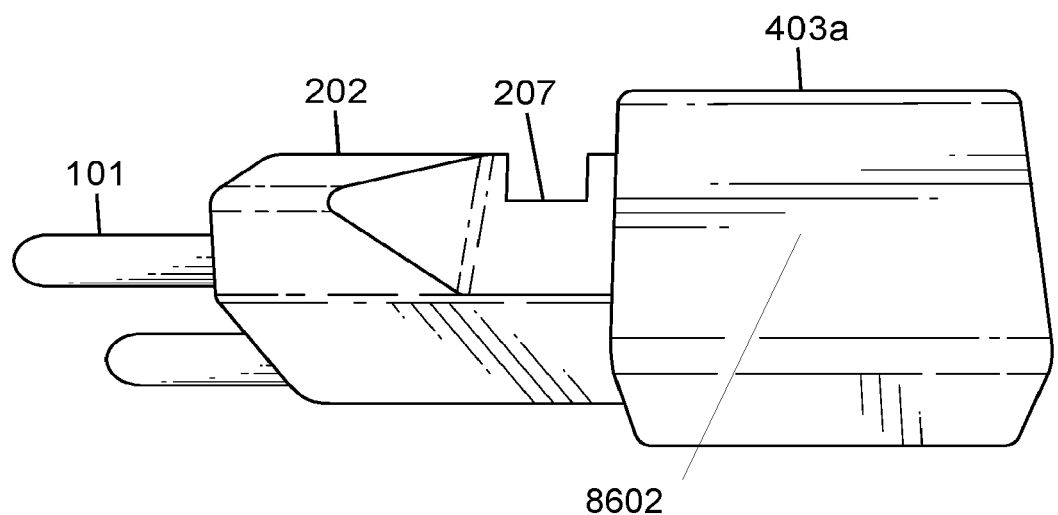
FIG. 20 depicts an elevated side view of the assembled arrangement including 220 V electrical adapter and 110 V electrical plug having an embodiment of a device holding stopper.

FIG. 19 depicts elevated side view of the assembled arrangement including a 220 V electrical adapter/housing and 110 V electrical plug/housing. In an embodiment, FIG. 20 depicts elevated side view of the assembled arrangement including 220 V electrical adapter and 110 V electrical plug having embodiment of device holding slot according to one of the embodiments of the present invention. The electrical device charger in the present embodiment is 220 V electrical adapter 202 and 110 V electrical plug 403a. The 220 V electrical adapter 202 has socket arrangement at the front side of the unit to which 110 V flat pin electrical plug 403a can be attached. The holding slot 207 in this embodiment is channel type and it is vertical. The holding slot 207 is located at the top side of 220 V electrical adapter 202 (alternatively one can also think another holding slot can located on top surface 110 V electrical plug 403a—not shown). The pins 101 in the present embodiment are of round type (normally used for providing 220 V electrical power sources). The electrical devices can be held vertically or angled in the holding slot 207. The present embodiment it is of channel type, in which an electrical device securely rests. The main difference between 110 V electrical plug 403 and 403a is that 403 has a device holding slot present which is absent in case of 403a.

Figure 21:
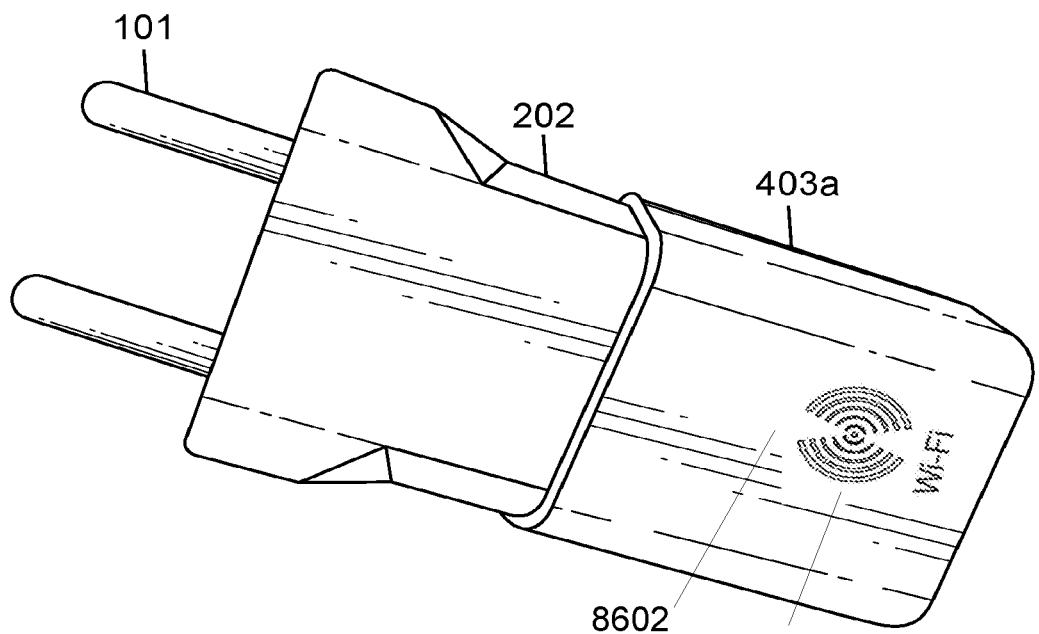
FIG. 21 depicts a top view of the assembled arrangement including 220 V electrical adapter and 110 V electrical plug.
Figure 22:
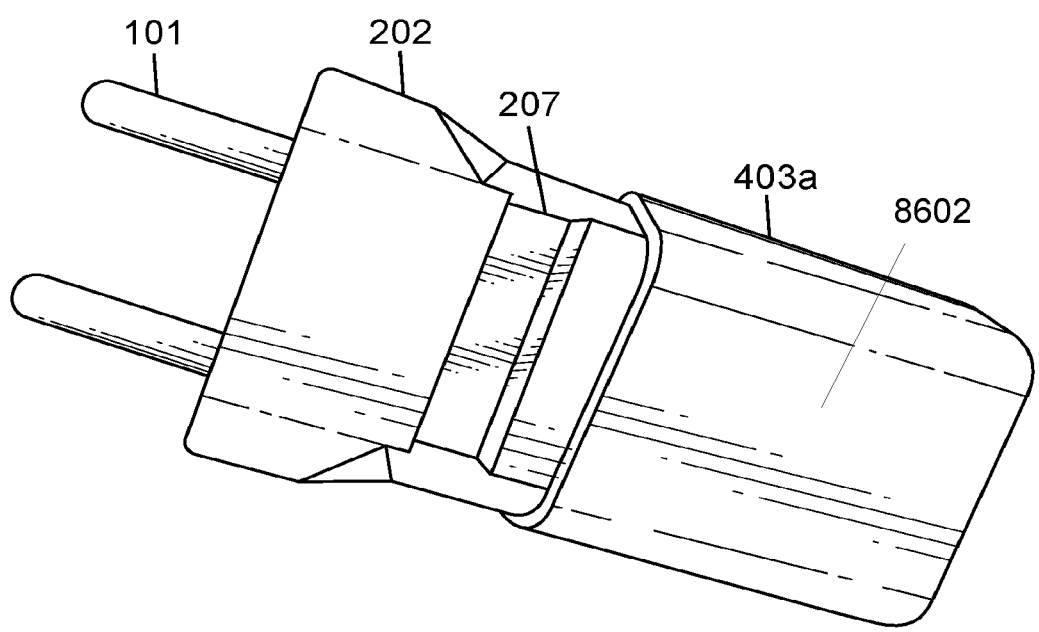
FIG. 22 depicts a top view of the assembled arrangement including 220 V electrical adapter and 110 V electrical plug having an embodiment of device holding stopper.

FIG. 21 depicts top view of the assembled arrangement including 220 V electrical adapter and 110 V electrical plug. In another embodiment, FIG. 22 depicts top view of the assembled arrangement including 220 V electrical adapter and 110 V electrical plug having embodiment of device holding slot according to one of the embodiments of the present invention. FIG. 22 can be described as same way as that of the FIG. 20 description (above).

Figure 23:
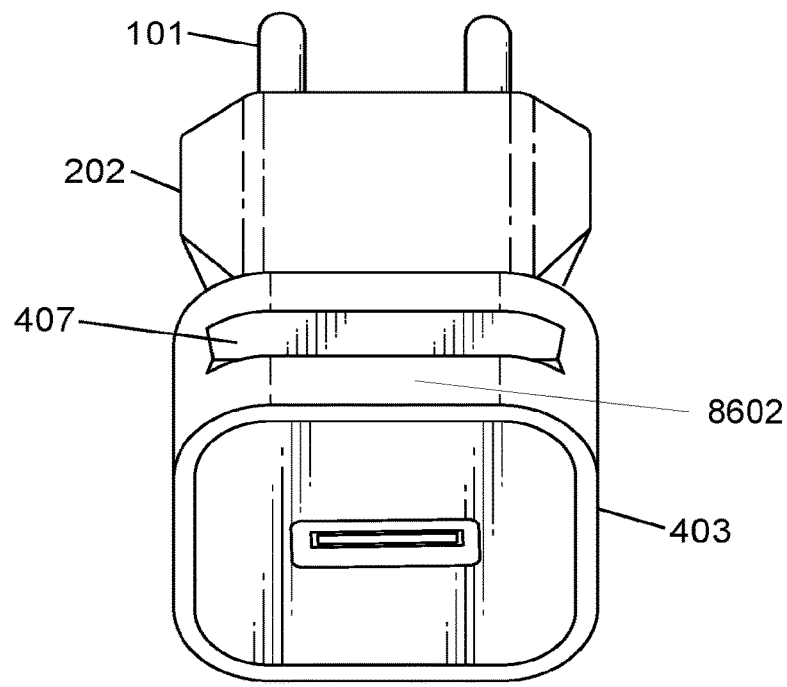
FIG. 23 depicts an elevated rear view of the assembled 220 V adapter and 110 V electrical plug with an embodiment of a device holder channel on a 110 V electrical plug.

In an embodiment, FIG. 23 shows perspective view (from the rear side) of the assembled 220 V adapter and 110 V electrical plug with embodiment device holder slot on 110 V electrical plug. The electrical device charger in the present embodiment is 220 V electrical adapter 202 and 110 V electrical plug 403. The 220 V electrical adapter 202 has socket arrangement at the front side of the unit to which 110 V flat pin electrical plug 403 can be attached (optionally, there is also possibility of making an arrangement to have socket to which 220 V electrical plug can fit). The holding slot 407 in this embodiment is channel type and it is vertical. The holding slot 407 is located at the top side of 110 V electrical adapter 403. The pins 101 in the present embodiment are of round type (normally used for providing 220 V electrical power sources). The electrical devices can be held or on an angle vertically in the holding slot 407, in the present embodiment it is of channel type, in which an electrical device can sits inside.

Figure 24:
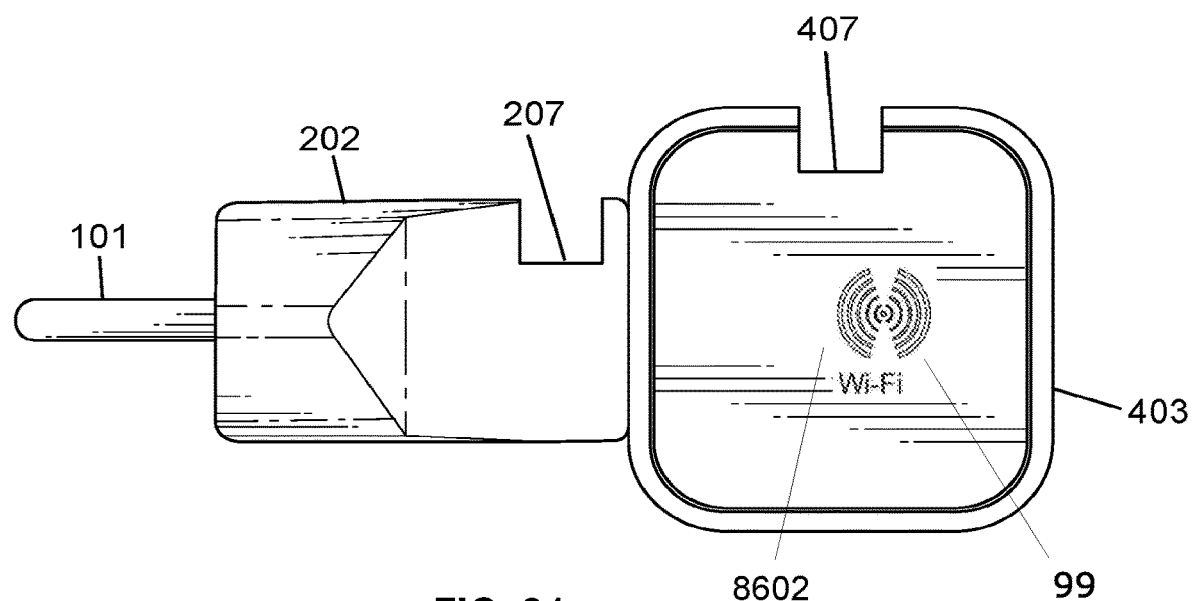
FIG. 24 depicts a side view of the assembled 220 V adapter plug and 110 V electrical plug each having two device holding channels (tandem application).

In an embodiment, FIG. 24 depicts side view of the assembled 220 V adapter plug and 110 V electrical plug each having embodiment device holder slot. The electrical device charger in the present embodiment is 220 V electrical adapter 202 and 110 V electrical plug 403. The 220 V electrical adapter 202 has socket arrangement at the front side of the unit to which 110 V flat pin electrical plug 403 can be attached (optionally, there is also possibility of making an arrangement to have socket to which 220 V electrical plug can fit). The present embodiment has two device holding slots. The device holding slots 207 and 407 in this embodiment are both device channel type and both are vertical. The first holding slot 207 is located at the top side of 220 V electrical adapter 202 and another device holding slot 407 is located at the top side of 110 V electrical plug 403. The pins 101 in the present embodiment are of round type (normally used for providing 220 V electrical power sources). The electrical devices can be held vertically or at an angle in the device holding slots 207 and 407, in the present embodiment it is of channel type, in which electrical devices (which is being charged) can held securely.

Figure 25:
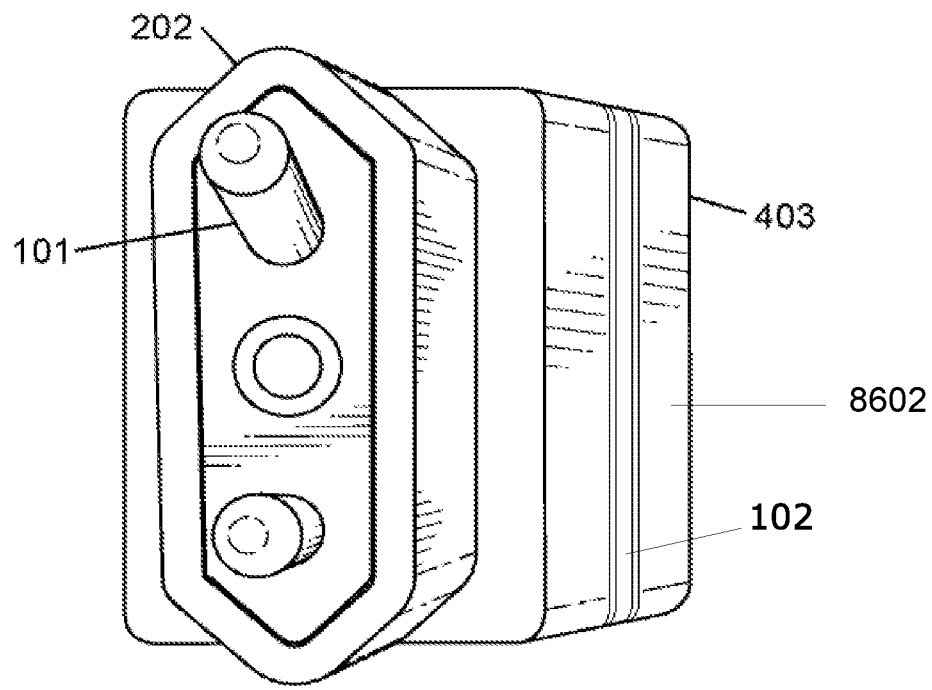
FIG. 25 depicts an end view (from rear side) of the assembled 220 V adapter plug and 110 V electrical plug and a card swipe reader.
Figure 26:
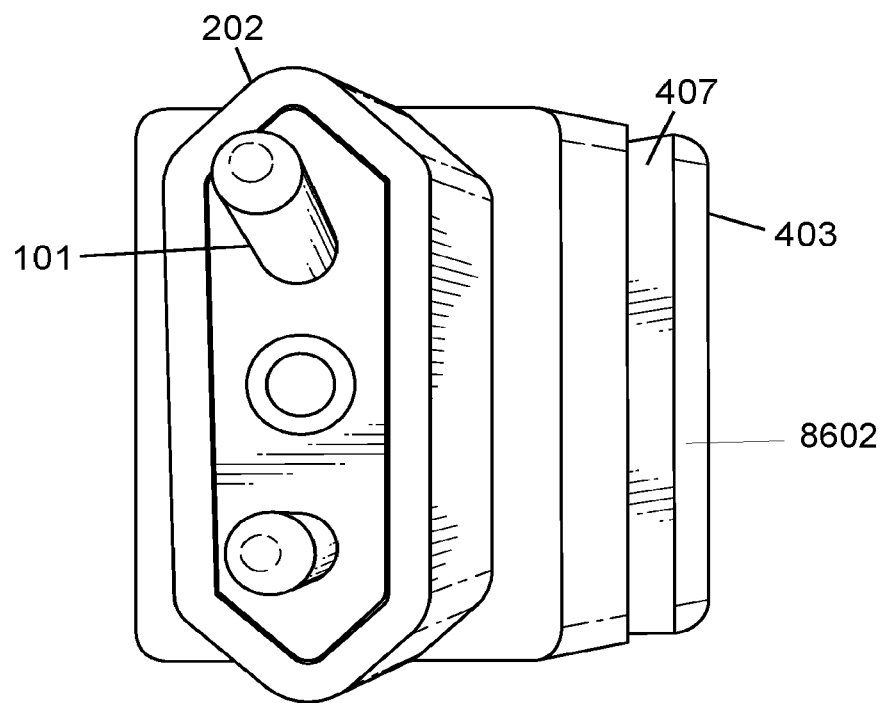
FIG. 26 depicts an end view (from rear side) of the assembled 220 V adapter plug and 110 V electrical plug with an embodiment device holder channel.

FIG. 25 depicts end view (from rear side) of the assembled 220 V adapter plug and 110 V electrical plug. In an embodiment, FIG. 26 depicts an end view (from rear side) of the assembled 220 V adapter plug and 110 V electrical plug with embodiment device holder slot. The assembled arrangement of FIG. 26 can be described same way as that earlier described assembly of FIG. 23.

Figure 27:
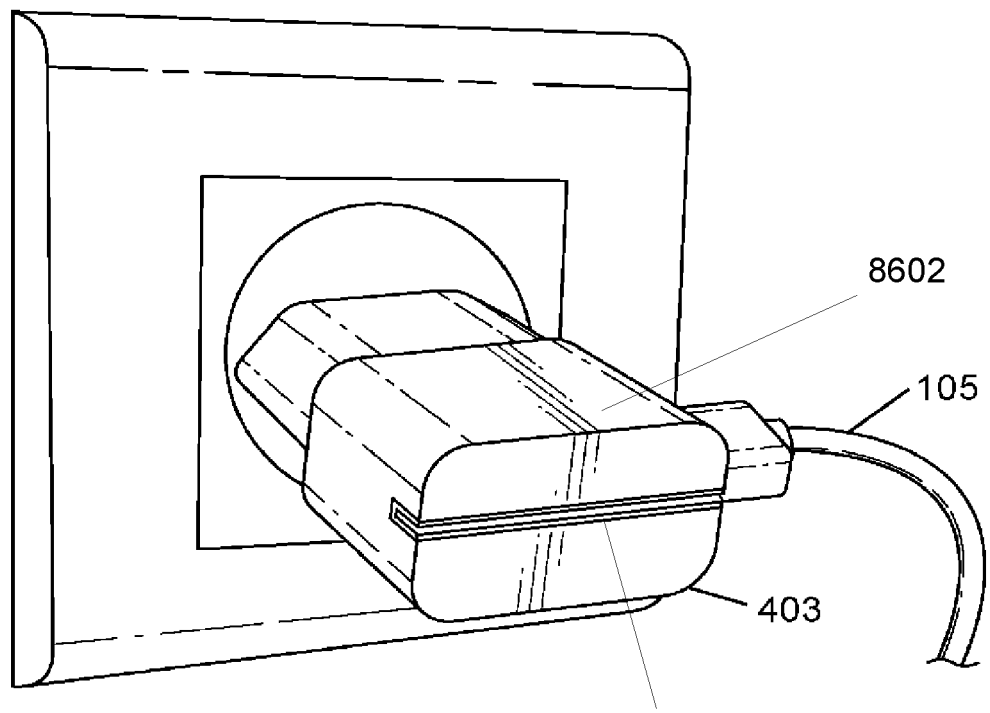
FIG. 27 depicts a view of the 220 V electrical plug mounted or connected on the electrical outlet.
Figure 28:
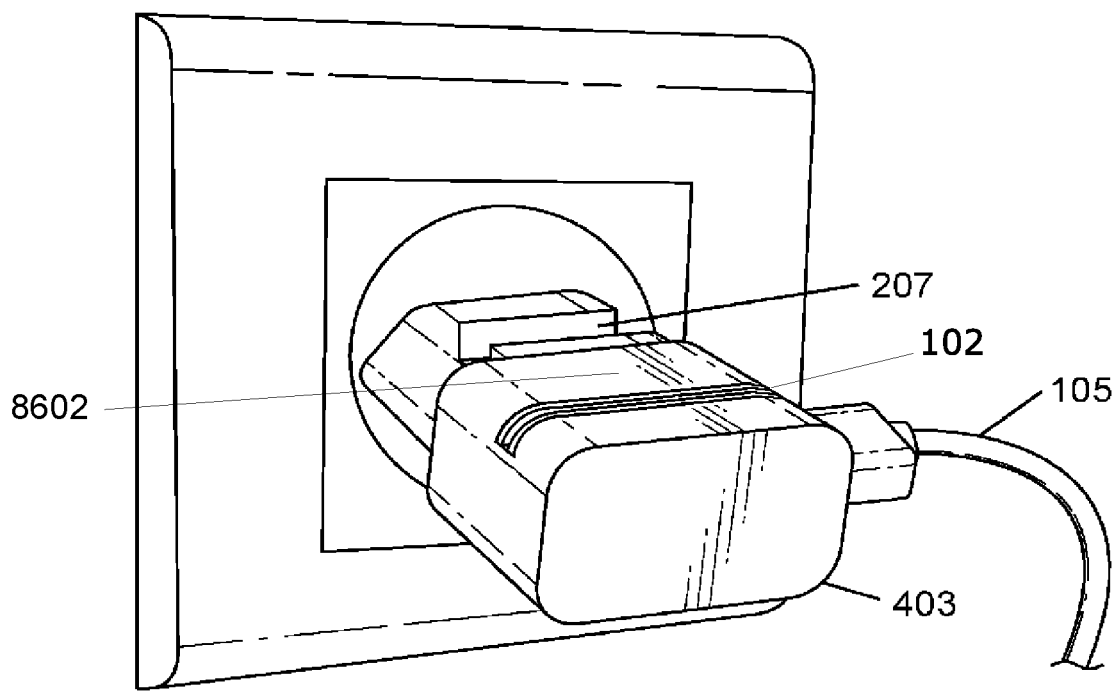
FIG. 28 depicts a view of the 220 V electrical plug having a device holding channel according to one of the embodiments of the present invention mounted on the electrical outlet.

FIG. 27 depicts view of the normal 220 V electrical plug mounted or connected on the electrical outlet. In an embodiment, FIG. 28 depicts view of the 220 V electrical plug having device holding slot according to one of the embodiments of the present invention connected or attached on the electrical outlet. Another different type of the 220 V electrical charger 403 with at least one holding slot 207; and a cable cord 105 for connecting main unit with said electrical devices. The electrical device charger in the present embodiment is 220 V electrical plug. The device holding slot 207 in this embodiment is channel type and it is vertical. The device holding slot 207 is located at the top side of the main unit 403. Further, the cable cord 105 can be connected to the main unit 403 from the side. The electrical devices can be held vertically in the holding slot 207, in the present embodiment it is of channel type, in which an electrical device can held securely. The FIG. 28 clearly shows that how the whole arrangement will look when the electrical charger 403 is connected or attached on the electrical outlet.

Figure 29:
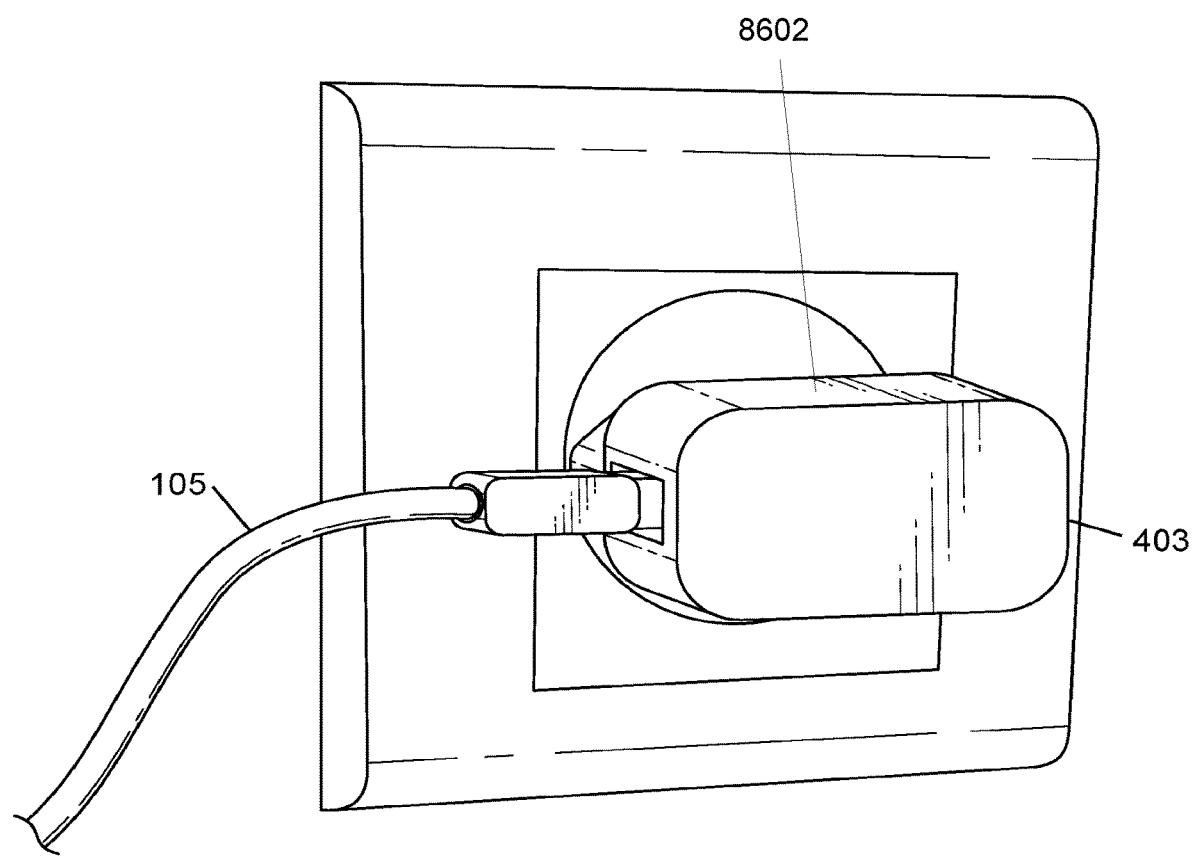
FIG. 29 depicts a view of the 220 V electrical plug in electrical outlet with a cable.
Figure 30:
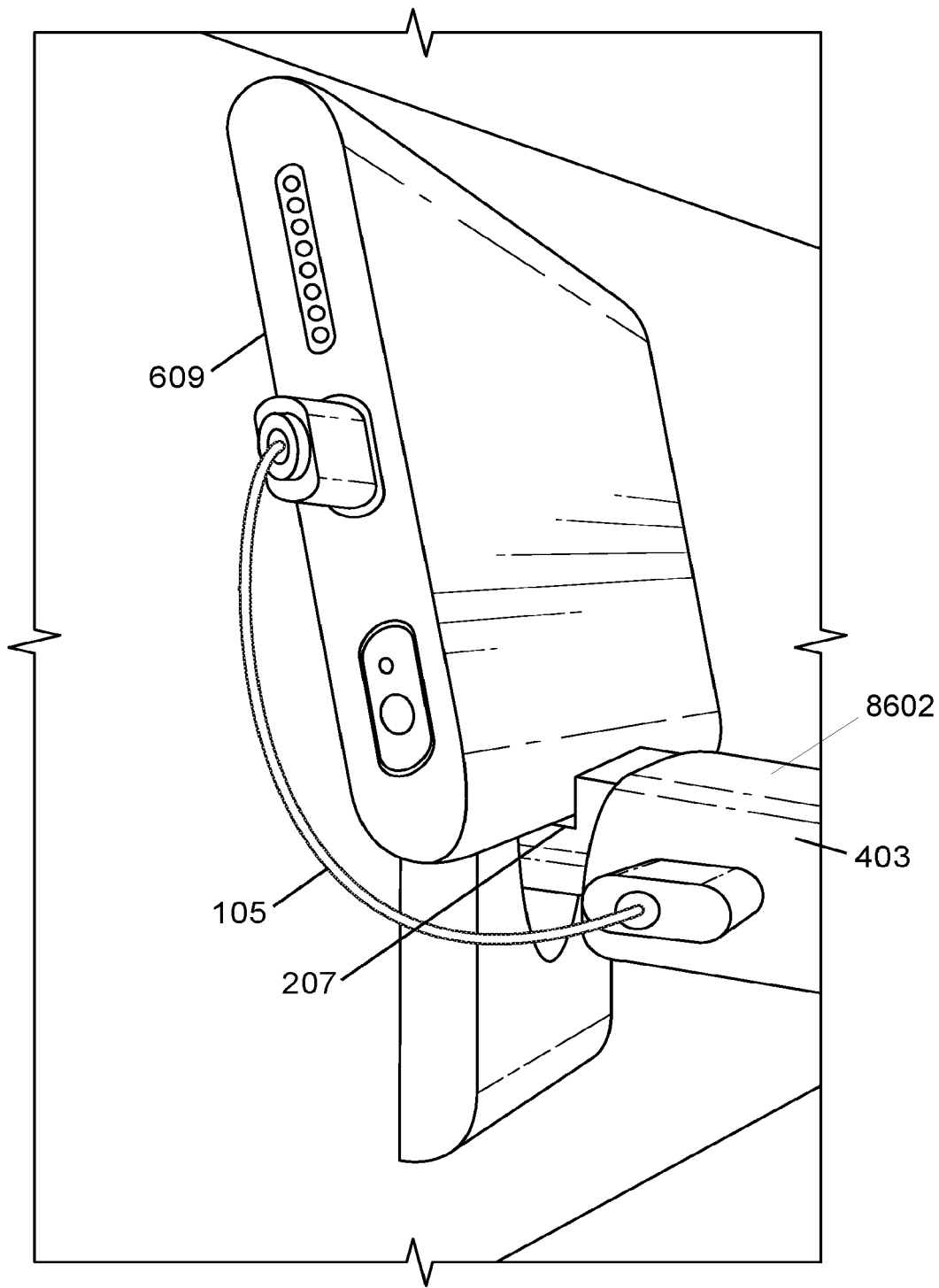
FIG. 30 depicts a view of the electrical device being charged with 220 V electrical plug having an embodiment of a device holding channel.

FIG. 29 depicts view of the 220 V electrical plug in electrical outlet with a cable cord. Further, in an embodiment, FIG. 30 depicts view of the electrical device being charged with 220 V electrical plug having embodiment of device holding slot. FIG. 30 has the same arrangement as discussed for FIG. 28. However, in this FIG. 30 an electrical device 609 is also shown for the clarity purpose. In this arrangement, the electrical device 609 is sitting on vertical holding slot 207, it is on an angle and leaning on the wall on the holding slot 207 and is connected to the electrical charger 403 via USB cable 105. Further, the electrical device 609 is power bank, which is being charged.

Figure 31:
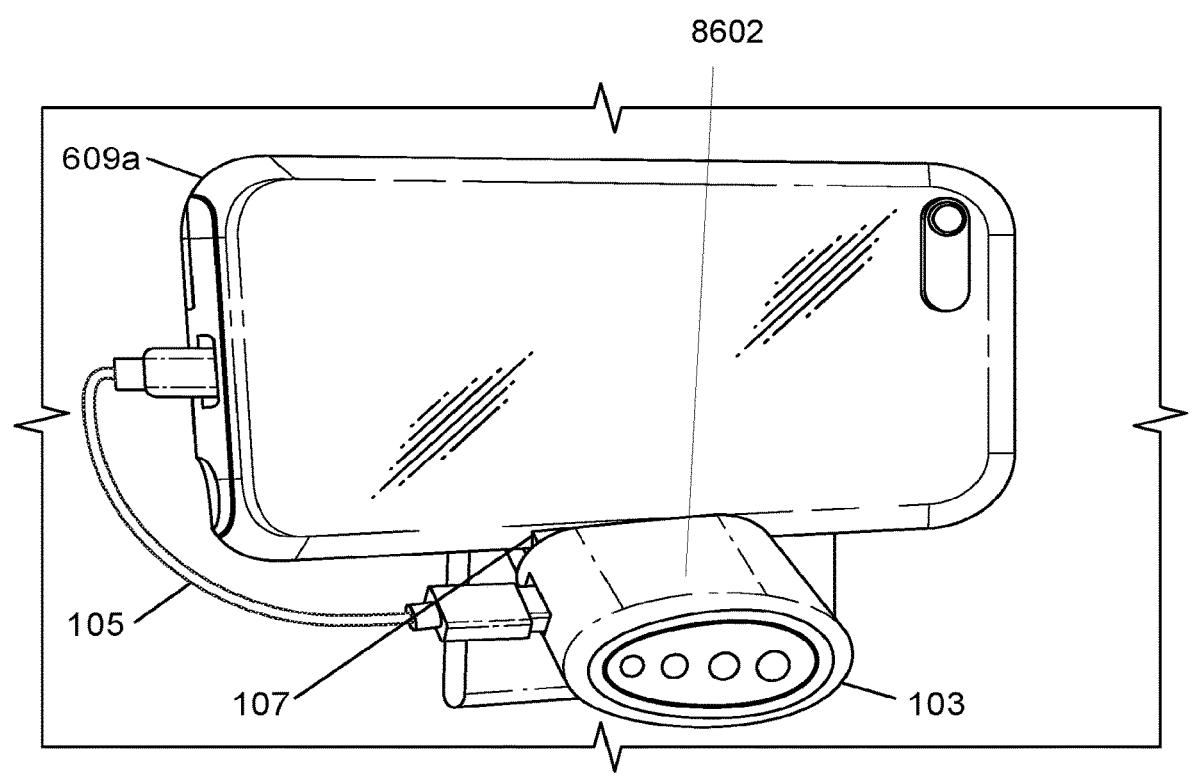
FIG. 31 depicts a perspective view of the electrical device being charged with 220 V electrical plug having an embodiment of a device holding channel.
Figure 32:
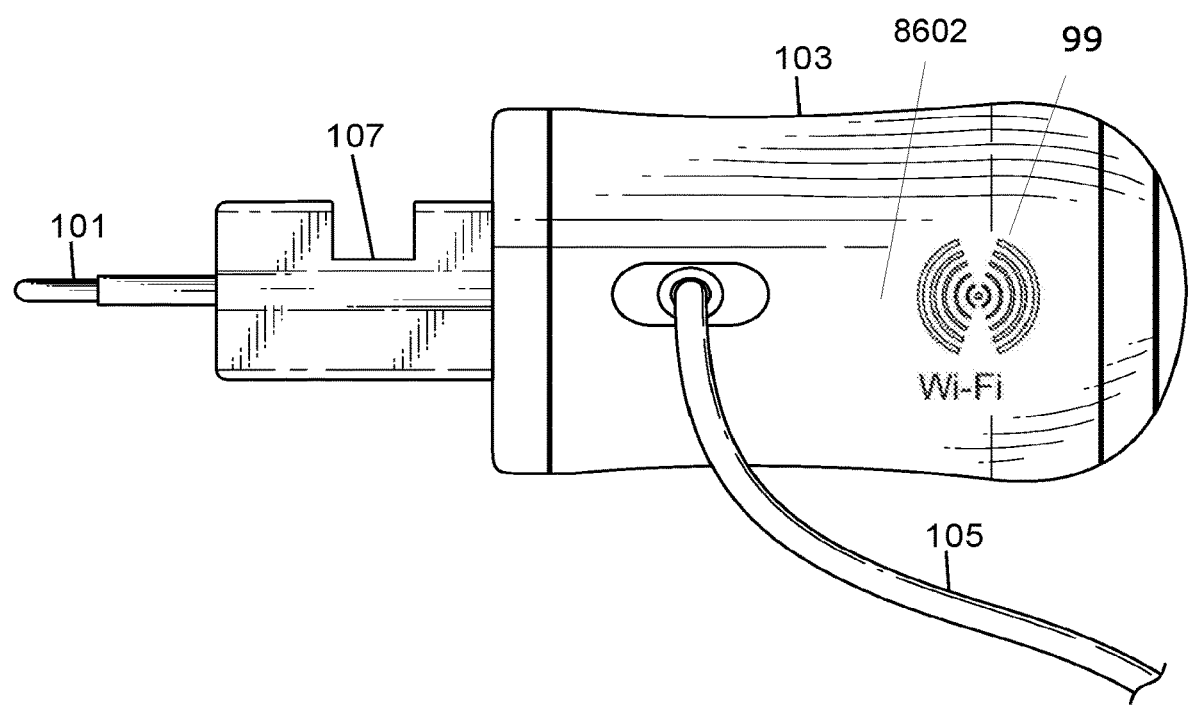
FIG. 32 depicts a side view of the electrical device charger (220 V electrical plug) with vertical device holding channel, one of the embodiments of the present invention.

In an embodiment, FIG. 31 depicts perspective view of the electrical device leaning against the wall being charged with 220 V electrical plug having embodiment of device holding slot. FIG. 32 has the same arrangement as discussed for FIG. 30. However, in this FIG. 32, the electrical device is mobile phone (or smart phone) and the electrical charger is (103) different type than shown in the FIG. 30.

Figure 33:
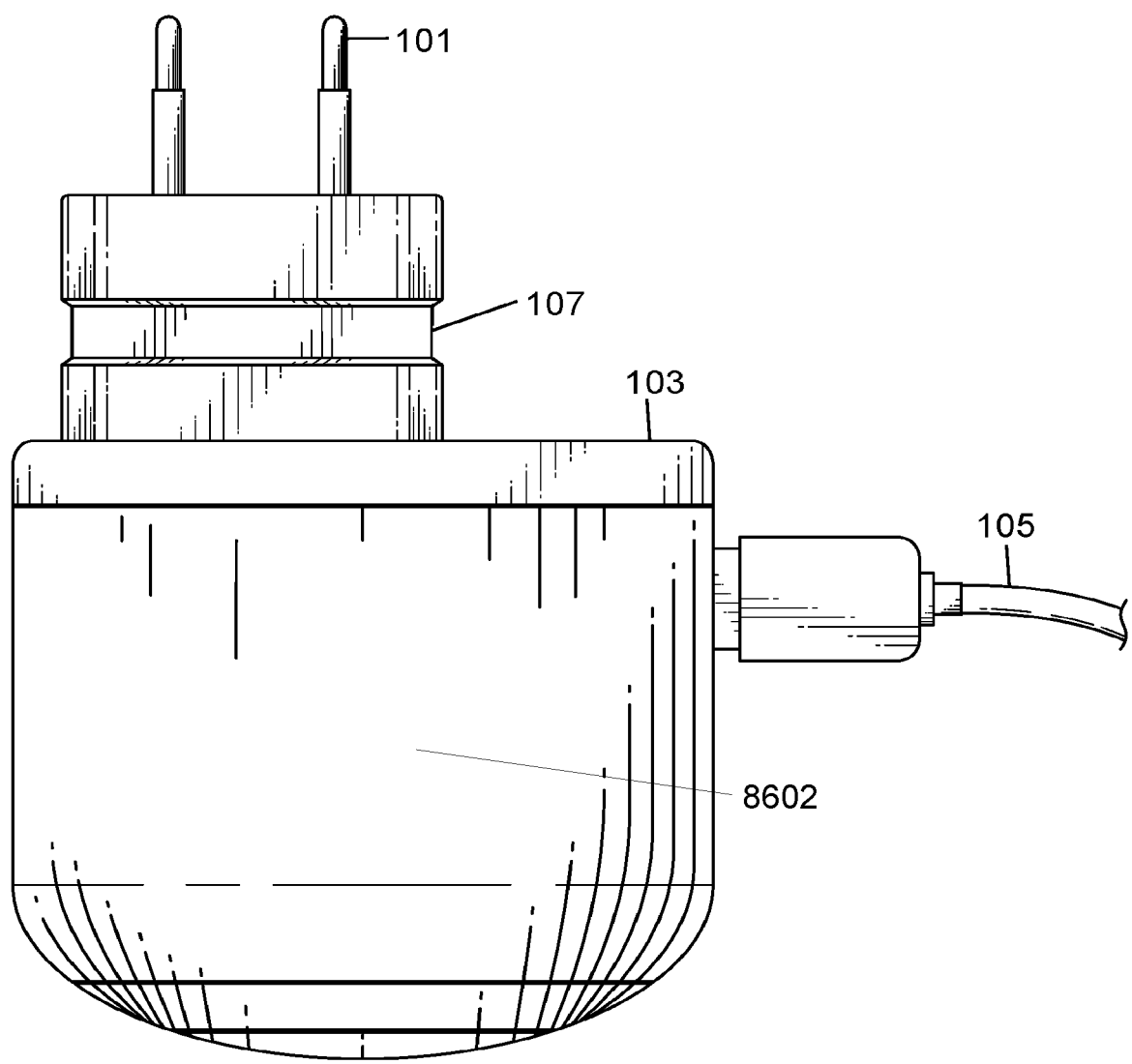
FIG. 33 depicts a top view of the electrical device charger (220 V electrical plug) with vertical holding channel of one of the embodiments of the present invention.

FIG. 32 and FIG. 33 depicts, side view and top view, respectively, of the electrical device charger (220 V electrical plug) with vertical channel type device holding slot, one of the embodiments of the present invention. An electrical device charger with means of holding a plurality of electrical devices (not shown in the picture) which comprises: a main unit 103 with at least one holding slot 107; a cable cord 105 for connecting main unit with said electrical devices; and Pins 101 for fitting said main unit 103 with an electric power source. The electrical device charger (i.e. main unit) in the present embodiment is 220 V electrical plug. The holding slot 107 is channel type and it is vertical, but also includes a u-shaped portion having parallel opposite sides and slanted/tapered portions at an upper end of the parallel sides. The holding slot 107 is located along a top side of the main unit 103. Further, the cable cord 105 is connected to the main unit 103 from one of the sides.

The pins 101 in the present embodiment are of round type (normally used for providing 220 V electrical power sources). The electrical devices can be held vertically in the holding slot 107, in the present embodiment it is of channel type, in which an electrical device can held securely.

Figure 34A:
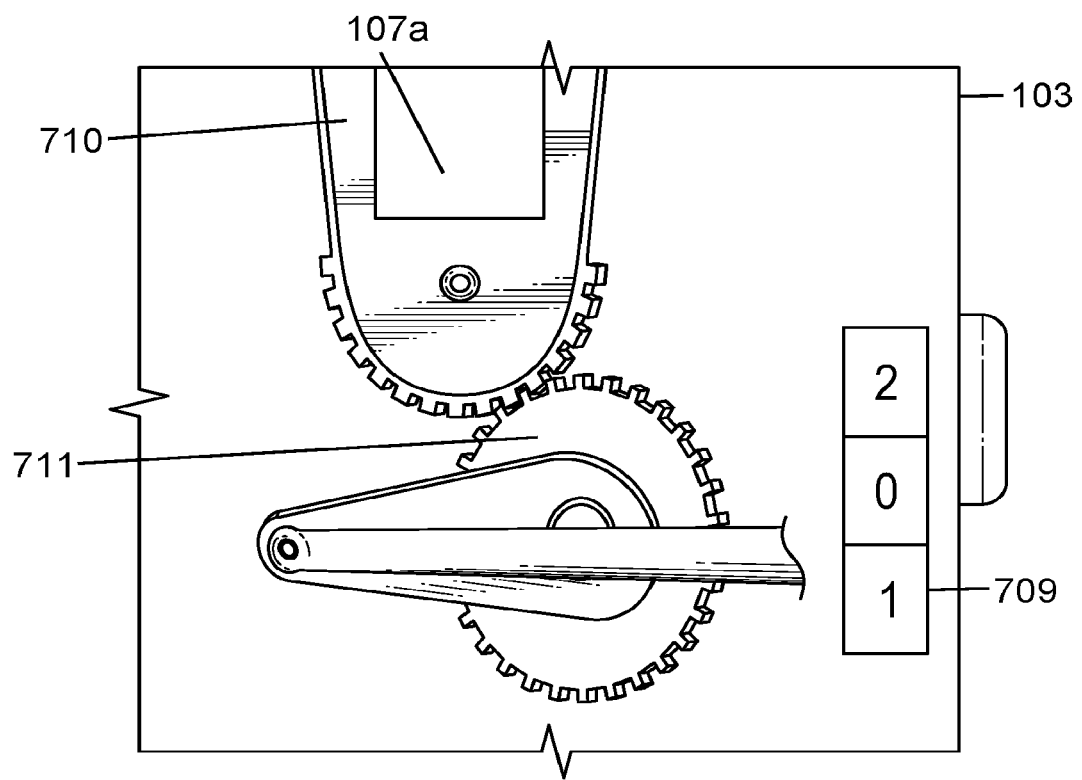
FIG. 34a depicts an adjustable device holding slot assembly mechanism in a vertical position.
Figure 34B:
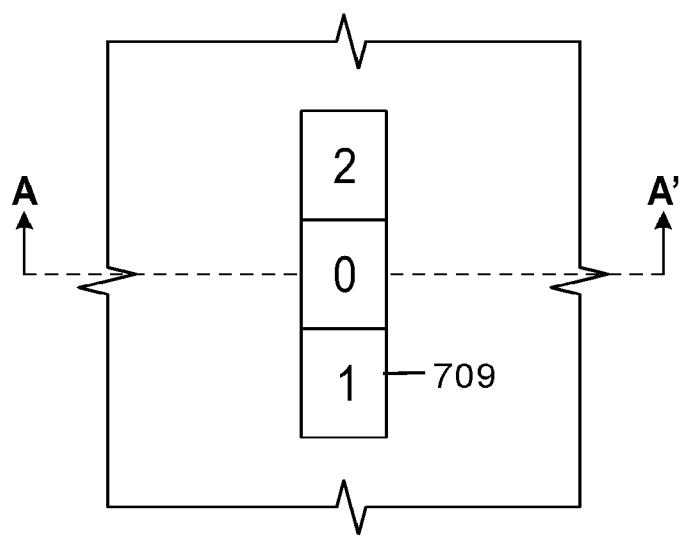
FIG. 34b depicts a dial for a adjustable device holding assembly mechanism in a vertical position.
Figure 35A:
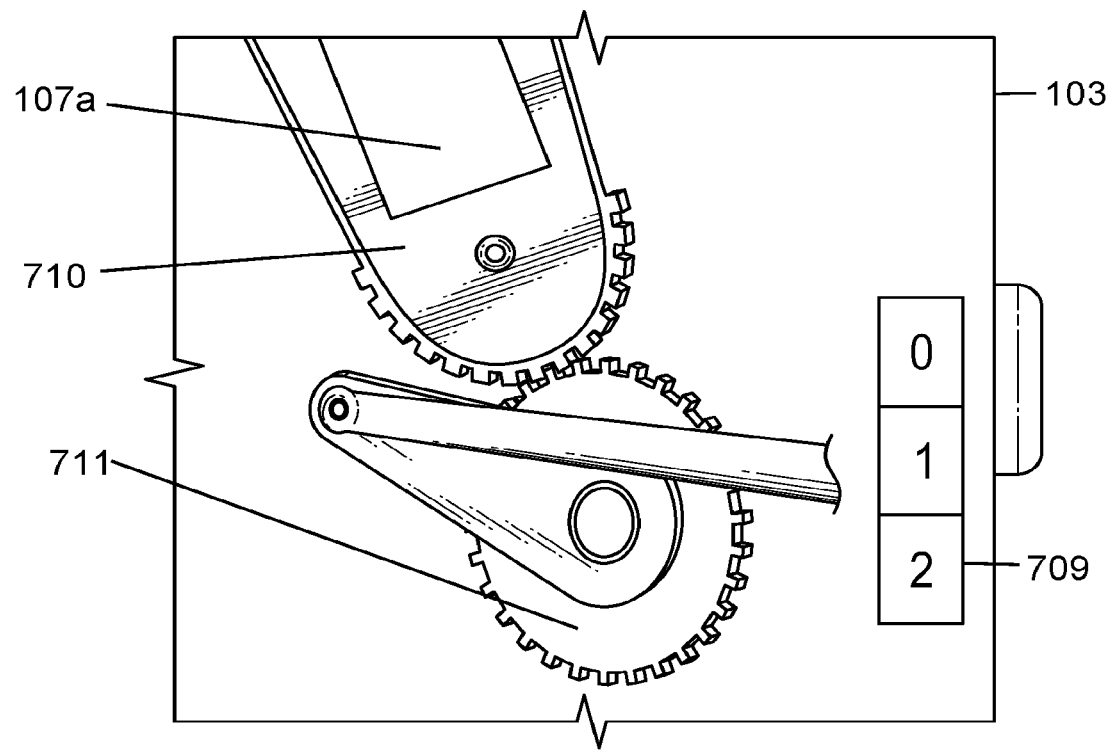
FIG. 35a depicts an adjustable device holding assembly with dial mechanism.
Figure 35B:
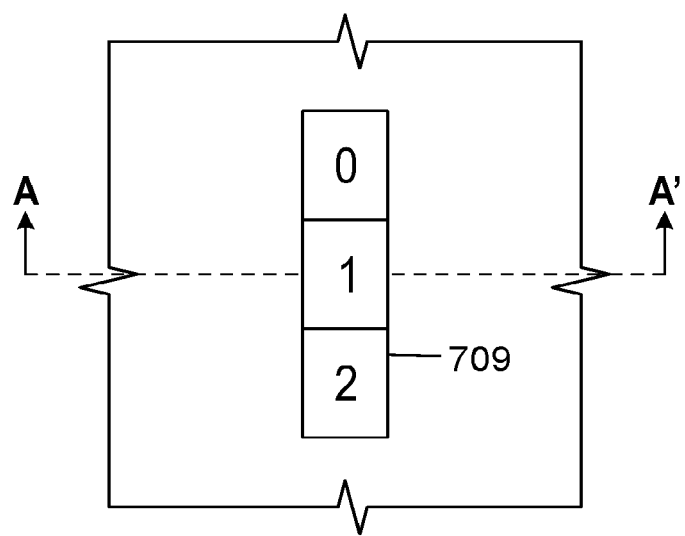
FIG. 35b depicts an adjustable dial for adjustable device holding assembly.
Figure 36:
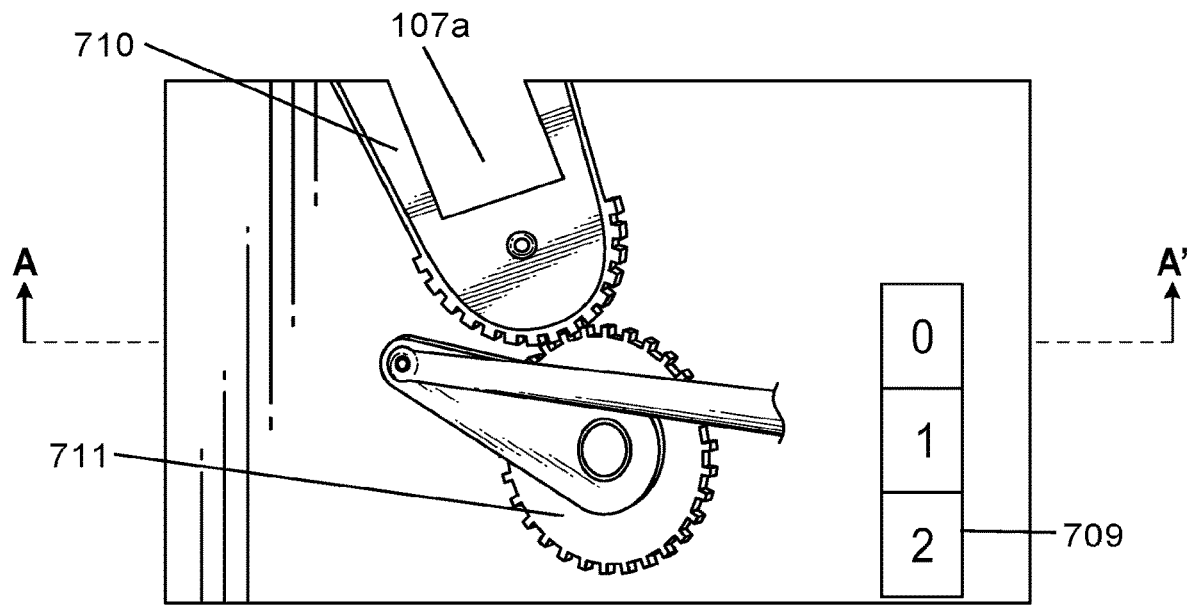
FIG. 36 depicts an adjustable device holding channel in an angled position.
Figure 37:
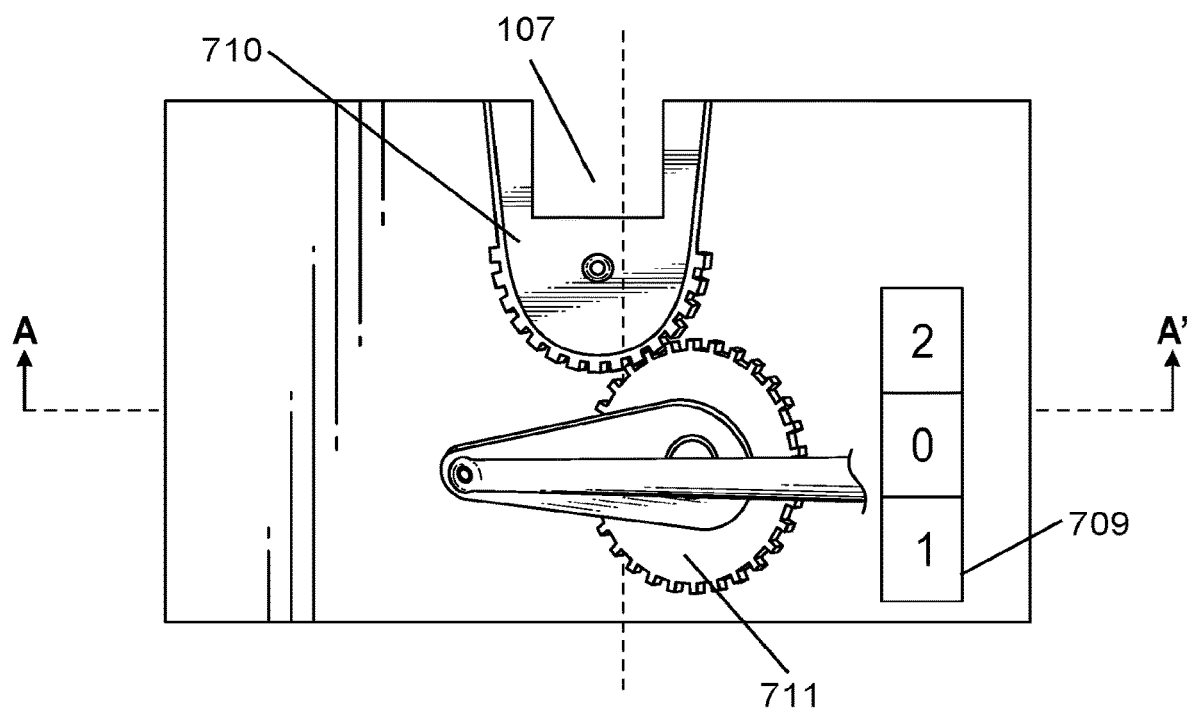
FIG. 37 depicts an adjustable device holding slot in vertical position.
Figure 38A:
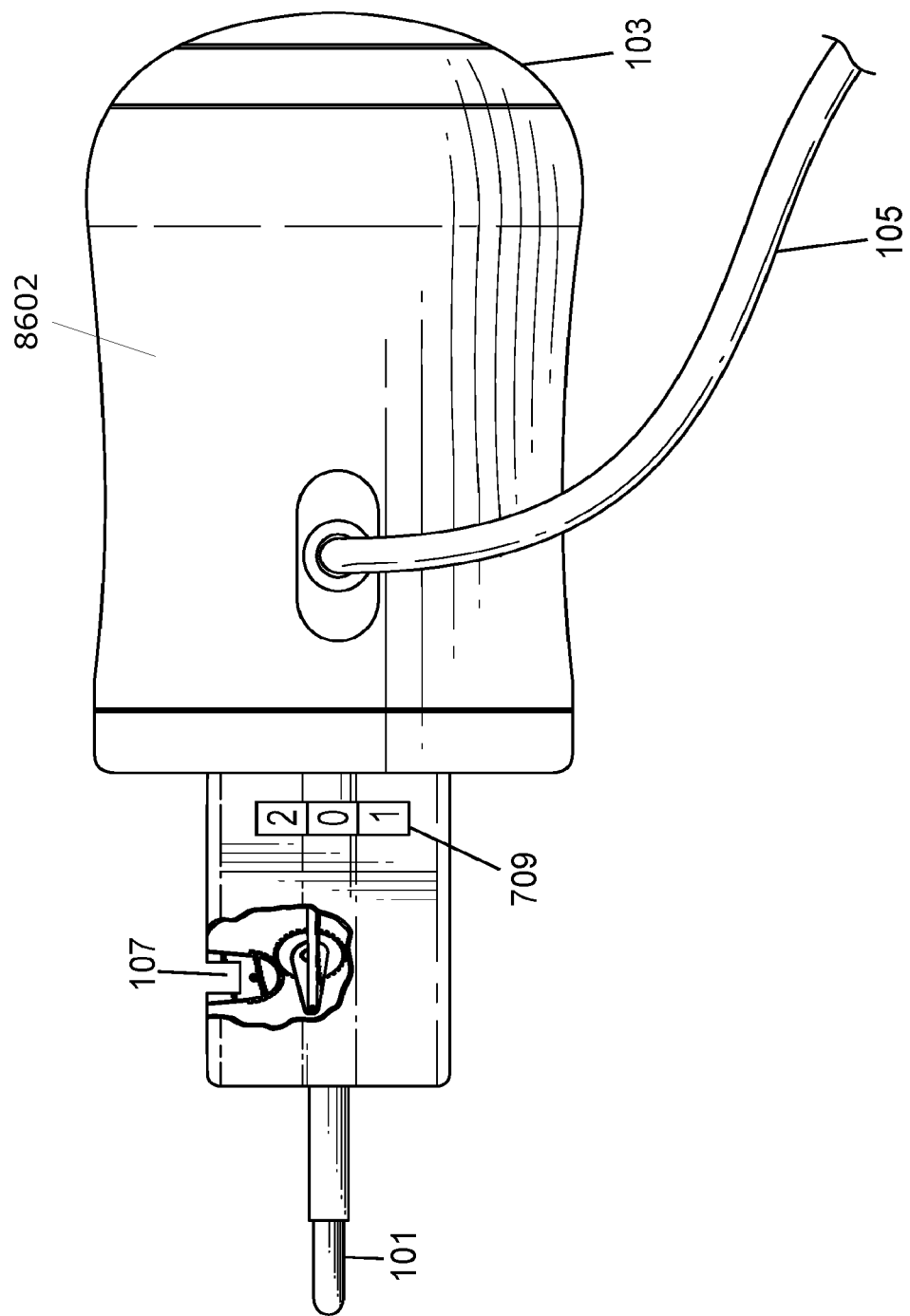
FIG. 38a depicts a 220 V electrical plug with an adjustable device holding slot in vertical position.
Figure 38B:
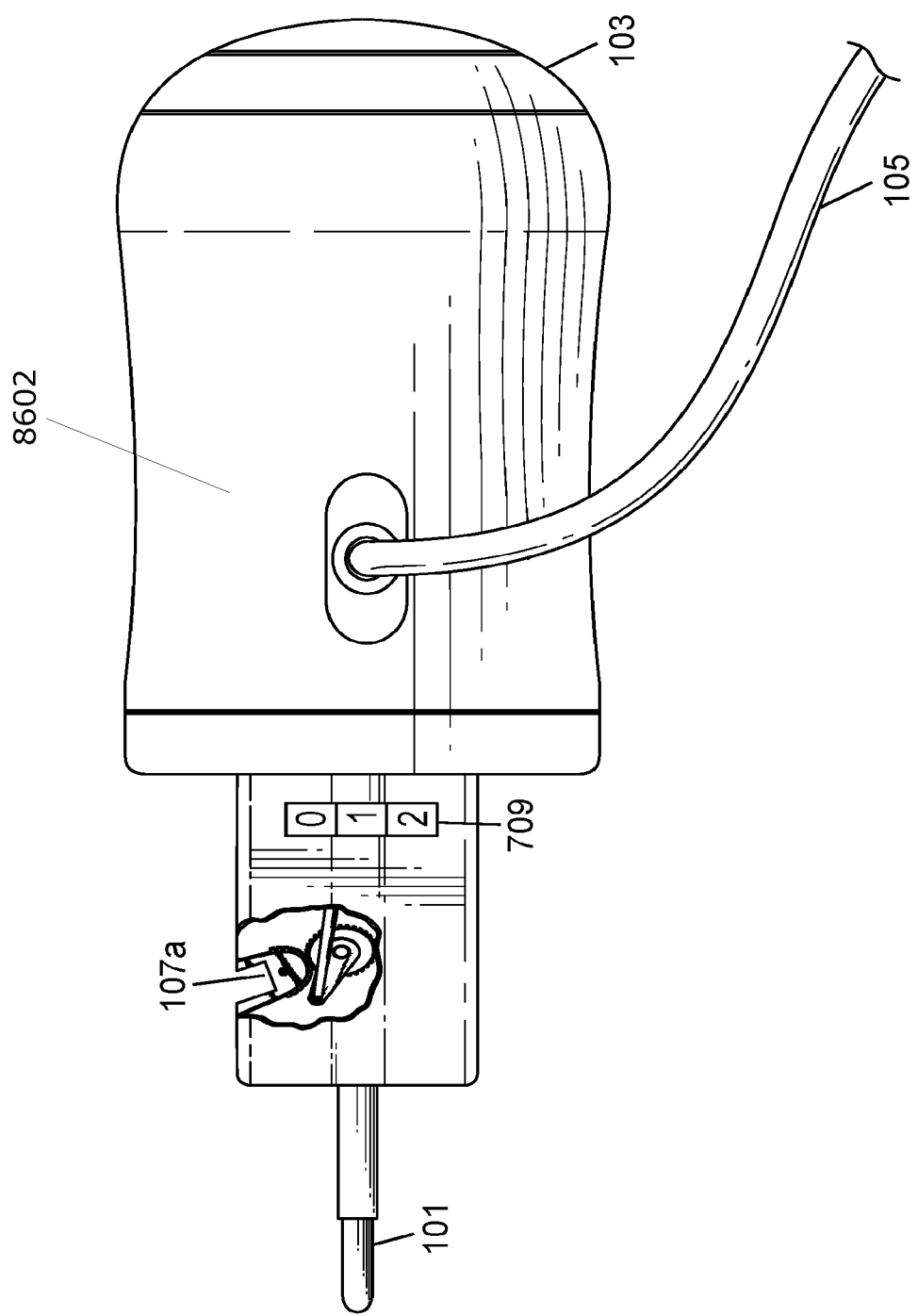
FIG. 38b depicts a 200 V electrical plug with an adjustable device holding slot in angled position.

In an embodiment, the present invention relates to an electrical device charger with means of adjusting the angle of the device holding slot. FIG. 34 to FIG. 38 shows an embodiment of how a device charger may look inside it and how it can function to adjust the inclination of the device held. FIG. 34a depicts adjustable device holding slot assembly mechanism in the vertical position. FIG. 34b depicts a dial for adjusting the device holding assembly mechanism for various angles to hold the device being charged. FIG. 35a depicts adjustable device holding assembly embodiment segmented planetary gear assembly with dial mechanism. FIG. 35b depicts adjustable dial for adjustable device holding assembly. The assembly mechanism mainly functions like a gear-type arrangement and having mainly one half-circle gear 710 and full-circle gear 711. The half-circle gear 710 comprises holding slot 107a, which has exposure outside of the electrical device charger to securely hold an electrical device. Teeth of the half-circle gear 710 are meshes with the full-circle gear 711. The full-circle gear 711 is attached or connected with the dial 709. When the half-circle gear 710 is in the vertical position then the dial position is 2, 0, 1 (FIG. 34b). When the half-circle gear 710 is in the angled position then the dial position is 0, 1, 2 (FIG. 35b). FIG. 36 depicts adjustable device holding slot in angled position. FIG. 37 depicts adjustable device holding slot in vertical position. For further the clarity purpose, FIG. 38 represents how holding assembly mechanism will look like inside the electrical device charger. FIG. 38a depicts 220 V electrical plug with adjustable device holding slot in vertical position. FIG. 38b depicts an electrical plug with an adjustable device holding slot/channel in angled position.

Figure 39:
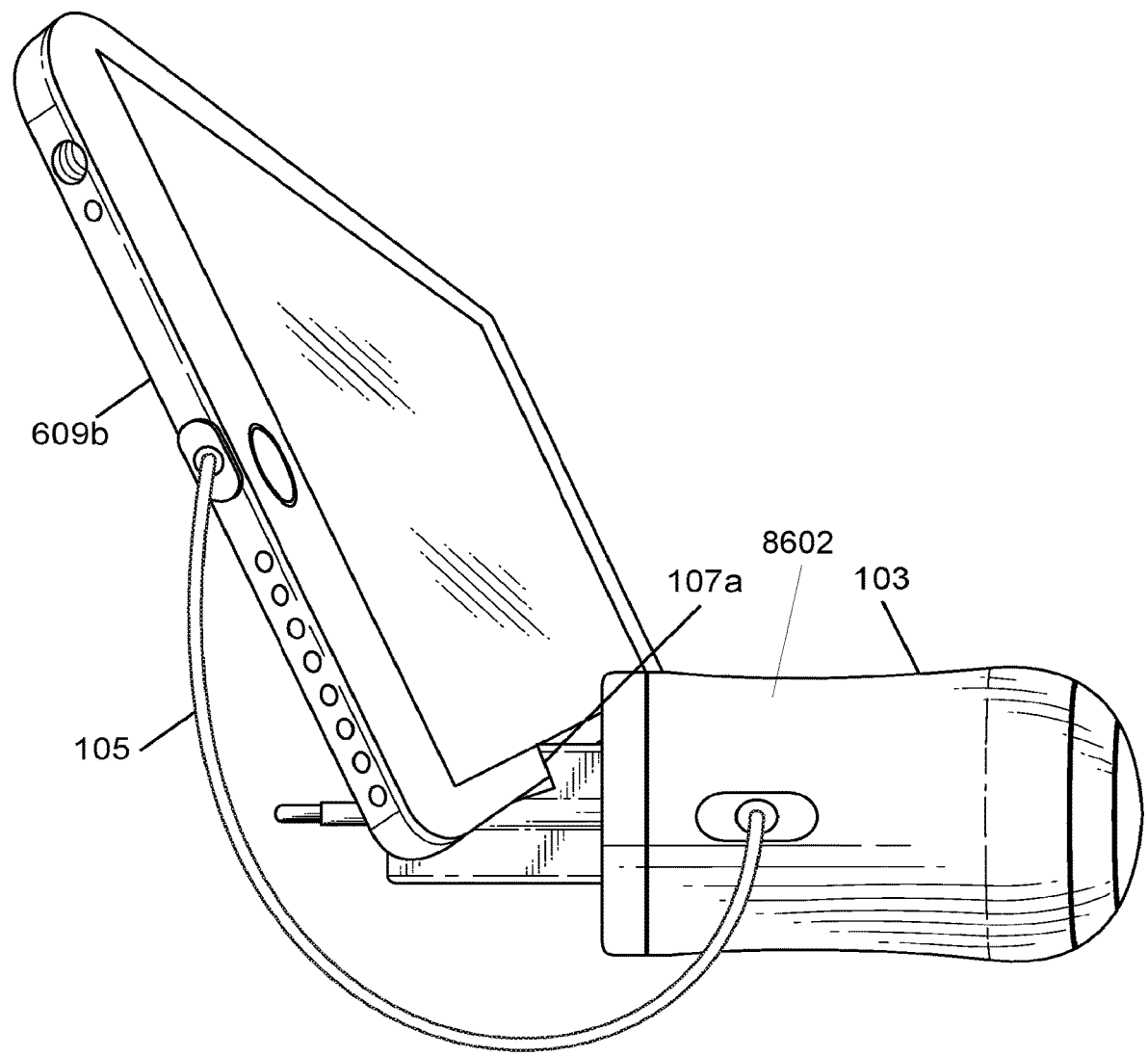
FIG. 39 depicts a 220 V electrical plug with an angled device holding slot in an embodiment holding an electrical device charging cell phone.
Figure 40:
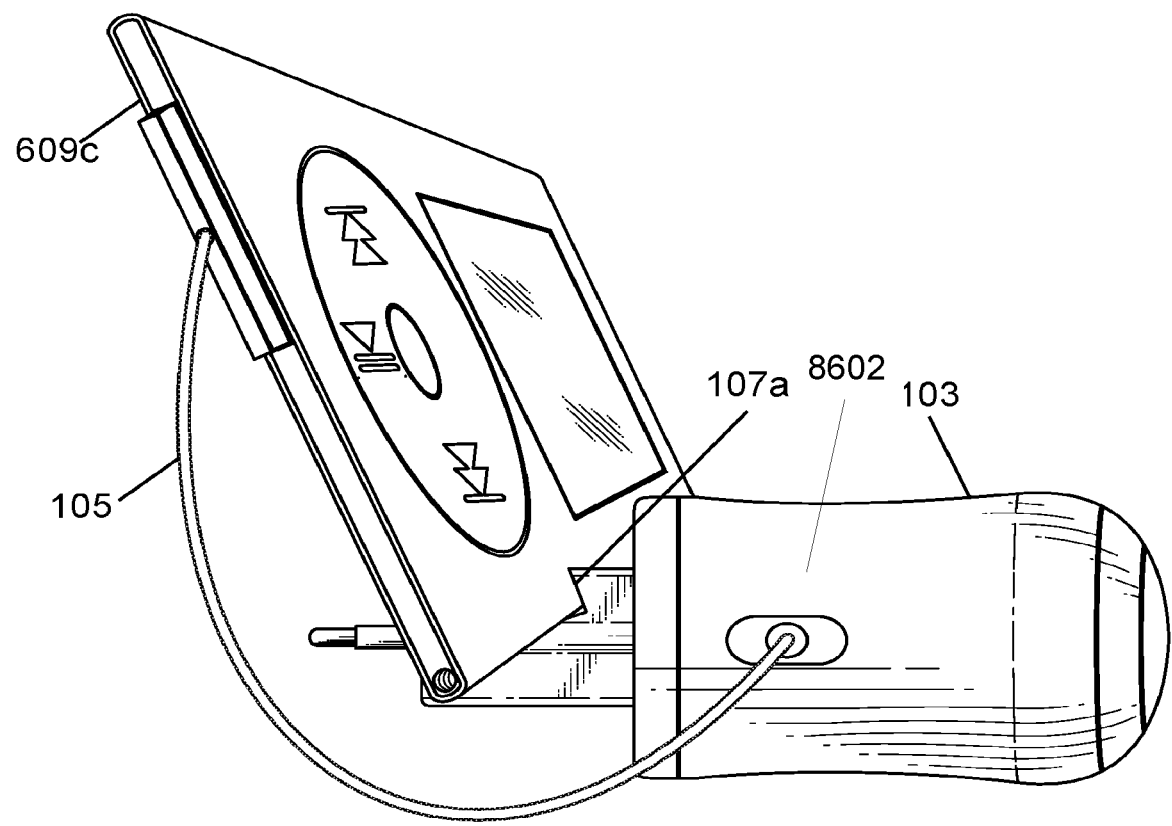
FIG. 40 depicts a 220 V electrical plug with an angled device holding slot in an embodiment holding electrical device charging CD player.
Figure 41:
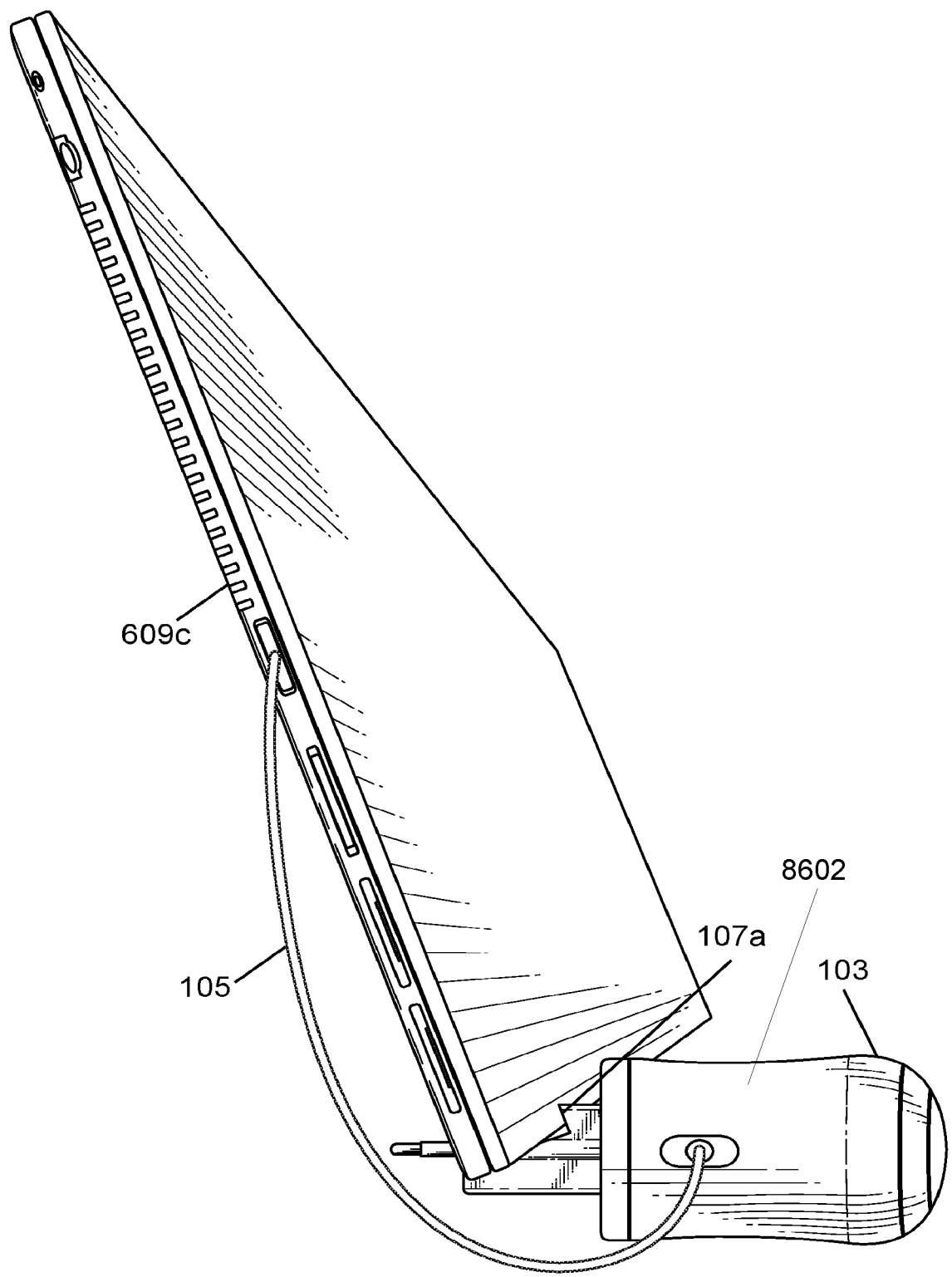
FIG. 41 depicts a 220 V electrical plug with an embodiment of an angled device holding slot charging laptop.

In embodiments, FIG. 39 to 41 depicts electrical plug with angled device holding slot embodiment holding electrical devices, such as cell phone, CD player, and laptop, respectively. An electrical device charger with means of holding a plurality of electrical devices (not shown in the picture) which comprises: a main unit 103 with at least one holding slot 107a; a cable cord 105 for connecting main unit with said electrical devices; and Pins 101 for fitting said main unit 103 with an electric power source. The electrical device charger (i.e. main unit) in the present embodiment is 220 V electrical plug. The holding slot 107a in this embodiment is channel type and it is angled. The holding slot 107a is located at the top side of the main unit 103. Further, the cable cord 105 is connected to the main unit 103 from one of the sides. The pins 101 in the present embodiment are of round type (normally used for providing 220 V electrical power sources). The electrical devices 609a, 609b, and 609e (respectively in FIGS. 39 to 41) can be held or on an angle in the holding slot 107a, in the present embodiment it is of channel type, in which an electrical device held securely in the device holding channel.

Figure 42:
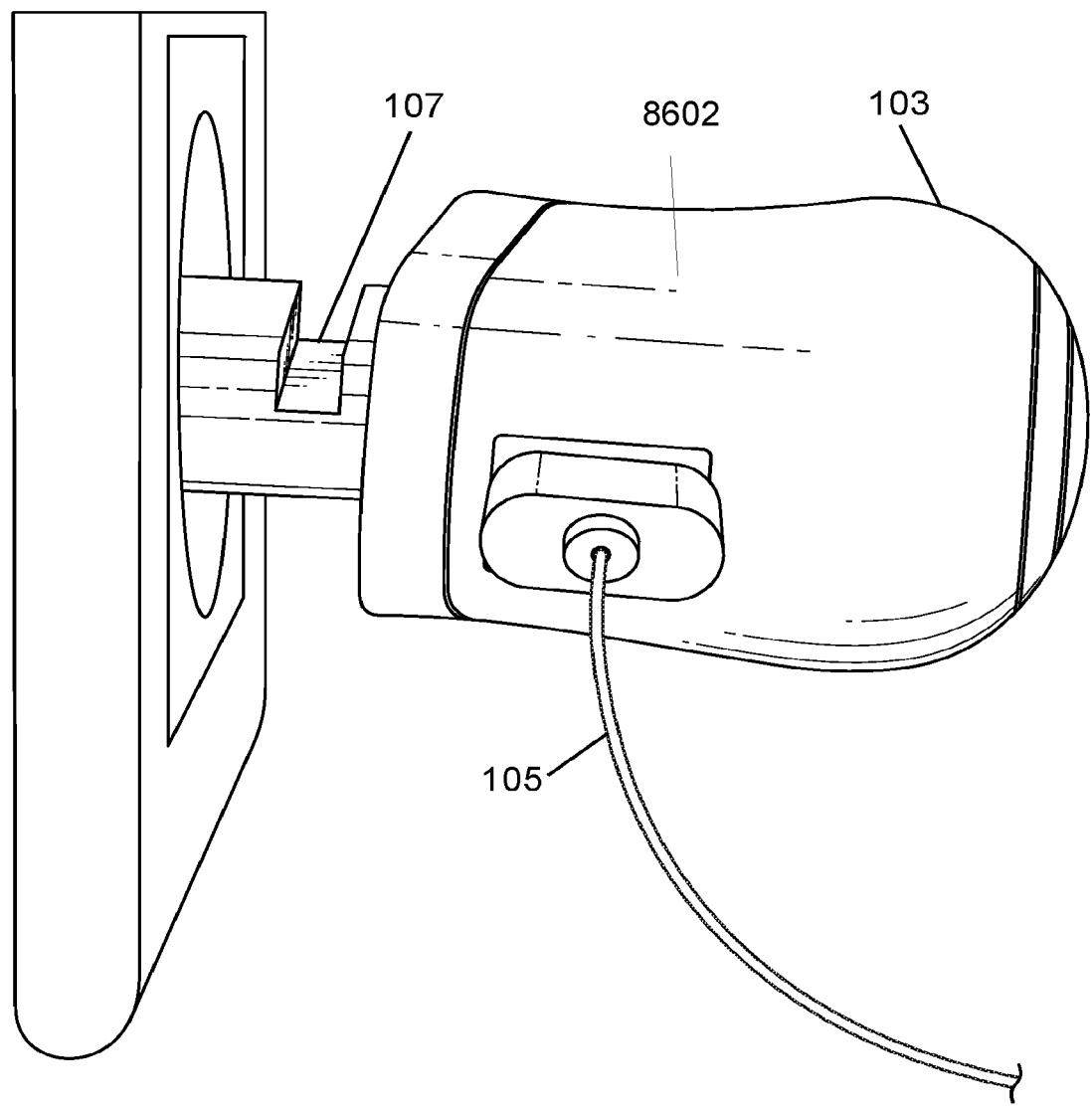
FIG. 42 depicts elevated side view 220 V charger with an embodiment of a vertical device holding slot in electrical outlet.
Figure 43:
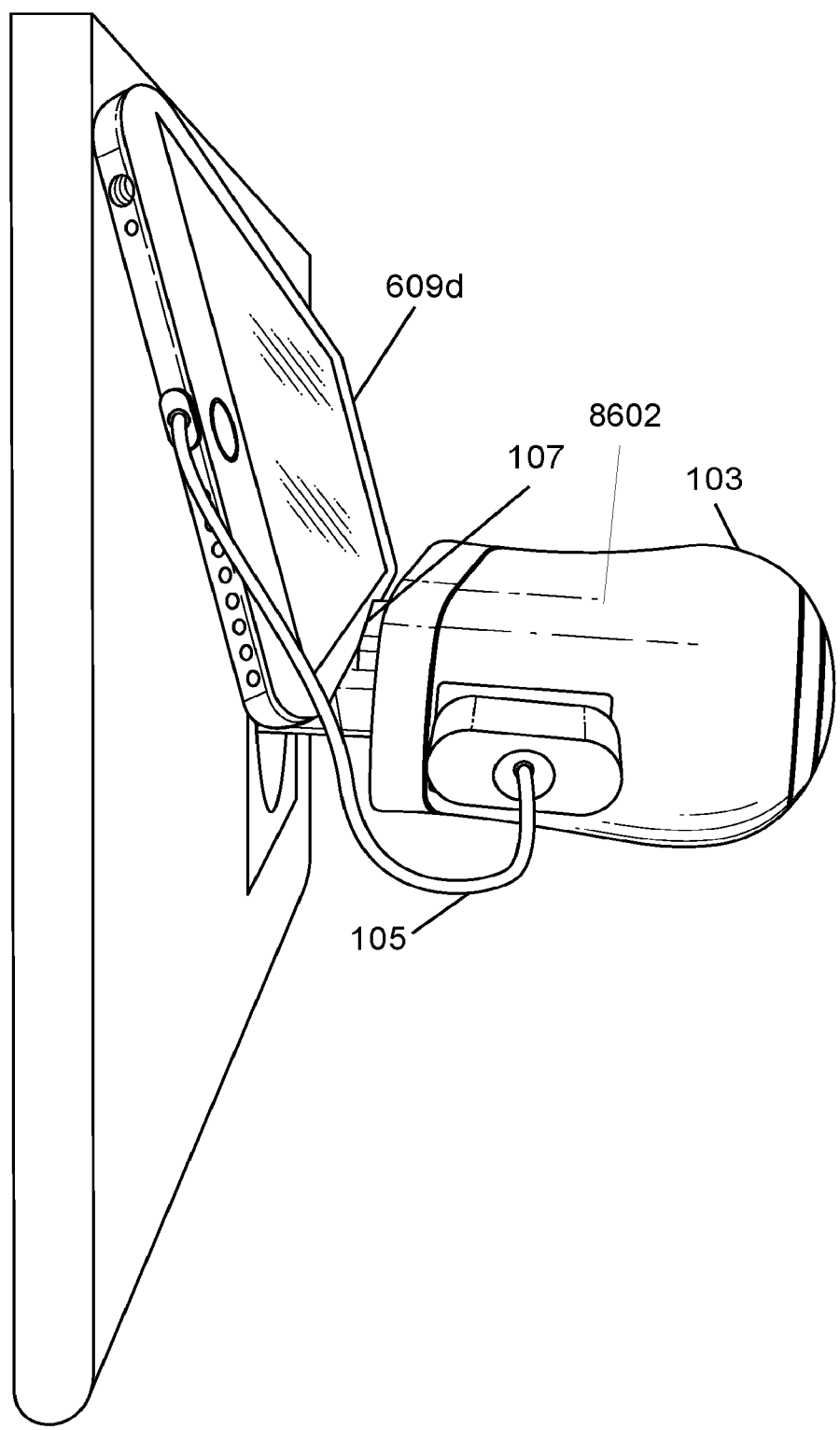
FIG. 43 depicts an elevated side view 220 V charger with a device vertical holding slot embodiment holding a cell phone being charged.

FIGS. 42 and 43 show the electrical plugs, having embodiment of device holding slot, being connected or mounted on the electrical outlet. The electrical charge device or electrical plug of the embodiment is the same as one depicted in FIG. 1. FIG. 42 depicts elevated side view 220 V charger with embodiment device holding slot in electrical outlet. FIG. 43 depicts elevated side view 220 V charger with device holding slot embodiment holding cell phone being charged.

Figure 44:
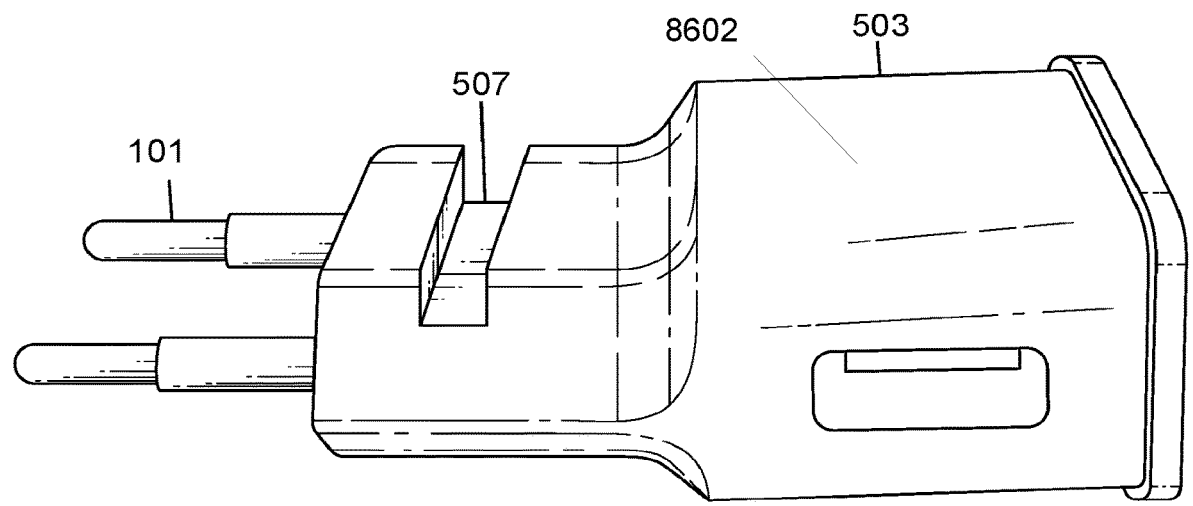
FIG. 44 depicts an elevated side view 220 V electrical plug with an embodiment of a vertical device holding slot.
Figure 45:
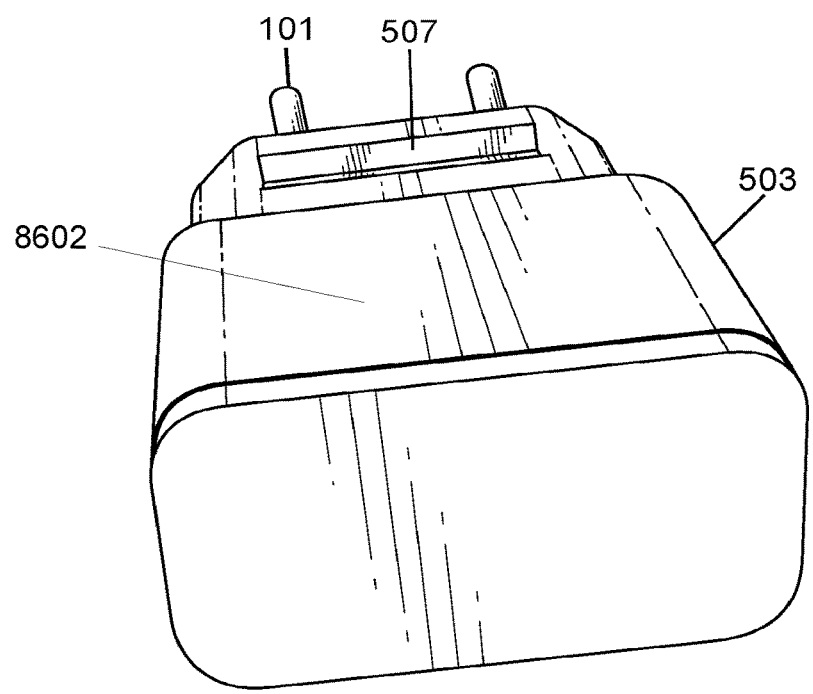
FIG. 45 depicts an elevated front view 220 V plug with embodiment device holding slot embodiment.

Further, in embodiments, FIGS. 44 and 45 depicts elevated side view and elevated front view of the 220 V electrical plug with embodiment device holding slot, respectively. The electrical charger device or electrical plug is having the same arrangement and description as described earlier for FIGS. 17 and 18.

Figure 46:
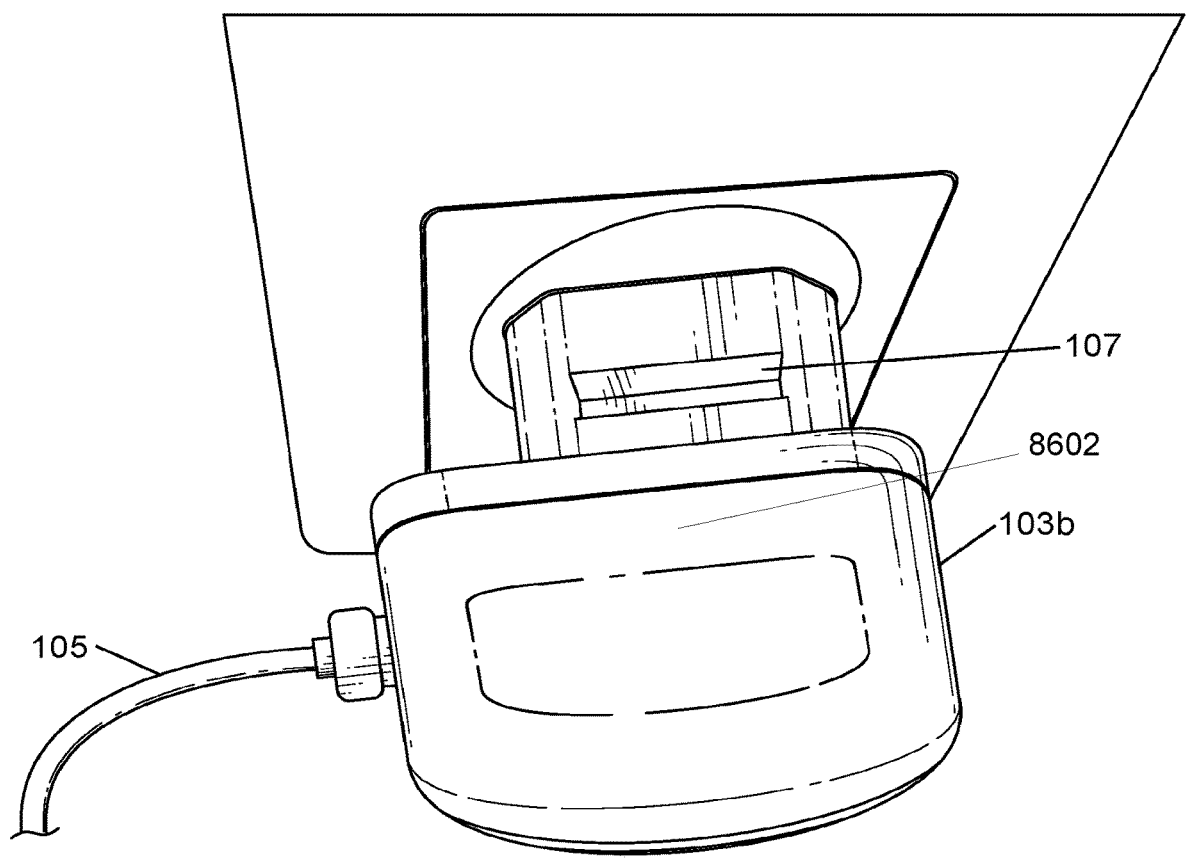
FIG. 46 depicts a top view 220 V electrical plug in an outlet with embodiment device holding slot.

In an embodiment, FIG. 46 depicts top view 220 v electrical plug in outlet with embodiment device holding slot. An electrical device charger with means of holding a plurality of electrical devices (not shown in the picture) which comprises: a main unit 103b with at least one holding slot 107; a cable cord 105 for connecting main unit with said electrical devices; and Pins 101 for fitting said main unit 103b with an electric power source. The electrical device charger (i.e. main unit) in the present embodiment is 220 V electrical plug. The holding slot 107 in this embodiment is device holding channel type and it is vertical. The device holding slot 107 is located at the top side of the main unit 103b. Further, the cable cord 105 is connected to the main unit 103b from one of the sides.

The pins 101 in the present embodiment are of round type (normally used for providing 220 V electrical power sources). The electrical devices can be held vertically in the device holding slot 107, in the present embodiment vertical device holding channel type, in which an electrical device is securely held.

Figure 47:
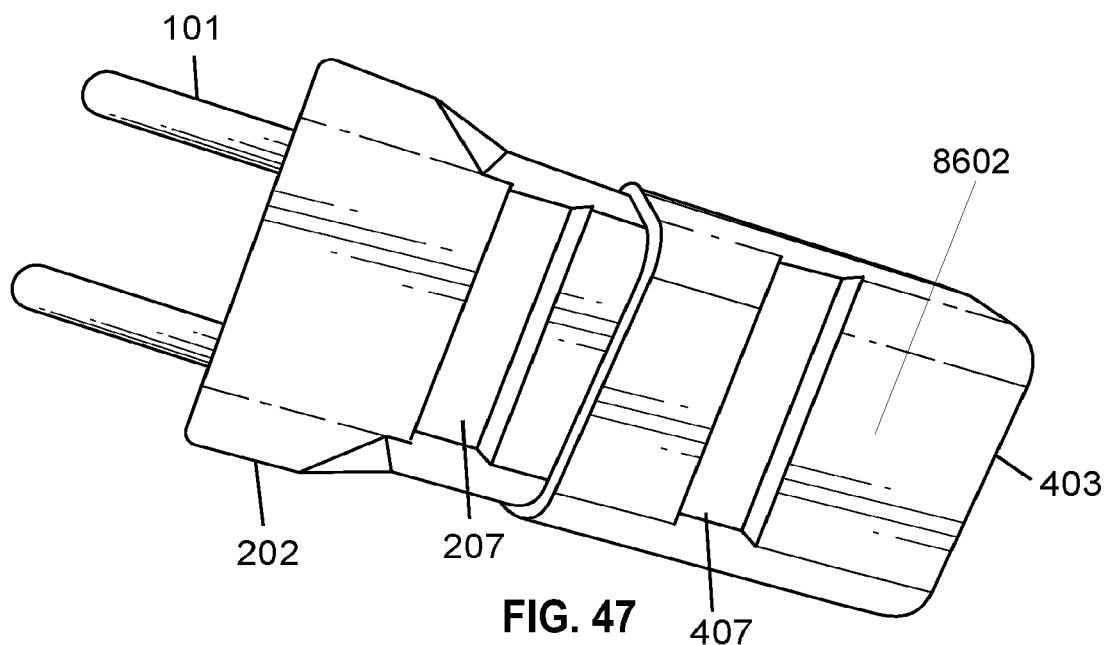
FIG. 47 depicts a top view 220 V electrical plug and 110 V electrical plug each having a vertical device holding slot (tandem application).
Figure 48:
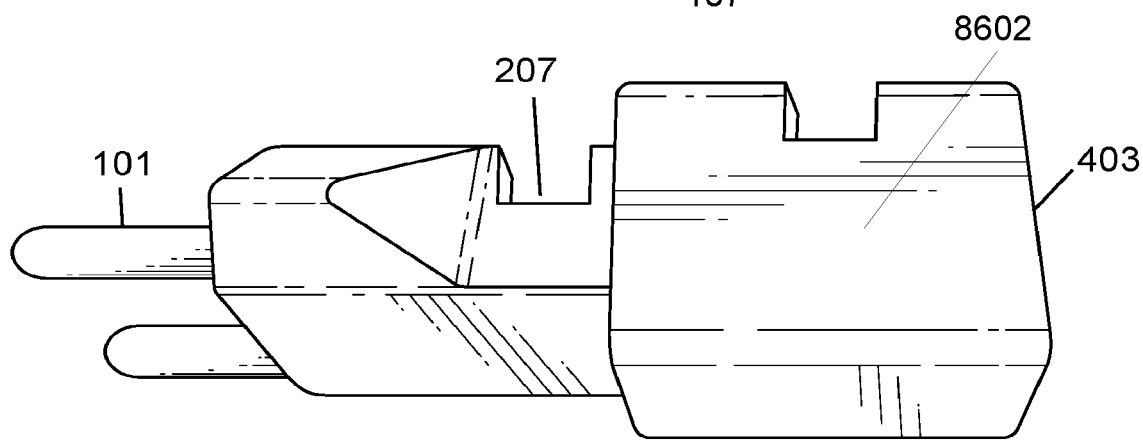
FIG. 48 depicts an elevated side view of FIG. 47.
Figure 49:
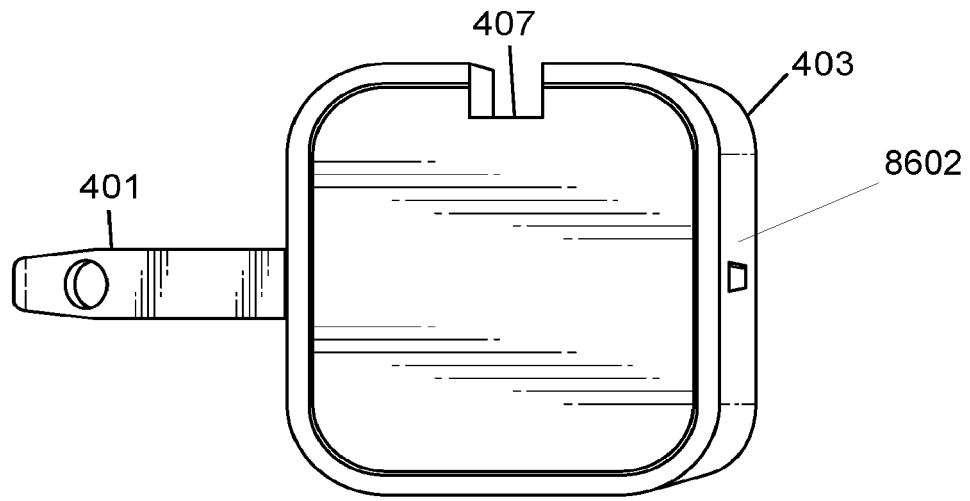
FIG. 49 depicts a side view 100 V of an electrical plug with a vertical embodiment device holding slot.
Figure 50:
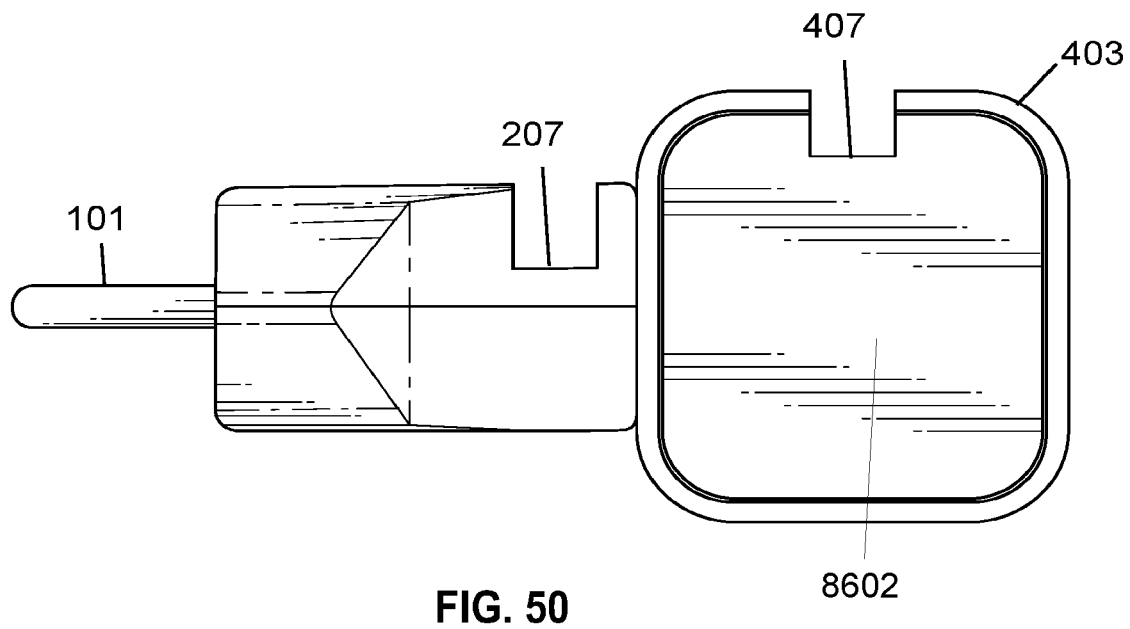
FIG. 50 depicts an assembled 220 V adapter and 110 V plug each with a holding slot (tandem application).
Figure 51:
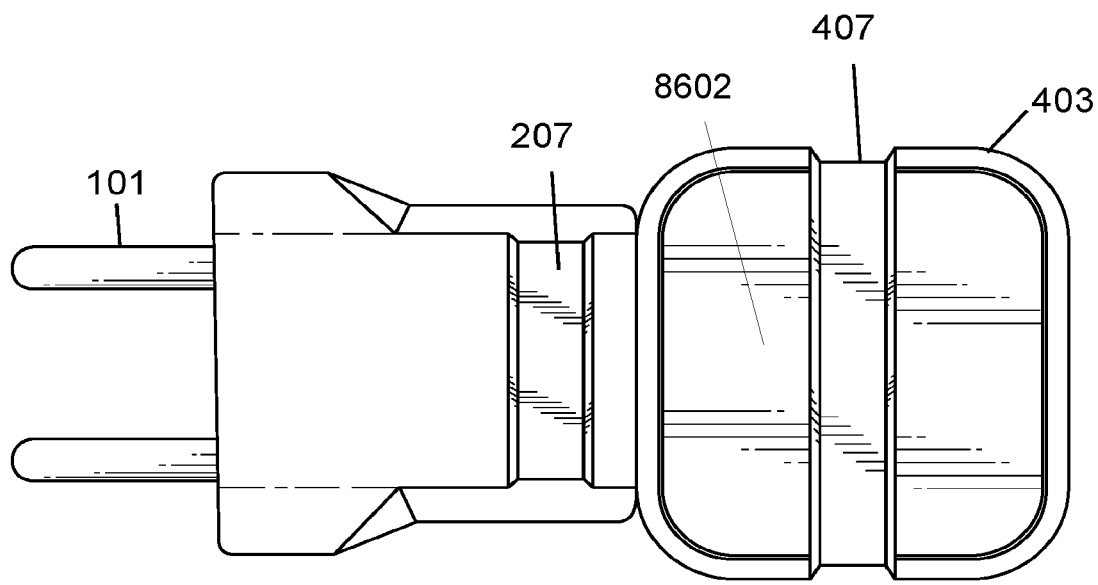
FIG. 51 depicts a top view of the embodiment of FIG. 50.

In an embodiment, FIGS. 47 and 48 depicts different views of assembled electrical charger device comprising 220 V electrical plug and 110 V electrical plug. The assembled charger device has two device holding slots 207 and 407 (tandem application). Similarly, another embodiment, FIGS. 50 and 51 depicts different views of assembled electrical charger device comprising 220 V electrical adapter and 110 V electrical plug (tandem application) with device holding embodiments. While, FIG. 49 depicts side view 100 V electrical plug with embodiment device holding slot.

Figure 52:
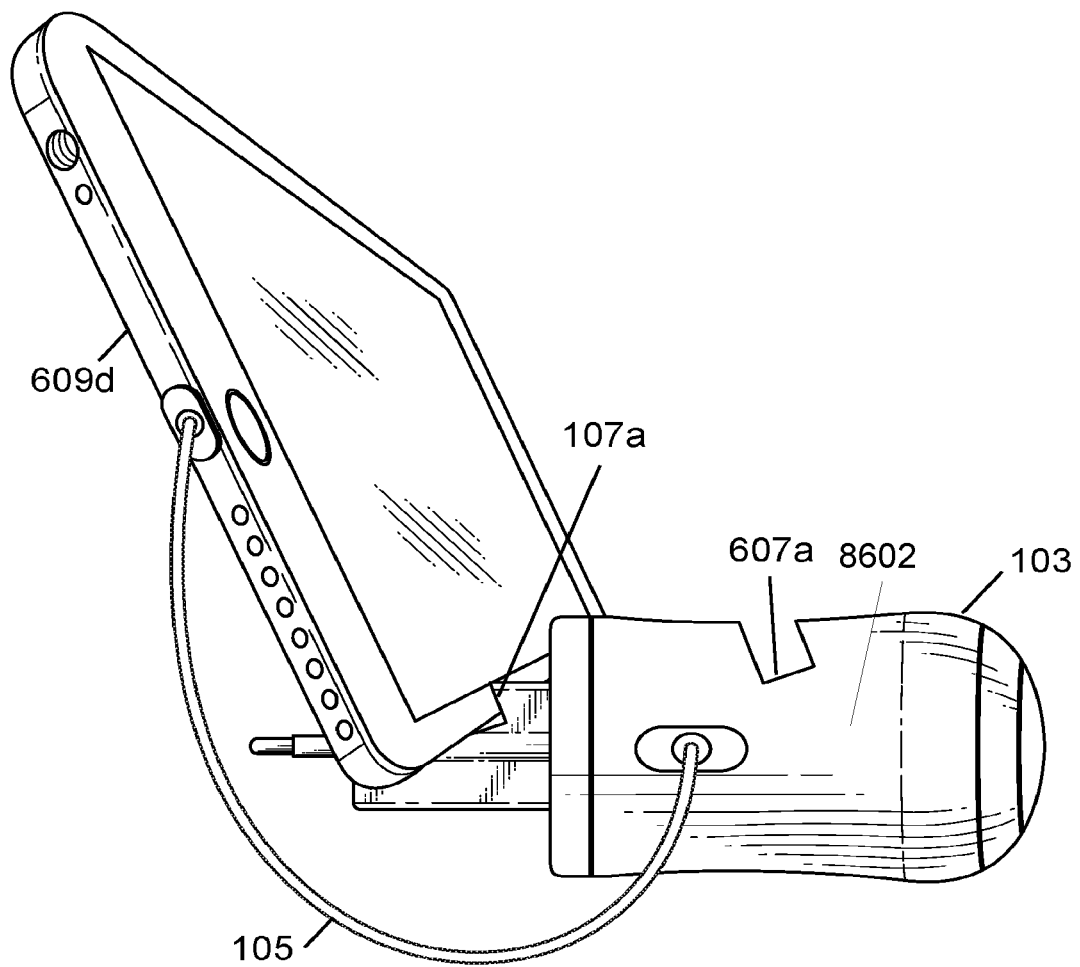
FIG. 52 depicts a side view 220 V electrical charging plug with two angled device holding slots (tandem application).
Figure 53:
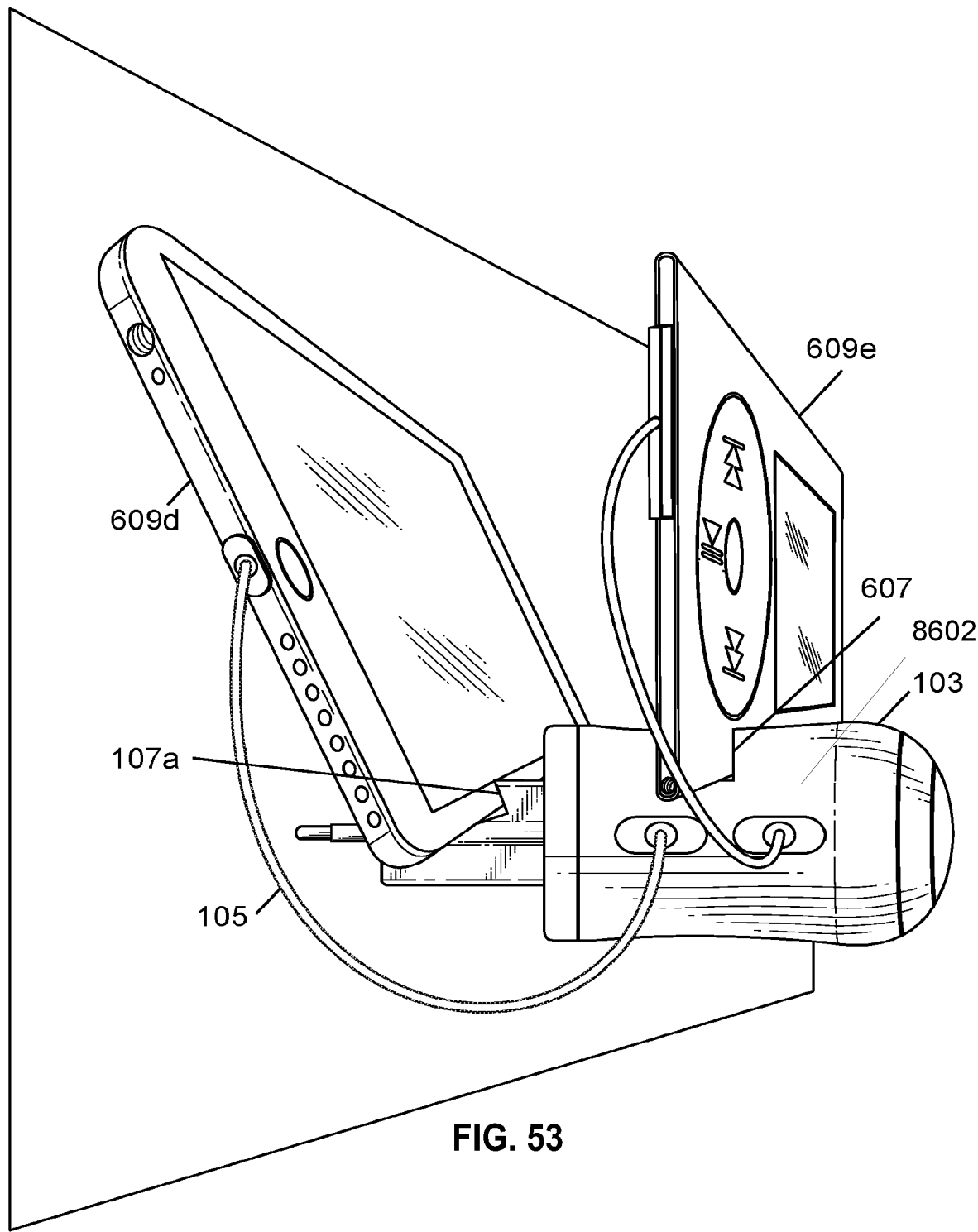
FIG. 53 depicts a side view 220 V electrical charging plug with angled and vertical device holding slots (tandem application).
Figure 54:
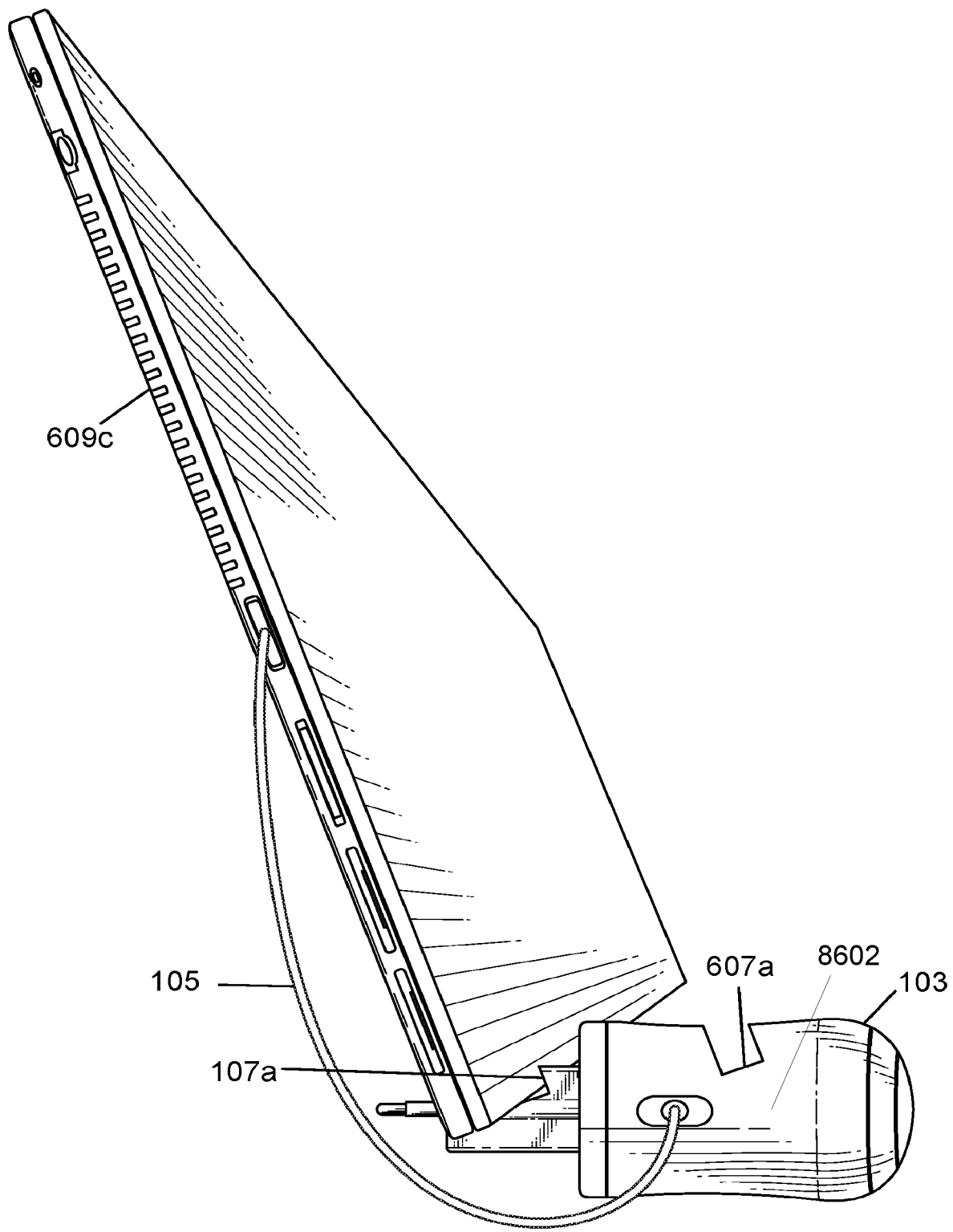
FIG. 54 depicts an electrical plug charging 220 V plug charging laptop with angled device holding slots.
Figure 55:
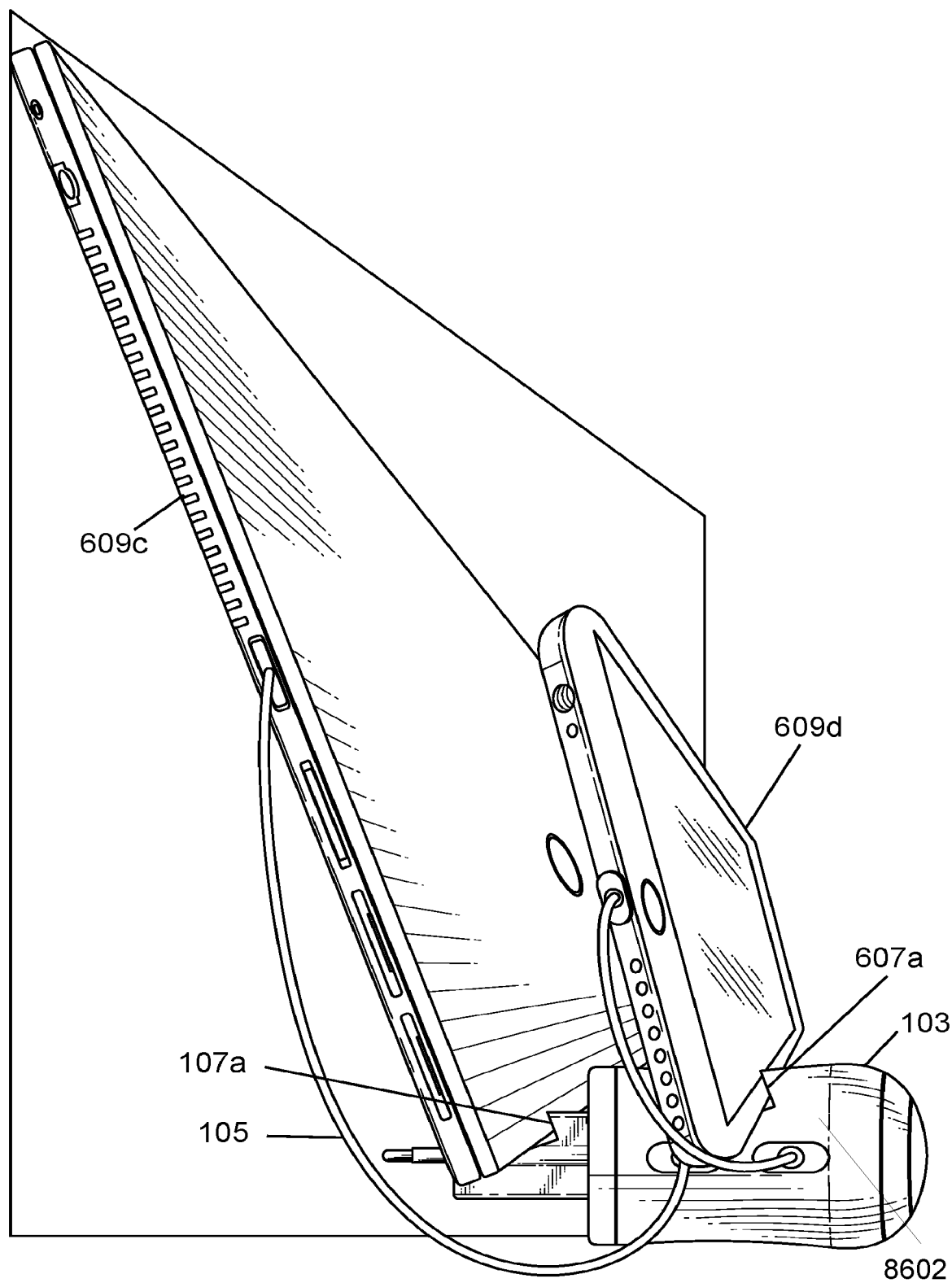
FIG. 55 depicts a side view with multiple electrical devices in multiple holding slots.

Further, FIG. 52 to 55 shows various examples of the electrical charging devices (electrical plugs) with two device holding slots of the embodiments of the present invention. FIG. 52 depicts side view 220 v electrical charging plug with two angled device holding slots (tandem application). FIG. 53 depicts side view 220 v electrical charging plug with angled and vertical device holding slots (tandem application). FIG. 54 depicts electrical plug charging 220 v plug charging laptop with angled device holding slots. FIG. 55 depicts side view tandem embodiment charging multiple electrical devices. The device holding slots can be vertical or angled shape. Accordingly, the electrical devices can be held securely on the device holding slots.

Figure 56:
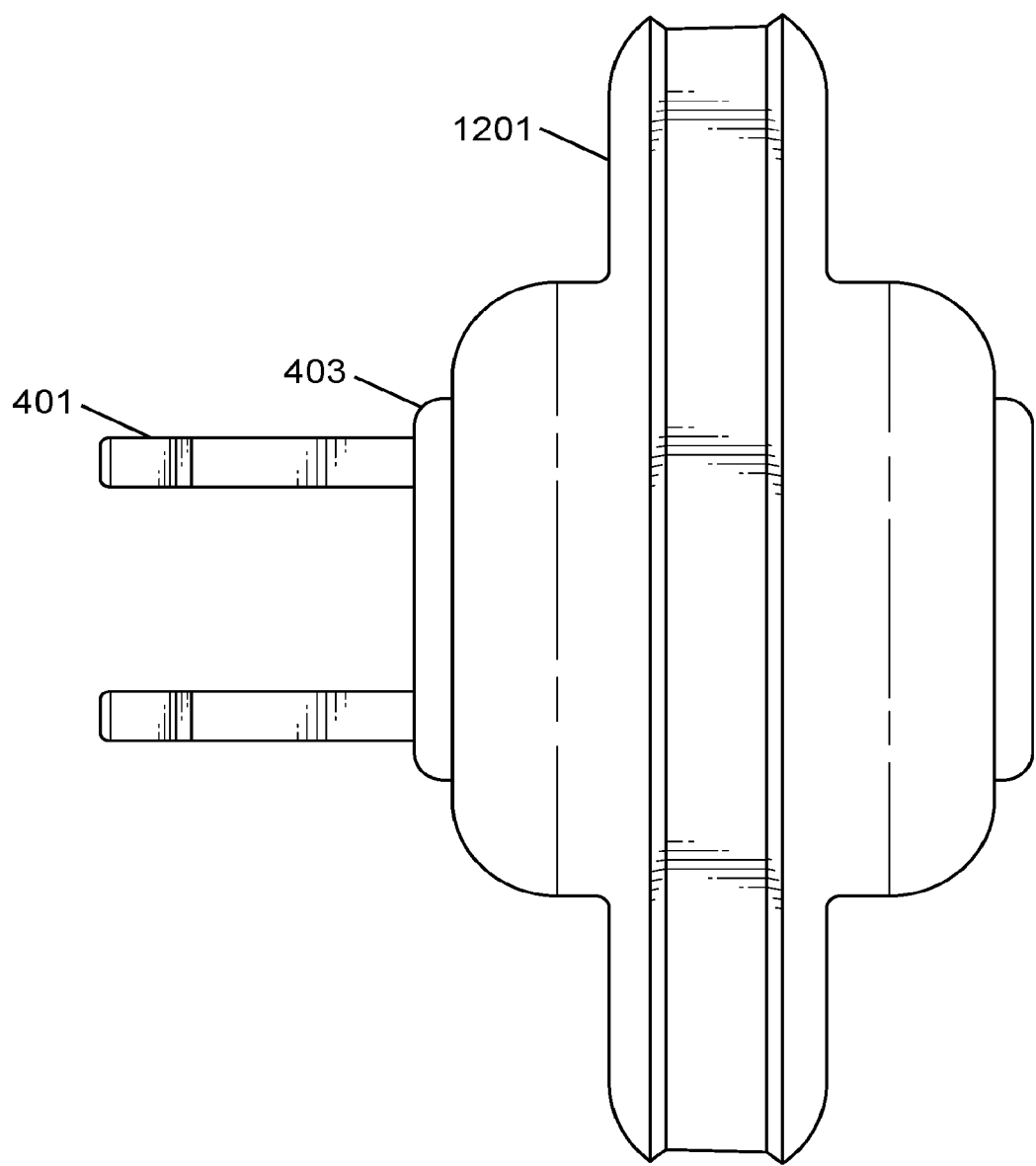
FIG. 56 depicts a top view 110 V electrical plug (of FIG. 12) with elastic device holding clamp.
Figure 57:
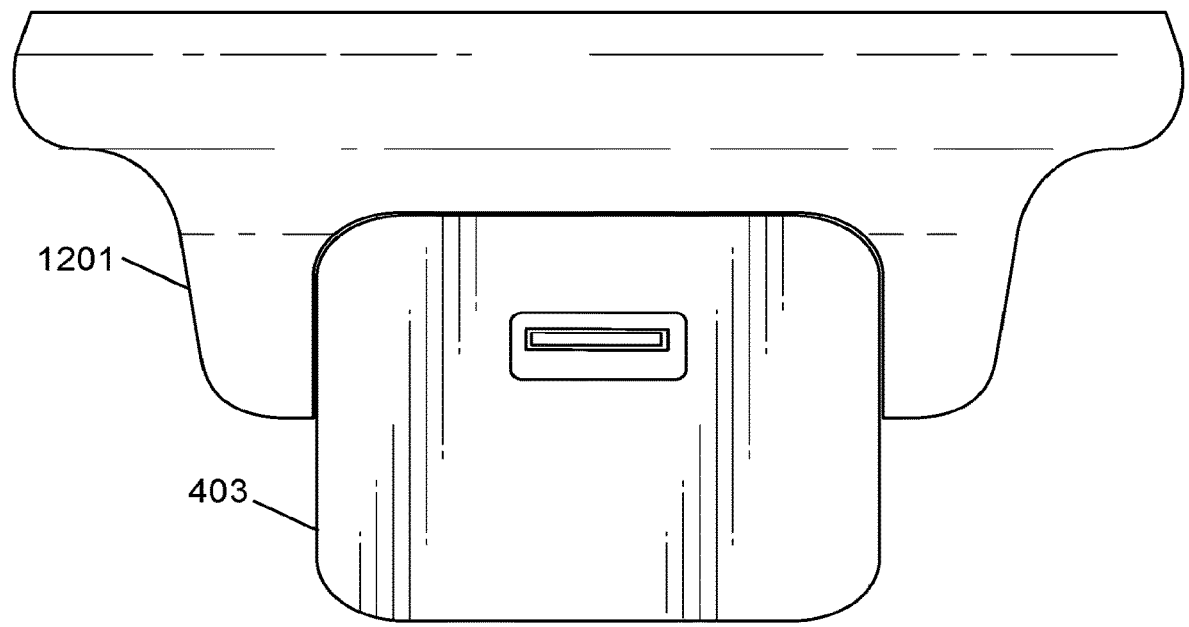
FIG. 57 depicts a front view of electrical plug (of FIG. 12) with embodiment elastic device holding clamp.
Figure 58:
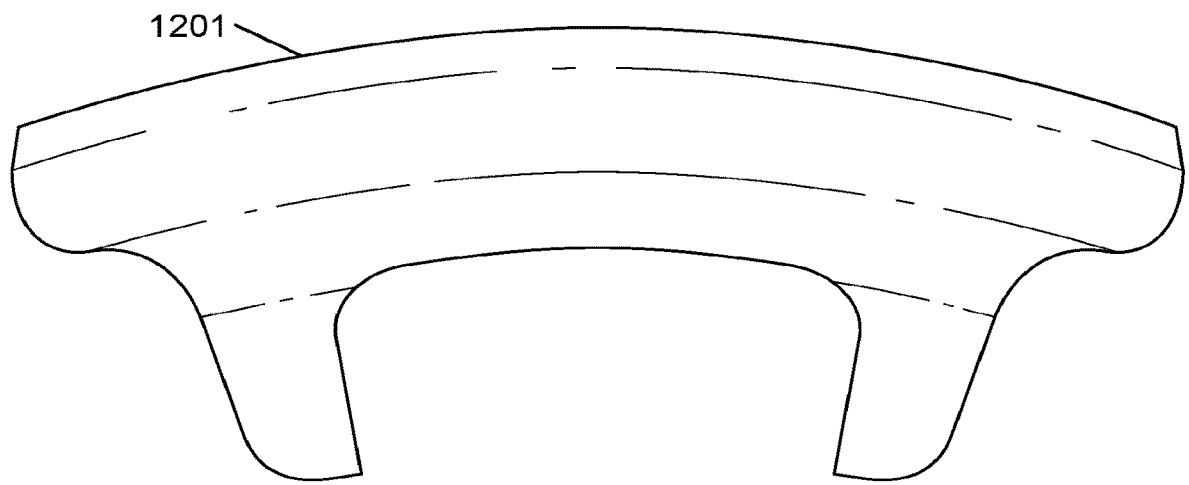
FIG. 58 depicts an embodiment of an elastic device holding clamp in free state.

In embodiments, FIGS. 56 to 58 depict different views of an arrangement of elastic device holding clamp used to clamp securely onto an electrical plug to increase the load bearing support for electrical devices being charged. FIG. 56 depicts top view 110 v electrical plug (of FIG. 12) with elastic device holding clamp. FIG. 57 depicts front view of electrical plug (of FIG. 12) with elastic device holding clamp in a free state. FIG. 58 depicts elastic device holding clamp. The elastic device holding clamp 1201 is holding a 110 V electrical plug.

Figure 59:
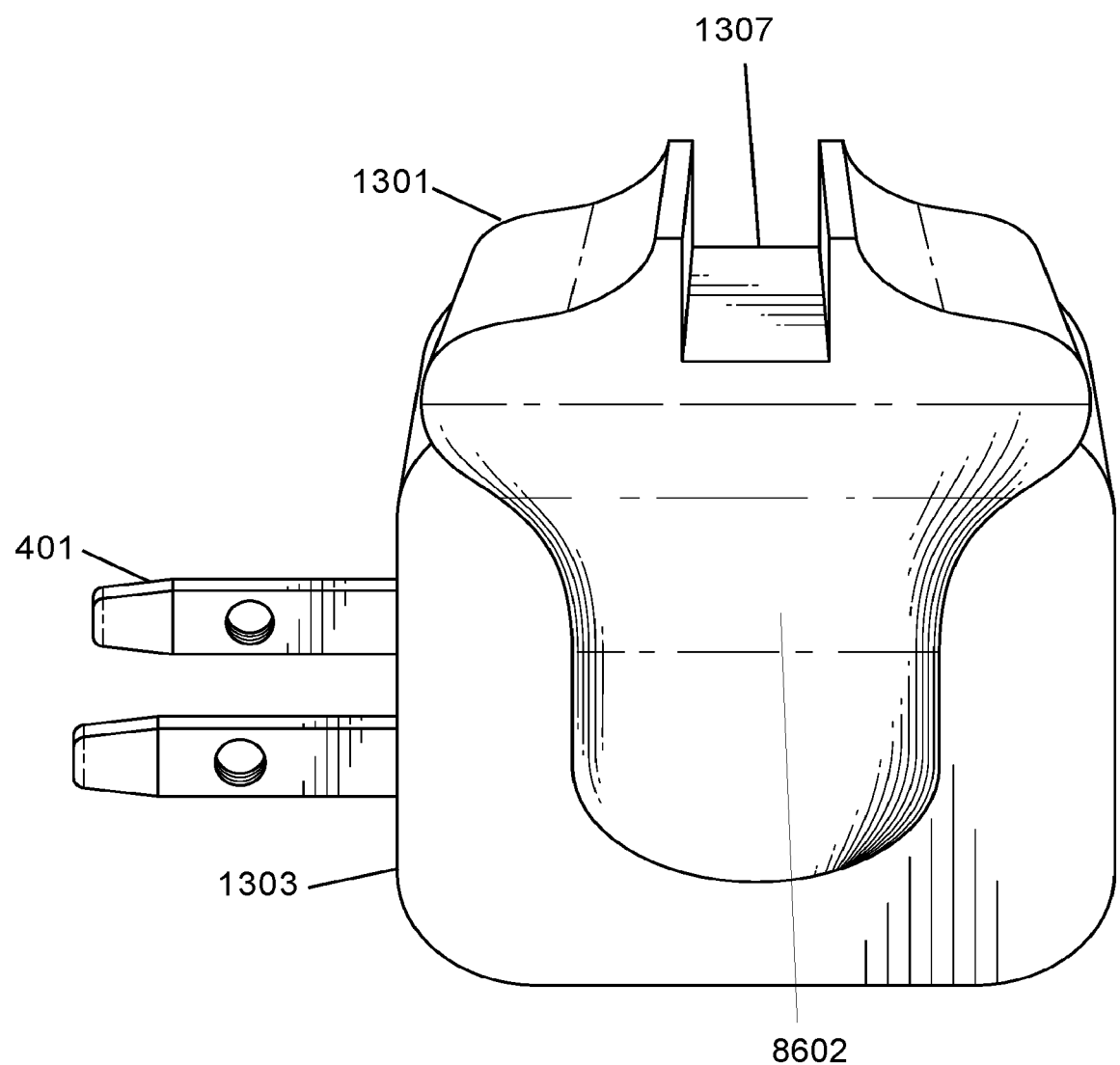
FIG. 59 depicts an elevated side view 110 V electrical plug with an embodiment an elastic device holding clamp with device holding slot.
Figure 60:
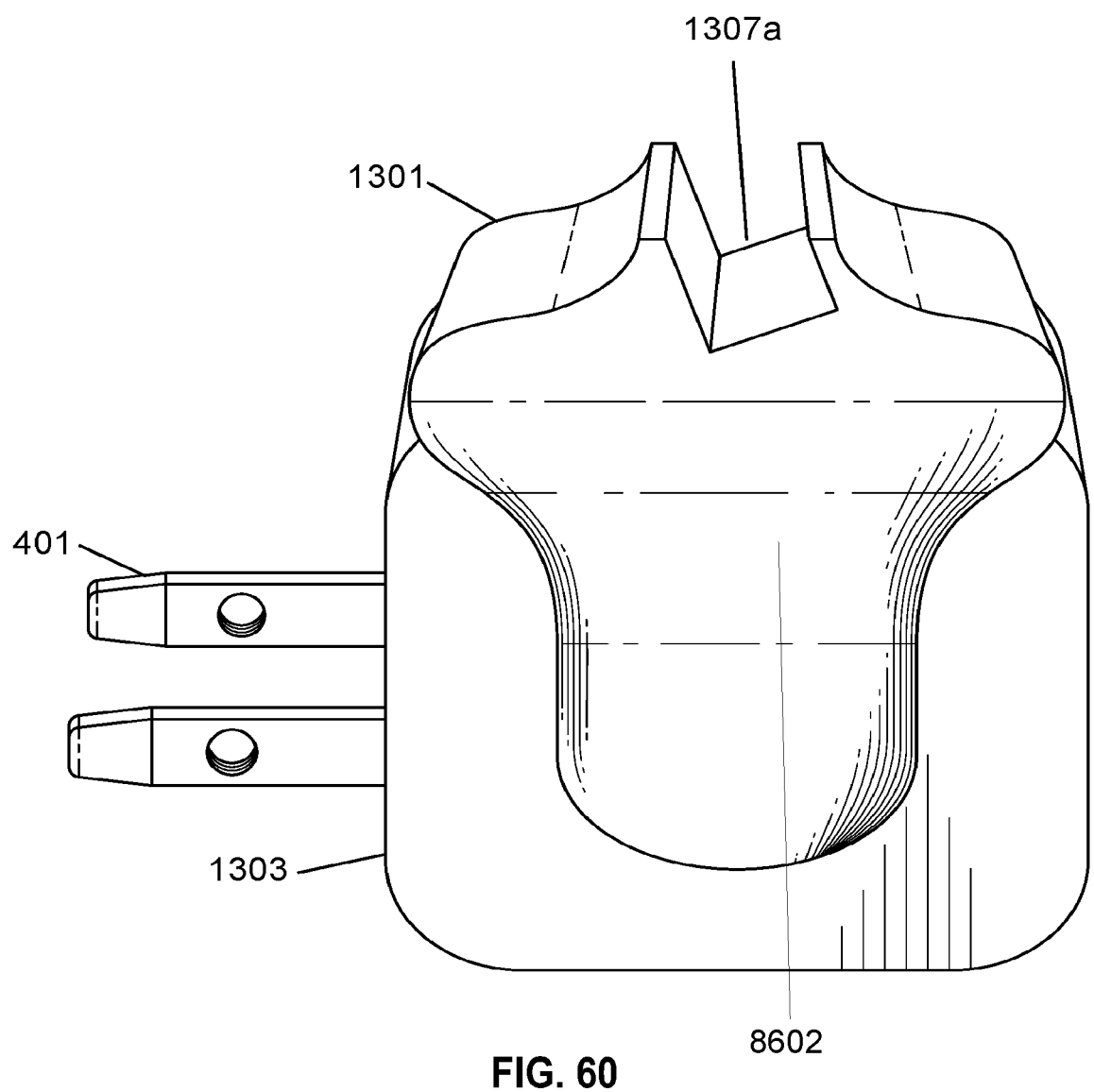
FIG. 60 depicts an elevated side view 110 V electrical plug with an embodiment of an elastic device holding clamp with angled device holding slot.
Figure 61:
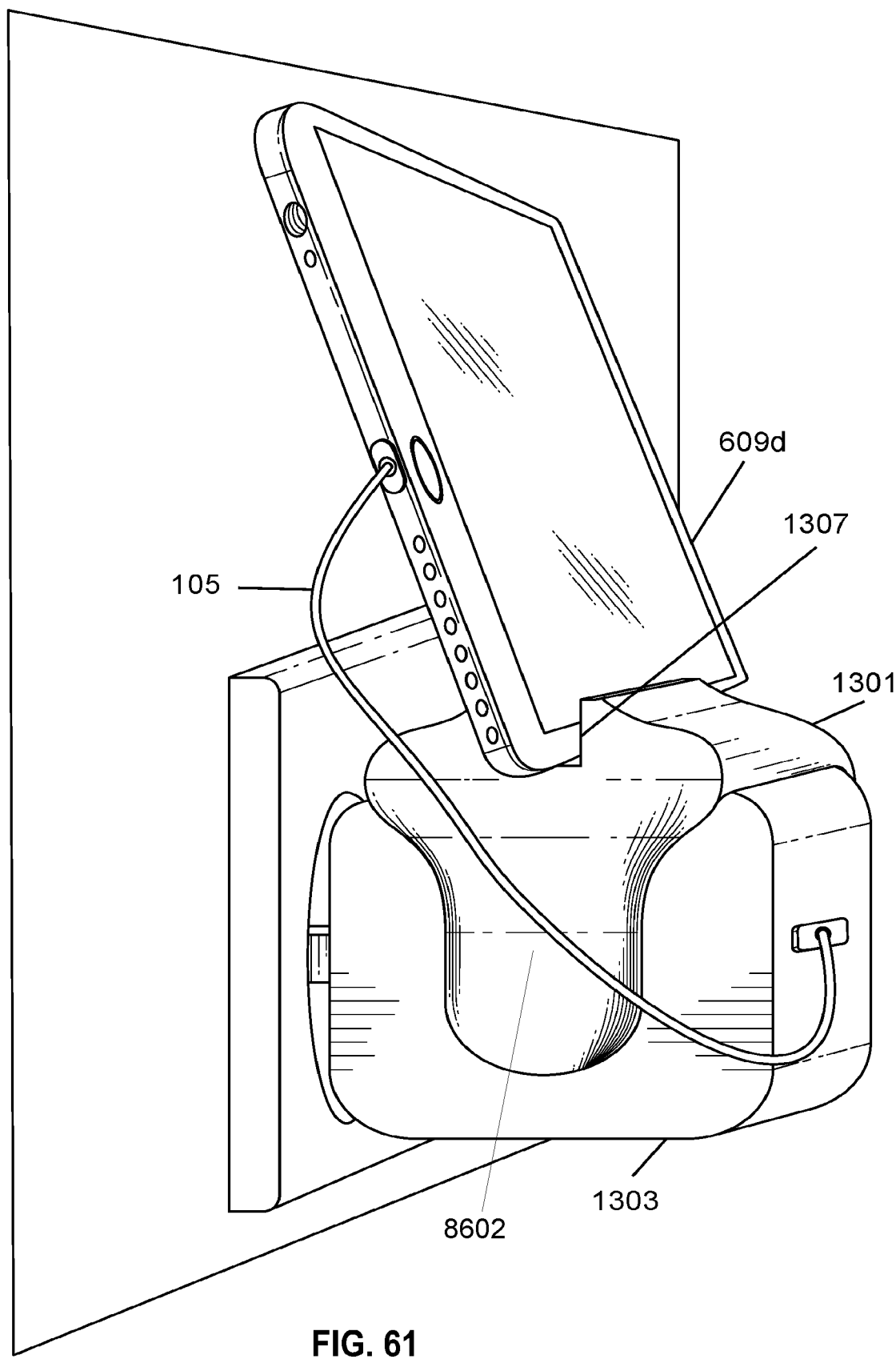
FIG. 61 depicts an elevated side view 110 V electrical plug assembled with embodiment device holding plug holding a cell phone being charged.

Further, in an embodiment, FIGS. 59 to 61 shows an elastic device holding clamp having device holding slot, further the elastic device holding clamp holds securely 110 V electrical plug. FIG. 59 depicts elevated side view 110 V electrical plug with elastic device holding clamp with device holding slot. FIG. 60 depicts elevated side view 110 V electrical plug with elastic device holding clamp with angled holding slot. The elastic device holding clamp 1301 having embodiment of vertical device holding slot 1307 (in FIG. 59) and angled device holding slot 1307a (in FIG. 60) is disclosed. FIG. 61 depicts elevated side view 110 v electrical plug with embodiment device holding plug holding cell phone being charged.

Figure 62:
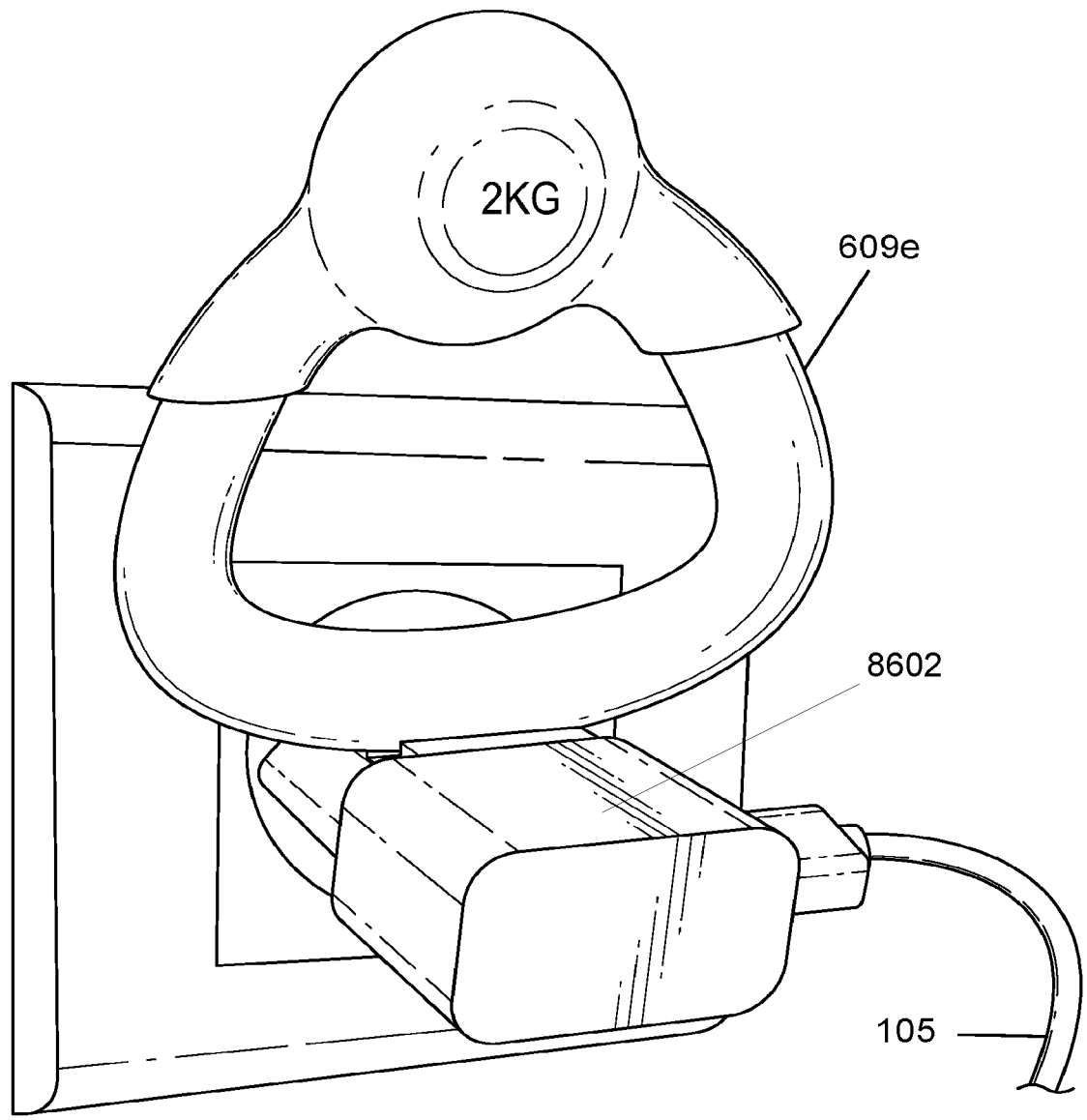
FIG. 62 shows a 2 kg weight resting on 220 V electrical plug in wall with device holding slot yielding a safety factor of 10.

FIG. 62 shows proof of concept 2 kg weight resting on 220 V electrical plug in wall with device holding slot. FIG. 62 clearly shows that embodiment of the present invention, 220 V electrical plug, which can hold securely 2 kg. Weighing bar 609e. This clearly proves that electrical plug or electrical adapter can hold securely 2 kg. (which is equal to 4.4 pounds) approximately 10 times the weight of an iPhone (safety factor S.F. 10).

Figure 63:
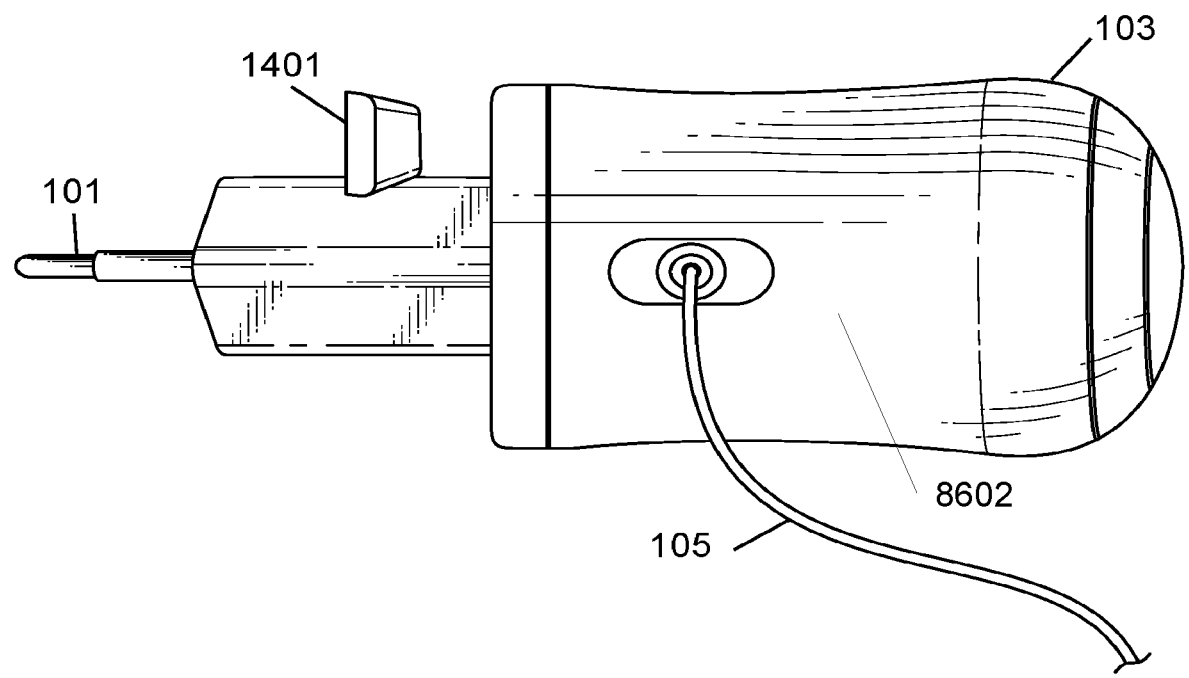
FIG. 63 depicts an electrical plug with vertical protruding stop for holding an electrical device.

In an embodiment, FIG. 63 depicts electrical plug with a protruding vertical stop for holding electrical device. An electrical device charger with means of holding a plurality of electrical devices (not shown in the picture) which comprises: a main unit 103 with at least one holding slot 1401; a cable cord 105 for connecting main unit with said electrical devices; and Pins 101 for fitting said main unit 103 with an electric power source. The electrical device charger (i.e. main unit) in the present embodiment is 220 V electrical plug. The holding slot 1401 in this embodiment is vertical stopper type. The holding slot 107 is located at the top side of the main unit 103. Further, the cable cord 105 is connected to the main unit 103 from one of the sides. The pins 101 in the present embodiment are of round type (normally used for providing 220 V electrical power sources). The electrical devices can be held vertically in the holding slot 1401, in the present embodiment it is vertical stopper, in which an electrical device can held securely.

Figure 64:
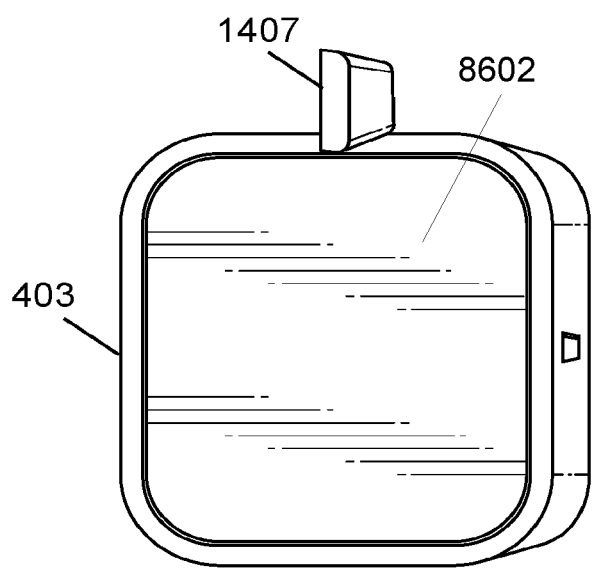
FIG. 64 depicts a 110 V electrical plug with electrical device prongs/pins retracted.

FIG. 64 depicts drawing 110 V electrical plug with an embodiment of a vertical stop for holding electrical device. This embodiment is having same arrangement or structure as that of the FIGS. 13 to 15, only difference is that holding slot is of different design that the earlier one. The holding slot is vertical stopper 1407 for holding securely holding electrical device.

Figure 65:
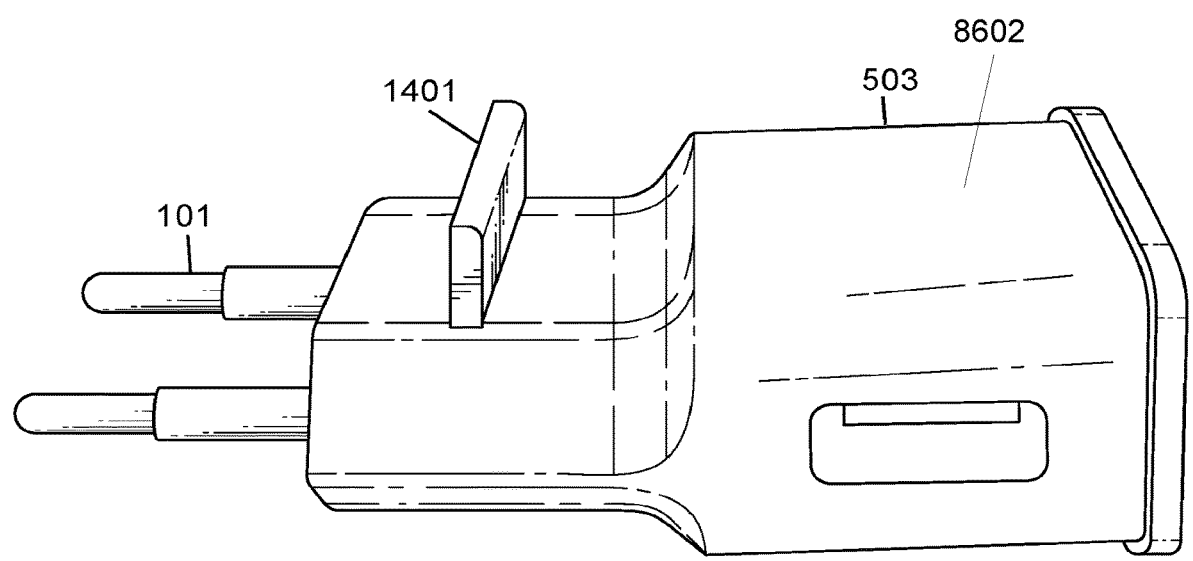
FIG. 65 depicts an elevated side view of a 220 V of electrical plug embodiment.

FIG. 65 depicts elevated side view 220 V electrical plug with an embodiment of a vertical stop for holding an electrical device. This embodiment is having same arrangement or structure as that of the FIG. 18, only difference is that holding slot is of different design that the earlier one. The holding slot is vertical stopper 1401 for holding securely holding electrical device.

Figure 66:
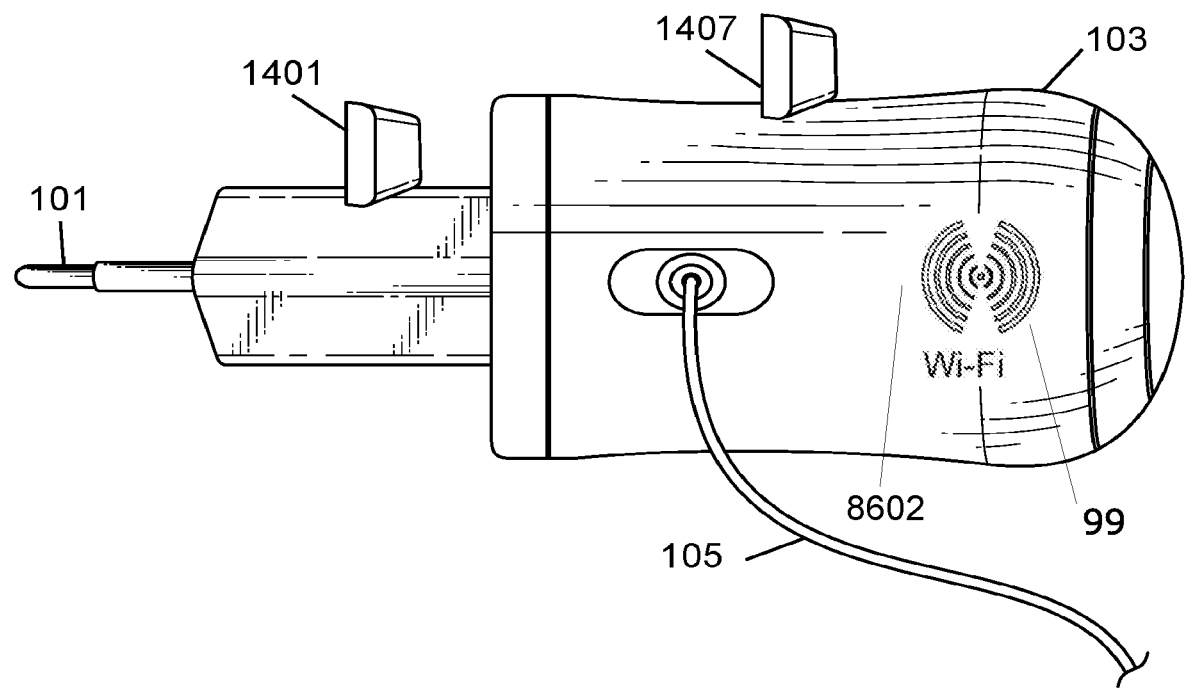
FIG. 66 depicts an elevated side view of an electrical charging plug with an embodiment with tandem vertical protrusions for holding electrical devices to be charged (tandem application).
Figure 67:
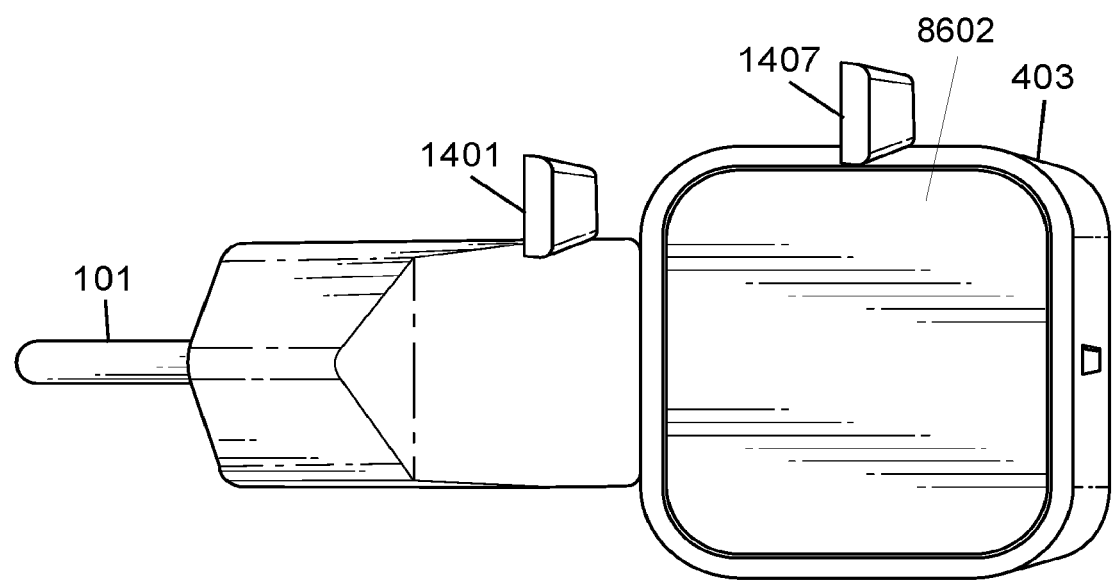
FIG. 67 depicts an assembled 220 V adapter plug and 110 V electrical plug with vertical stops to hold electrical devices being charged (tandem application).
Figure 68:
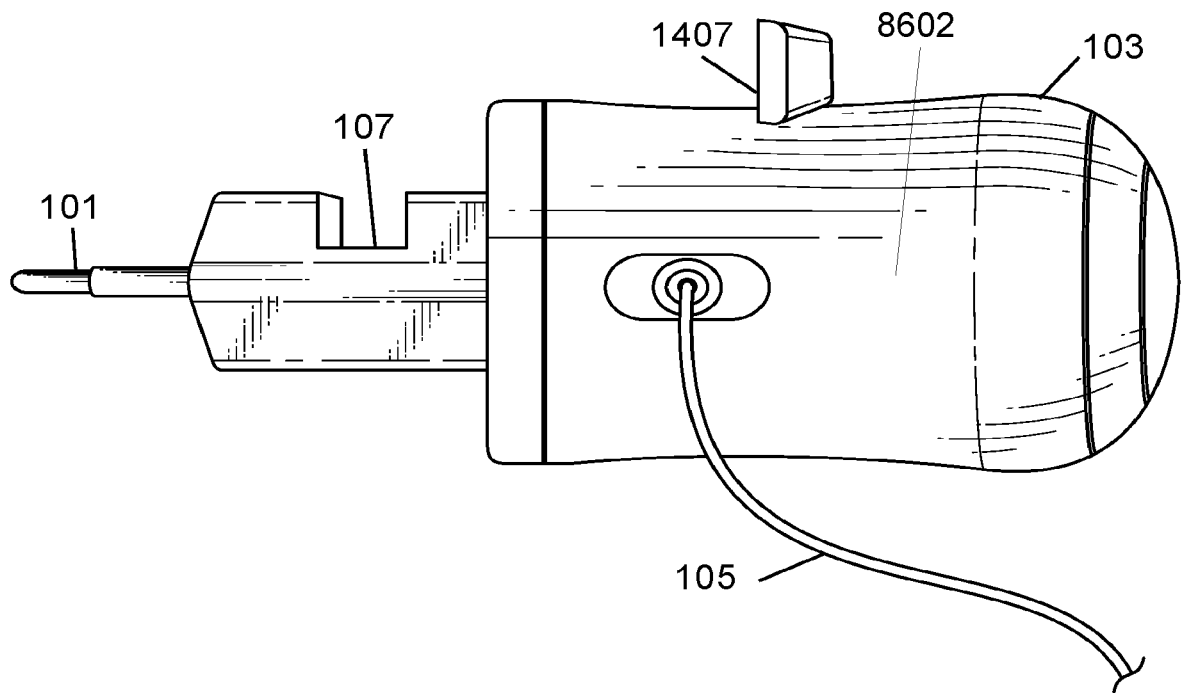
FIG. 68 is a side view of a 220 V electrical charger with an embodiment of a vertical device holding slot in front and a vertical stop in rear (tandem application).
Figure 69:
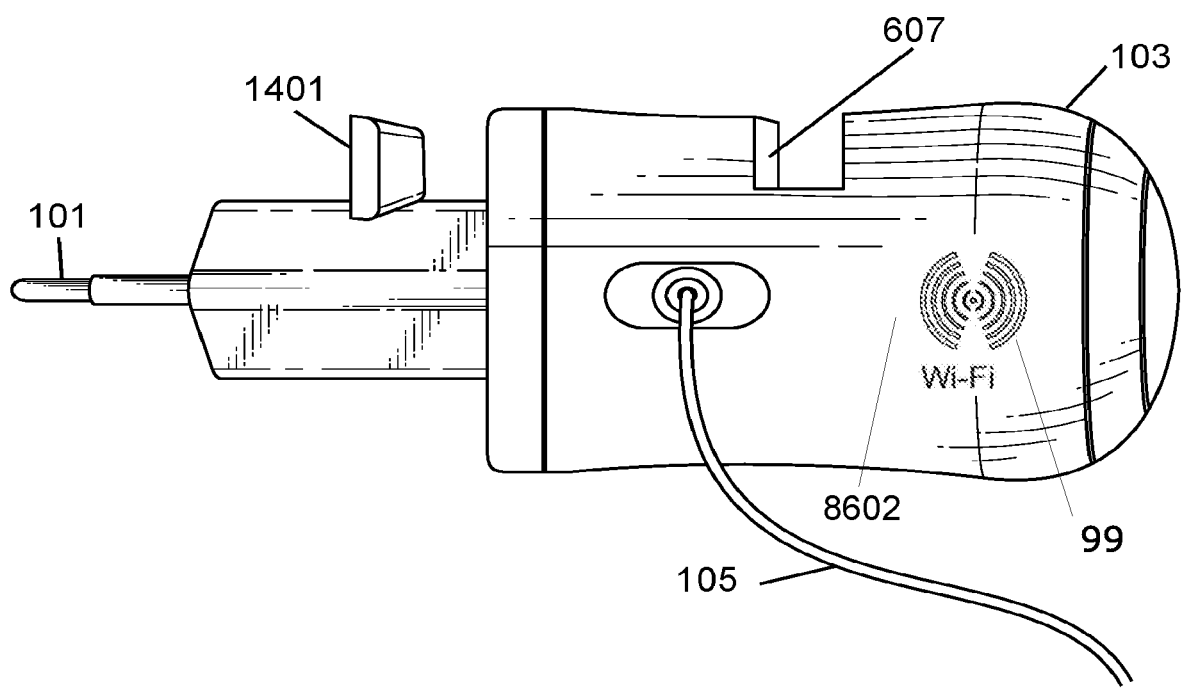
FIG. 69 depicts a side view of FIG. 68 with protrusions reversed (tandem application).

In embodiments, FIG. 66 to 68 shows electrical charging devices (i.e., electrical plug and/or electrical adapter) with two device holding slots. The device holding slots can be vertical stoppers (1401 and 1407) and vertical channels (107 and 607). FIG. 66 depicts elevated side view electrical charging plug with embodiment tandem vertical stops for holding electrical devices to be charged. FIG. 67 depicts assembled 220 V adapter plug and 110 V electrical plug with embodiment vertical stops to hold electrical devices being charged. FIG. 68 side view 220 V electrical charger with embodiment vertical device holding slot in front and embodiment vertical stop in rear. FIG. 69 depicts side view FIG. 68 with embodiments reversed.

Figure 70:
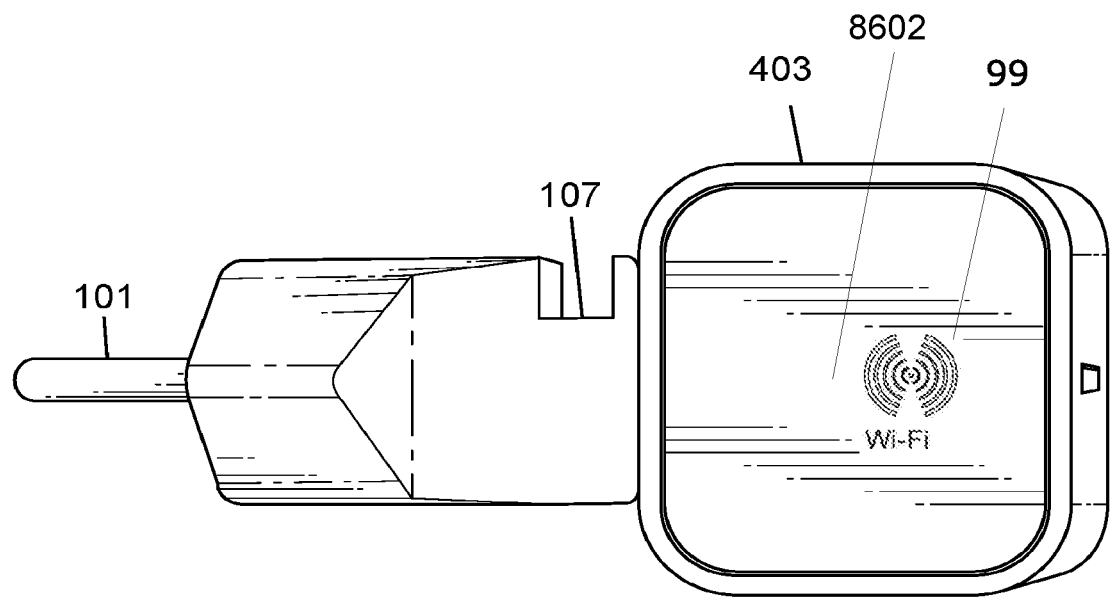
FIG. 70 depicts an assembled 220 V adapter and a 10 V electrical plug with a vertical device holder slot in the 220 V adapter.
Figure 71:
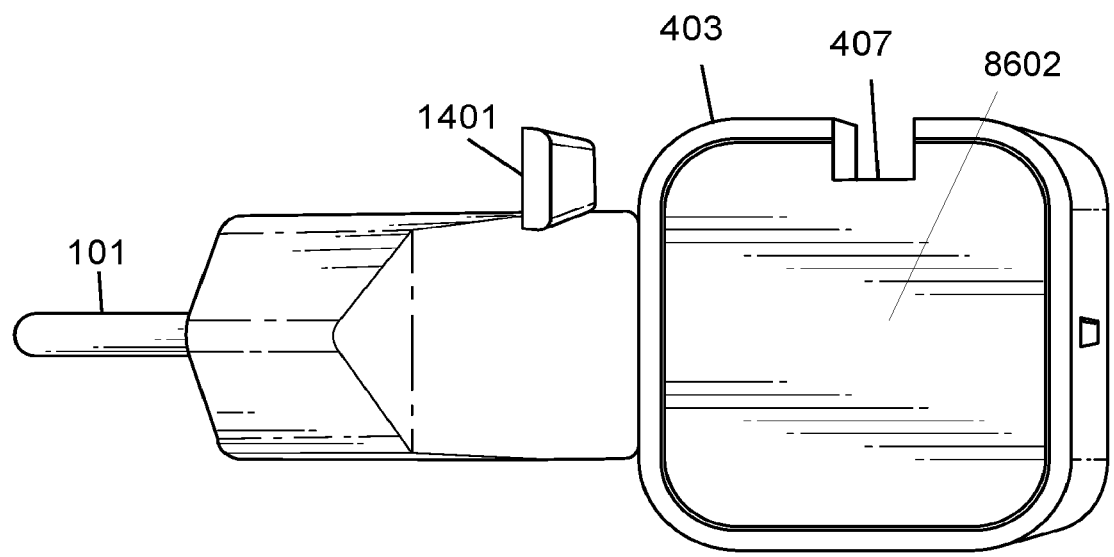
FIG. 71 depicts an assembled 220 V adapter plug with a vertical stop and a 110 V electrical plug with a vertical device holding channel (tandem application).

FIG. 70 depicts assembled 220 V electrical adapter and 110 V electrical plug with an embodiment of vertical device holder slot in 220 V adapter. FIG. 71 depicts assembled 220 V electrical adapter plug with an embodiment of a vertical stop and 110 V electrical plug with embodiment vertical device holding channel. This embodiment is having same arrangement or structure as that of the FIG. 24, only difference is that holding slot is of different design that the earlier one. The holding slot is vertical stopper 1401 is attached on top of the electrical adapter for holding securely holding electrical device.

Figure 72:
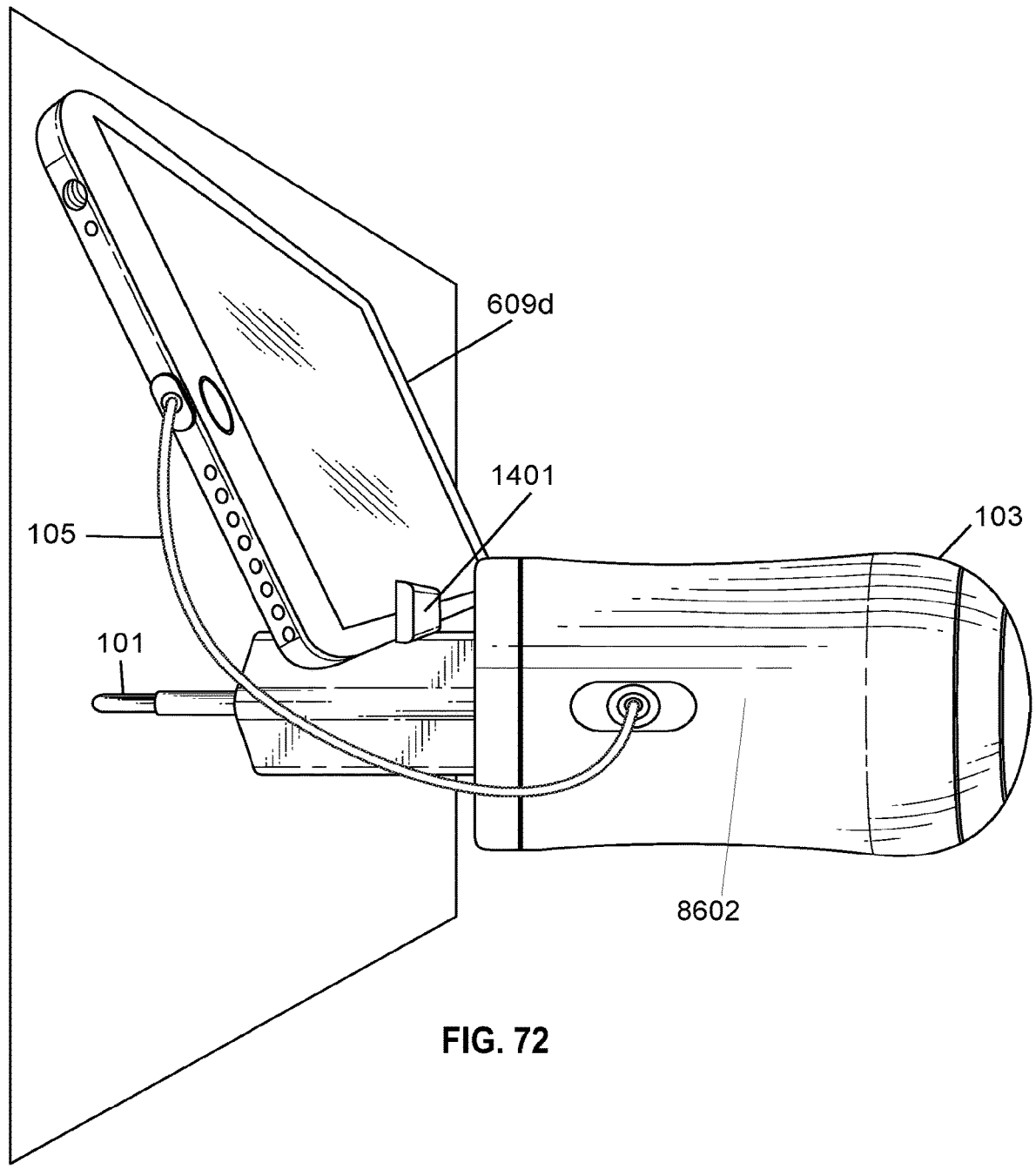
FIG. 72 depicts a 220 V charging plug with a vertical stop charging cell phone.
Figure 73:
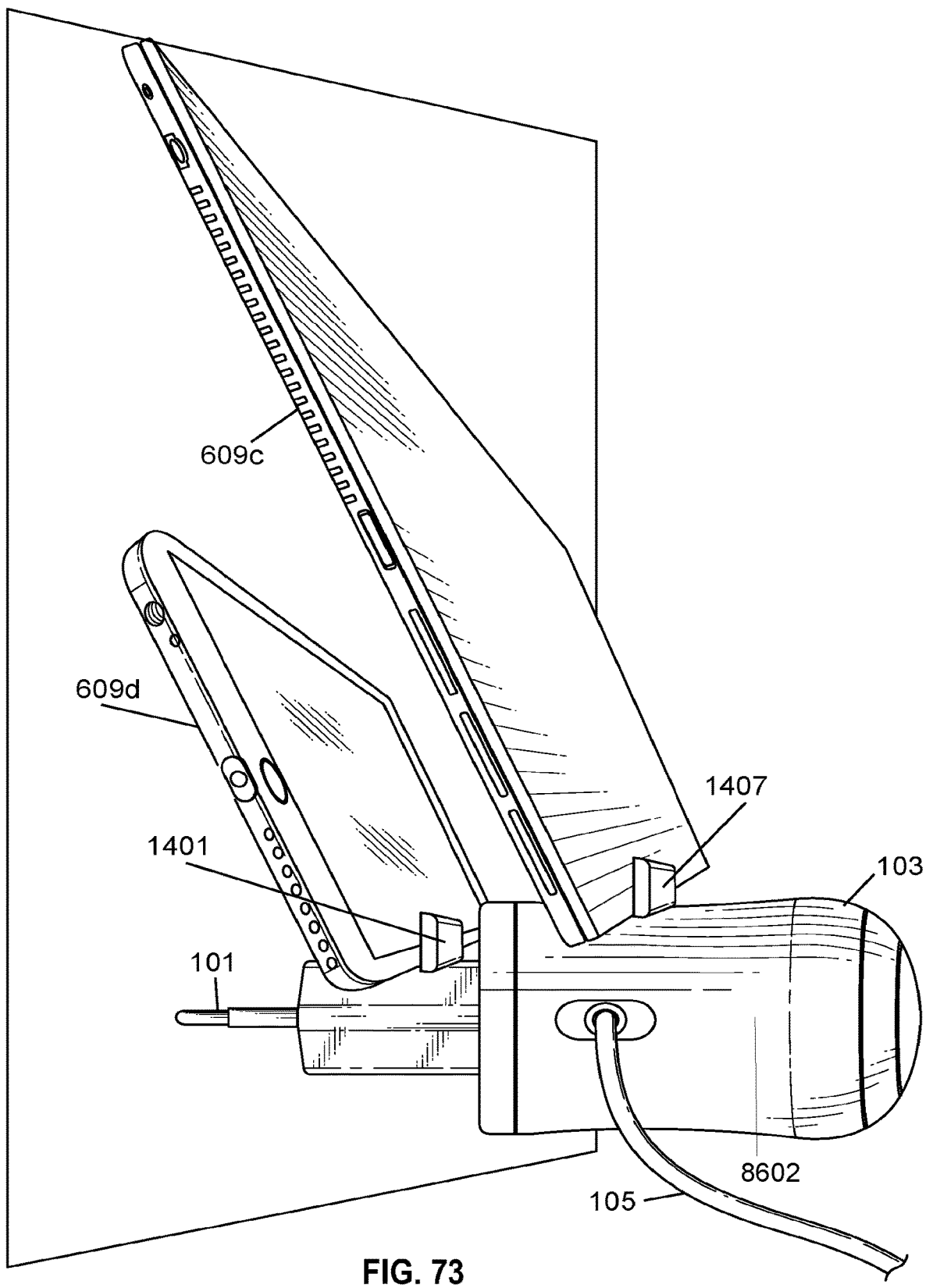
FIG. 73 depicts a side view with two vertical stops charging electrical devices (tandem application).
Figure 74:
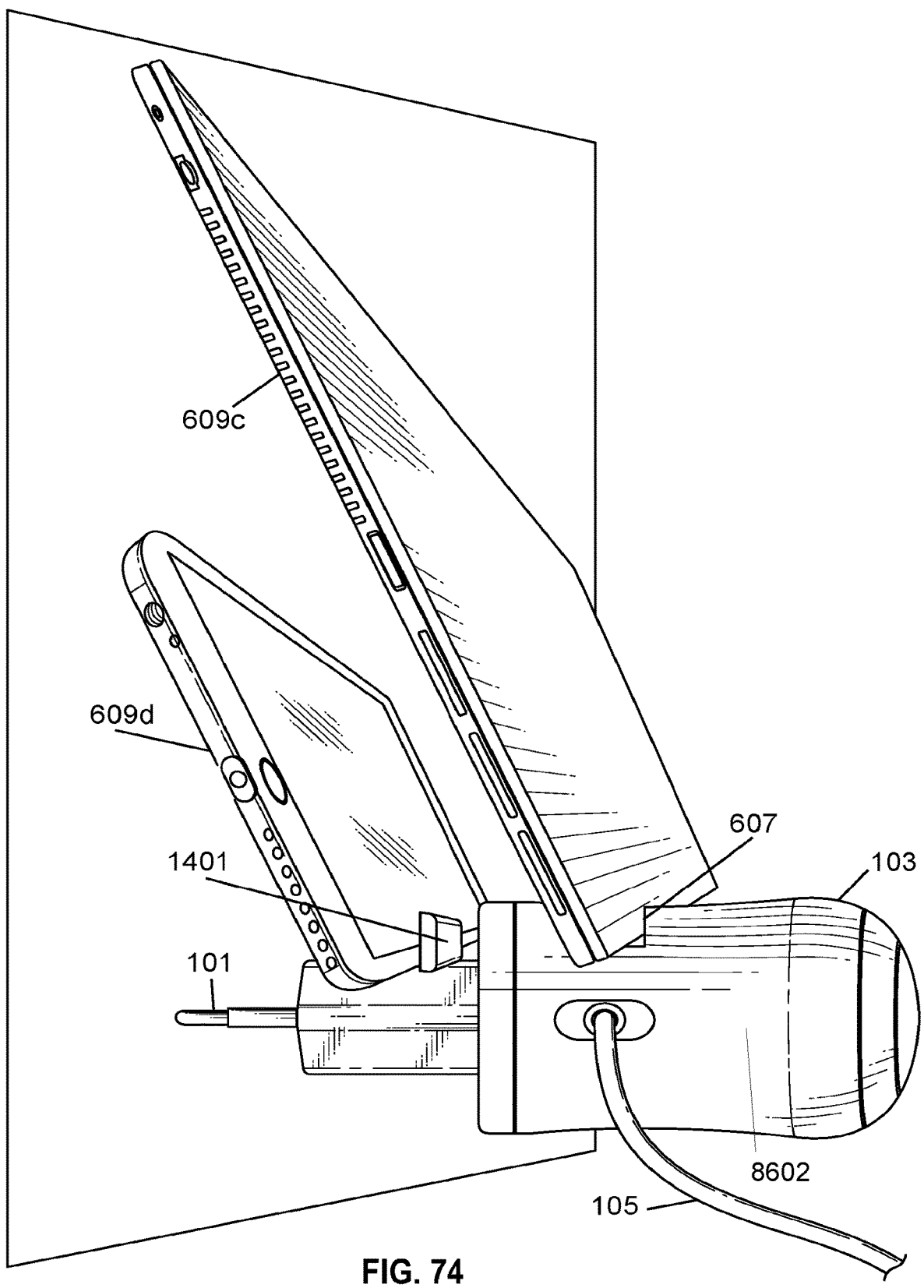
FIG. 74 depicts a side view embodiment with vertical stop and a vertical holding channel (tandem application).
Figure 75:
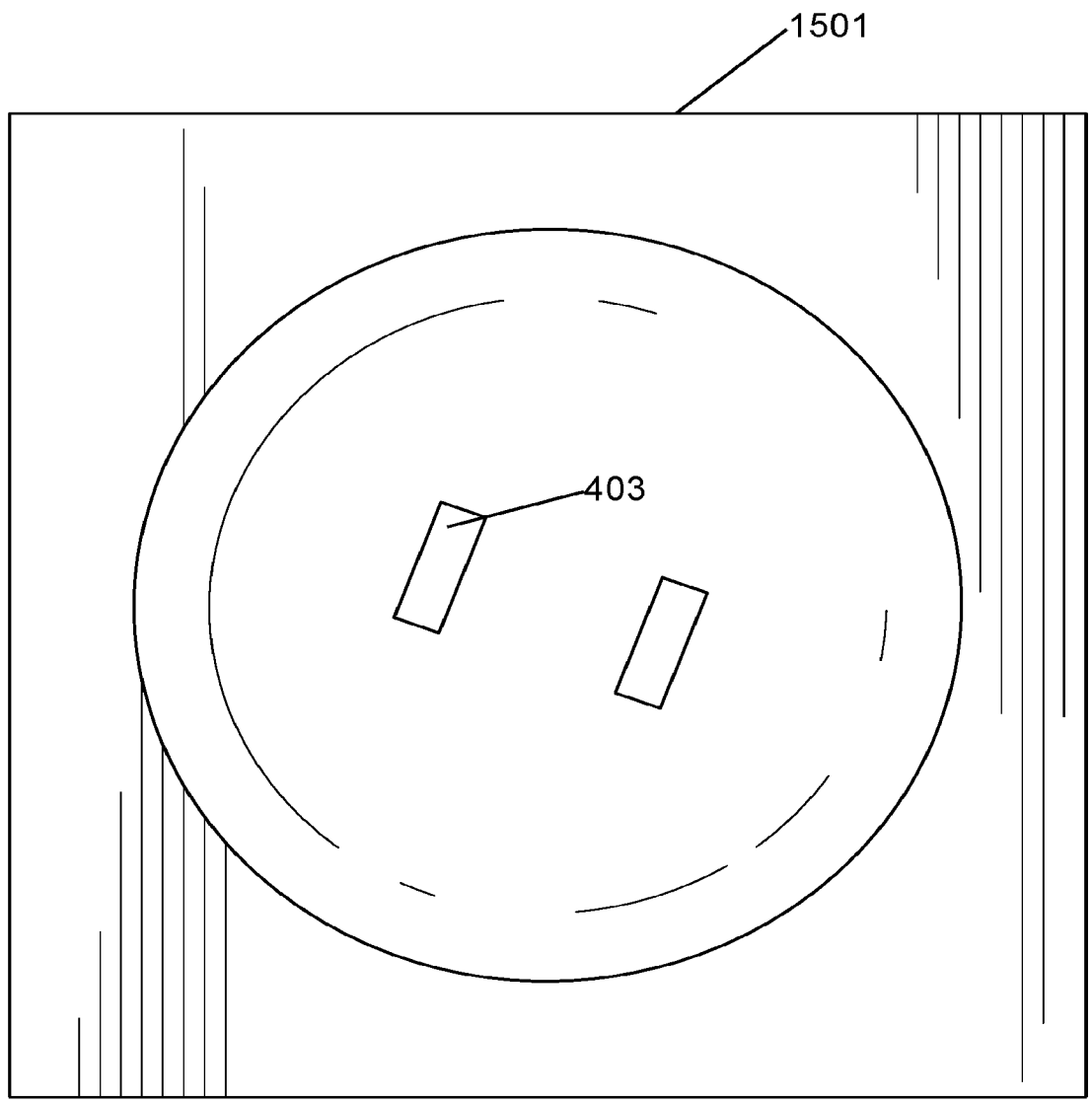
FIG. 75 depicts a non-horizontal electrical outlet.

FIG. 72 to 74 shows different examples of the present invention. FIG. 72 depicts 220 V electrical charging plug with embodiment vertical stop charging cell phone. FIG. 73 depicts side view embodiment vertical stops charging electrical devices. FIG. 74 depicts side view embodiment vertical stop and embodiment vertical device holding channel.

Figure 76:
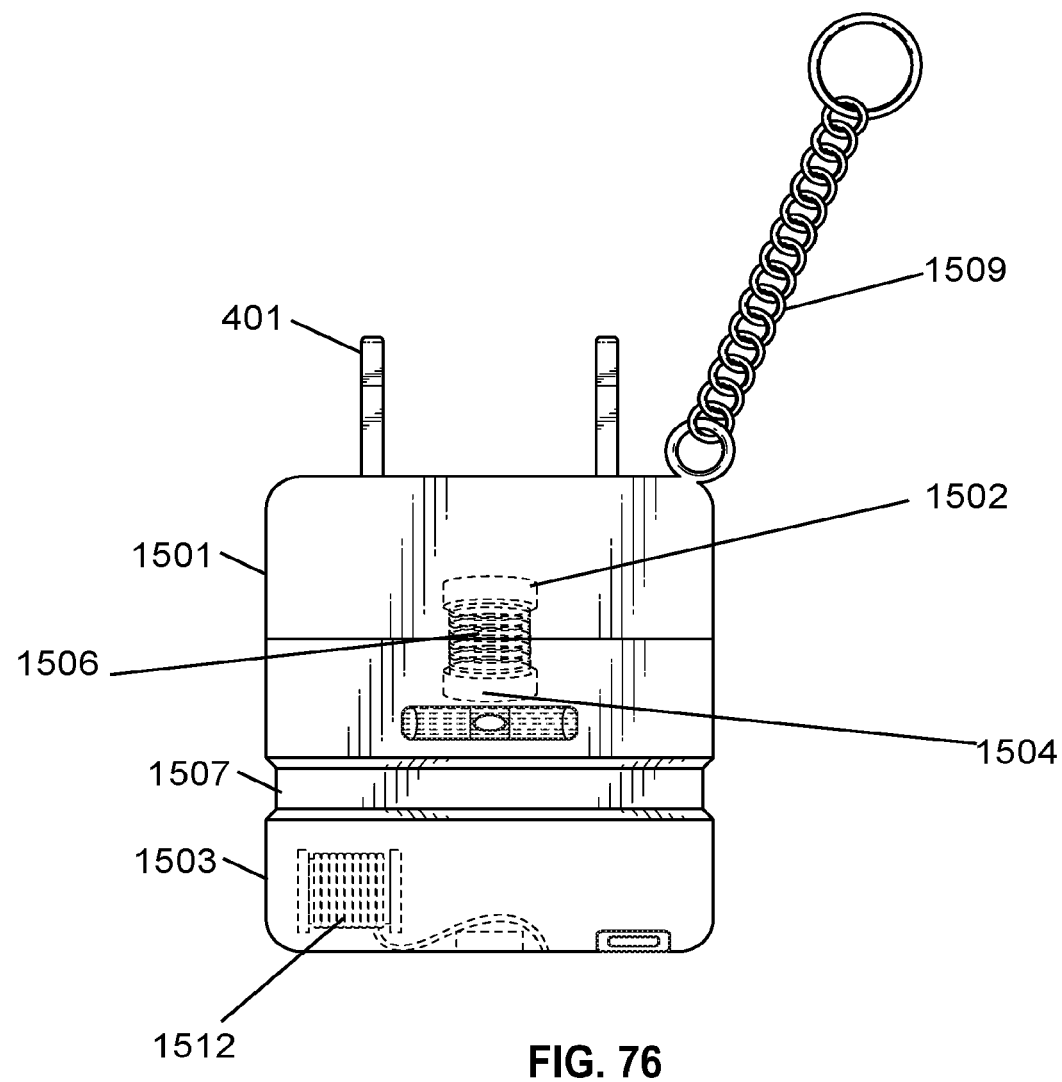
FIG. 76 depicts a top view of an adjustable device holder with horizontal level keychain charger.
Figure 76A:
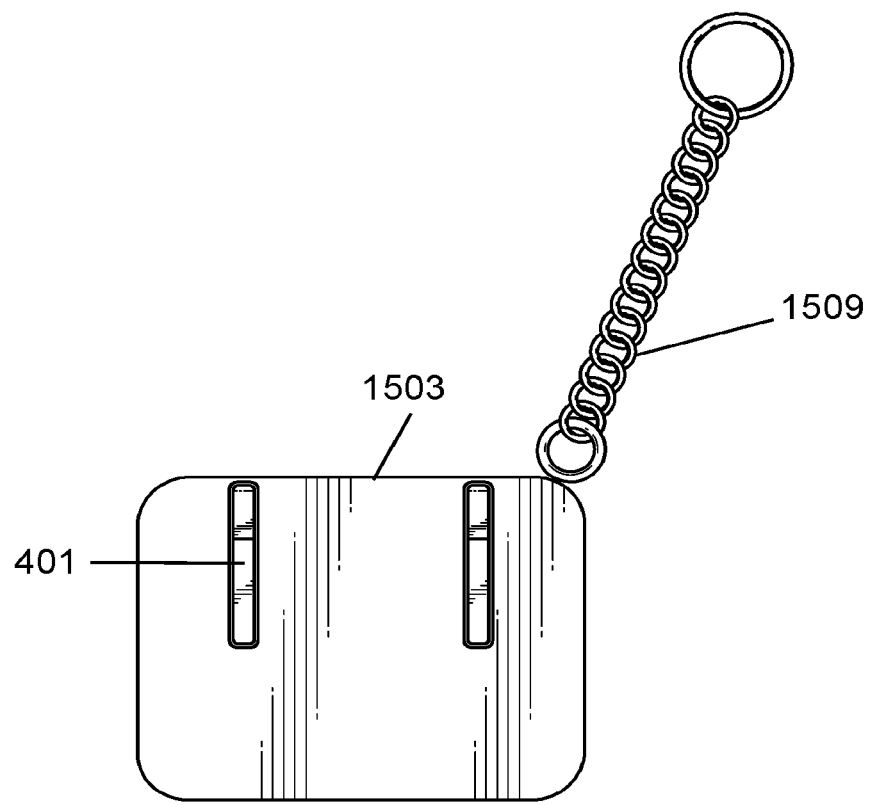
FIG. 76a shows a rear view of FIG. 76 with pins retracted (closed position).
Figure 76B:
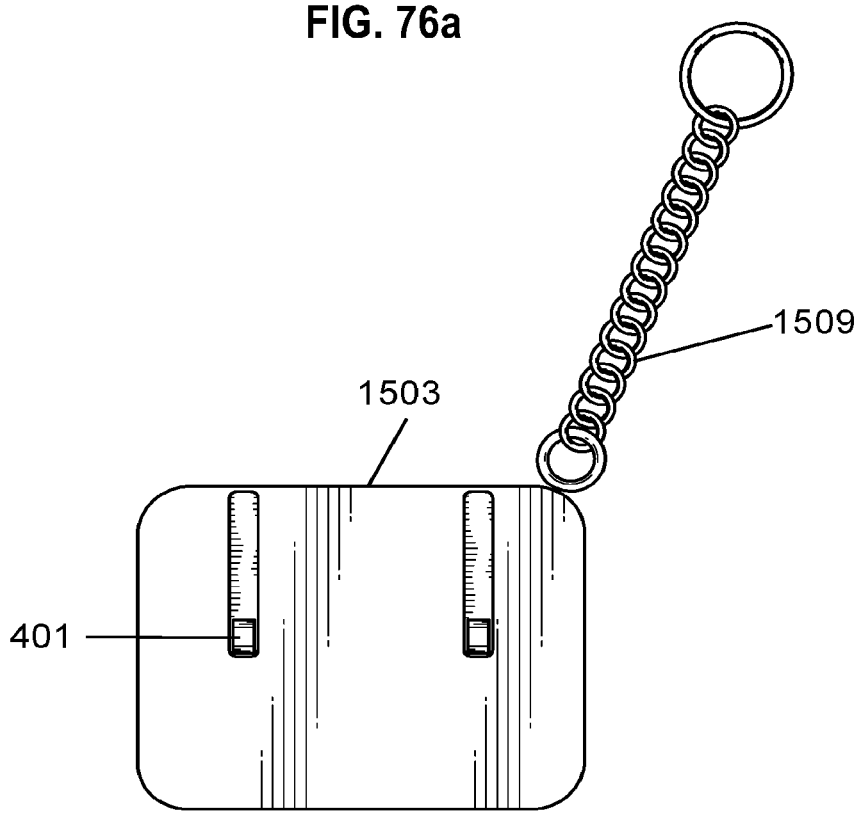
FIG. 76b shows a rear view with pins in extended position.
Figure 77:
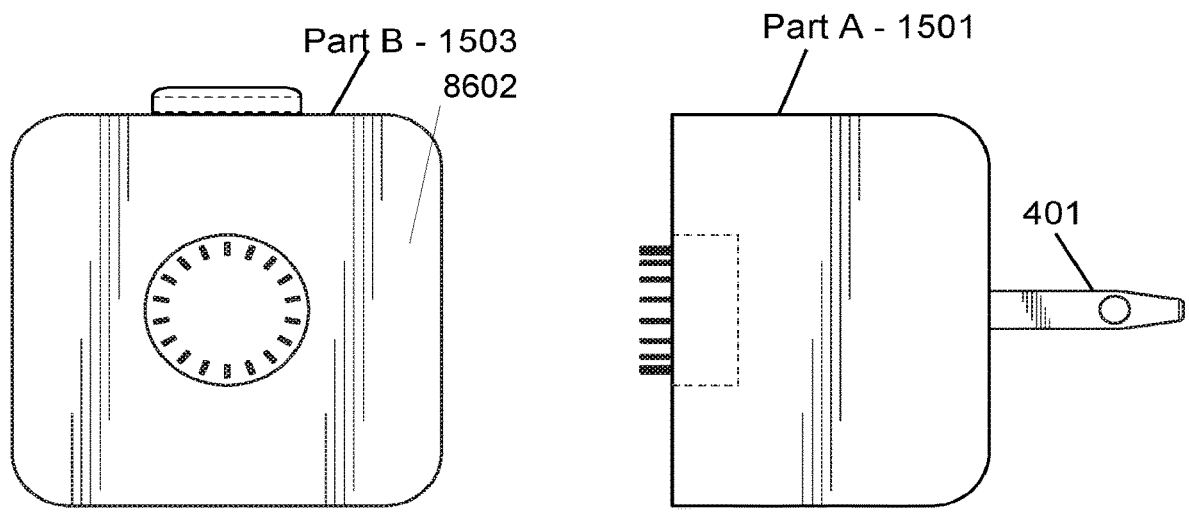
FIG. 77 depicts label parts A and B, where part A has level bubble.
Figure 78:
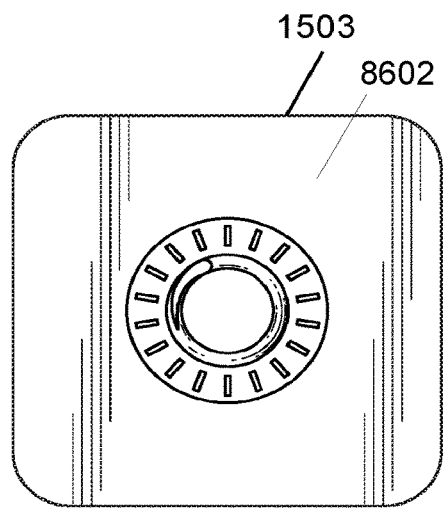
FIG. 78 depicts drawing label parts A and B, where part B has level bubble.
Figure 78:
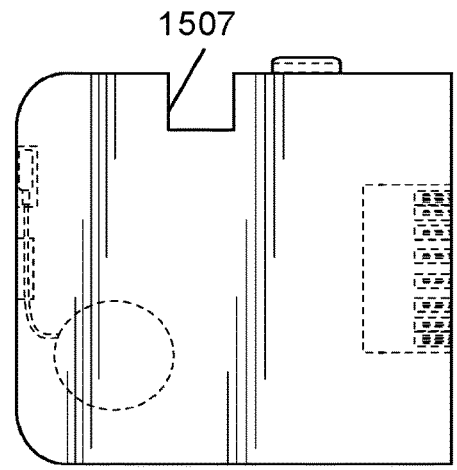
Figure 79:
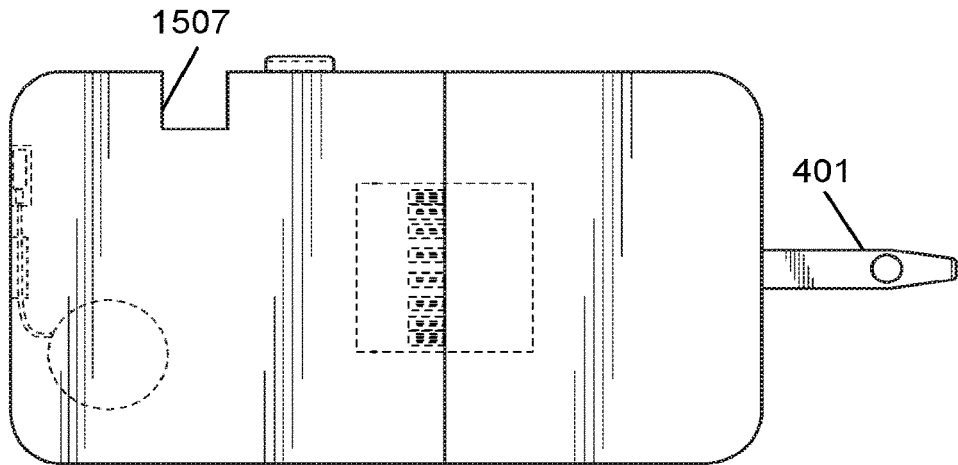
FIG. 79 depicts an elevated bubble level and also retractable pins.
Figure 80:
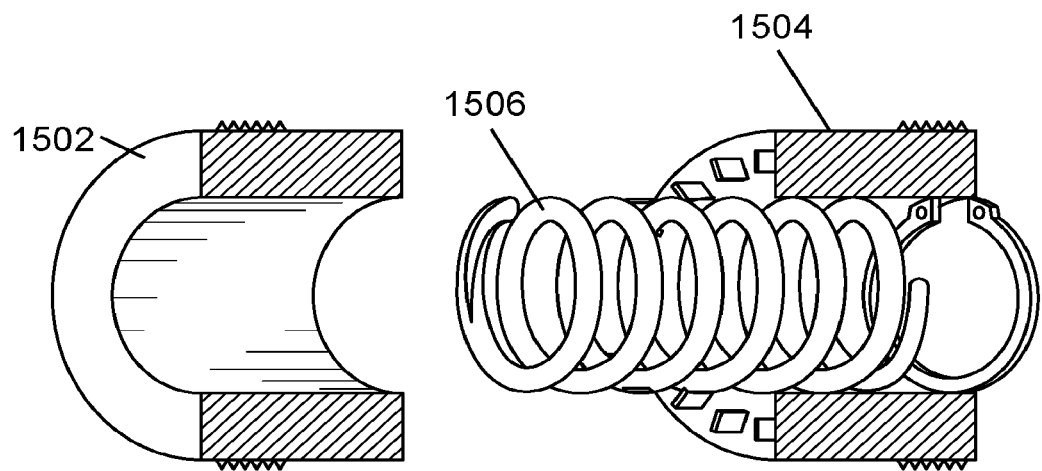
FIG. 80 depicts a spring assembly.
Figure 81:
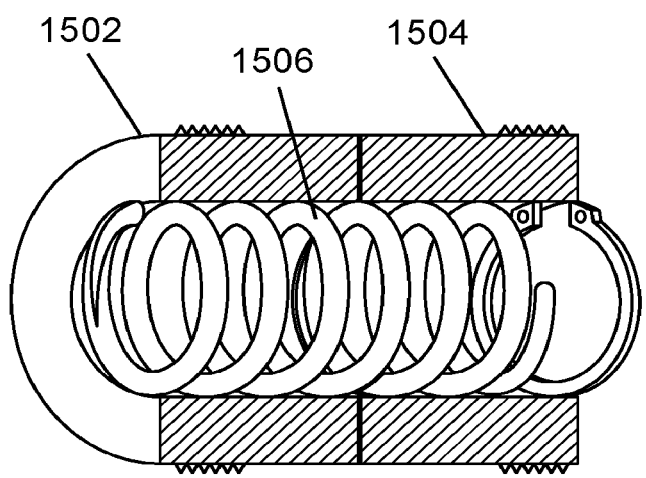
FIG. 81 depicts an assembled spring assembly for adjustable device holder.
Figure 82:
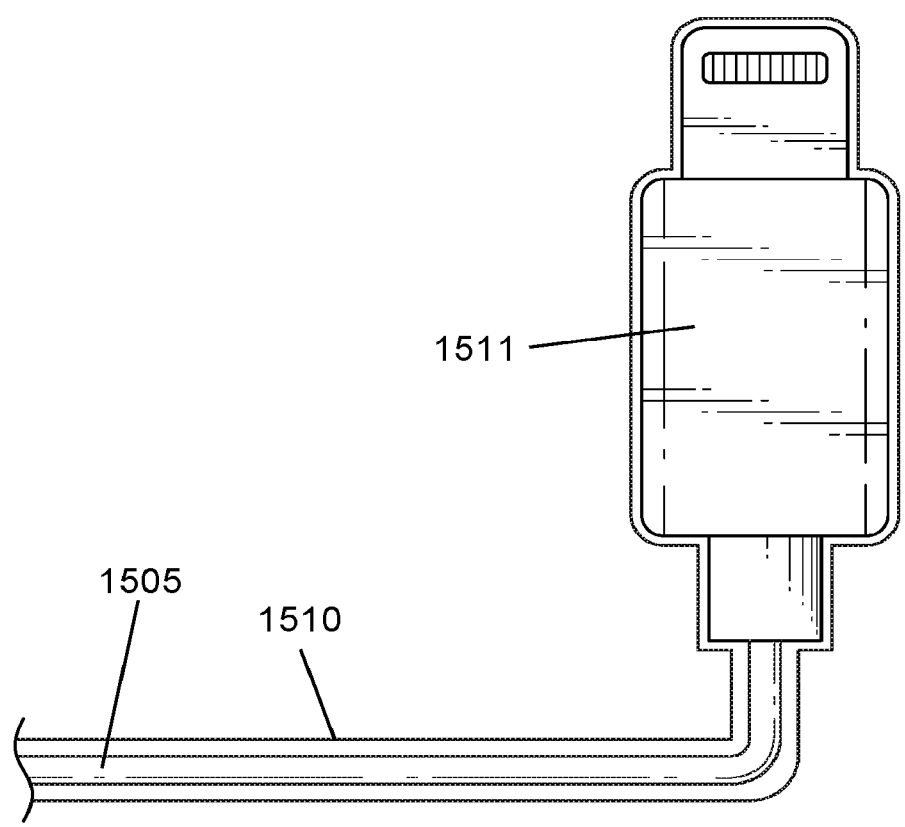
FIG. 82 depicts a cable plug for adjustable device holder.
Figure 83:
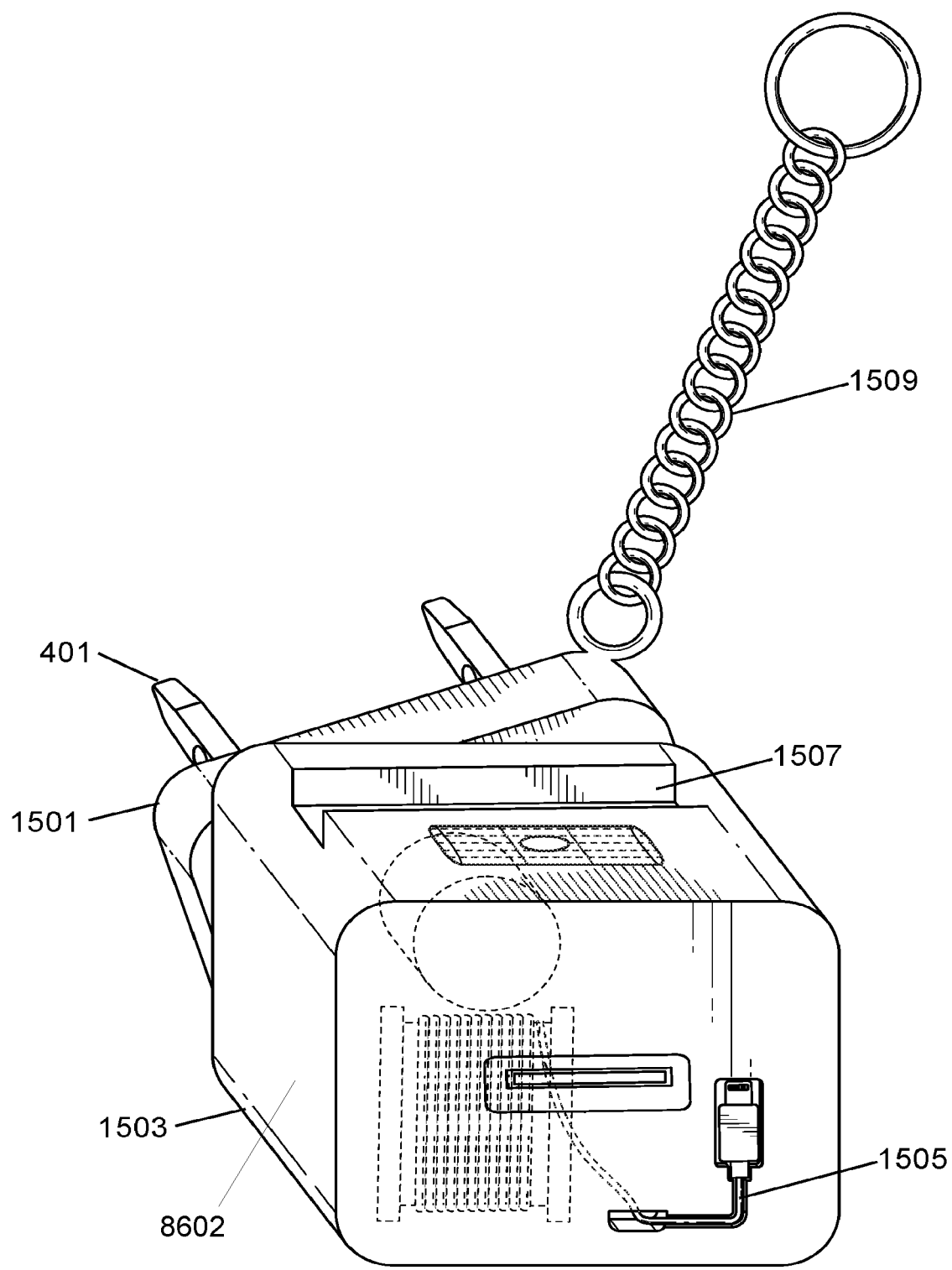
FIG. 83 depicts an adjustable device holder for non-horizontal electrical outlets.
Figure 84:
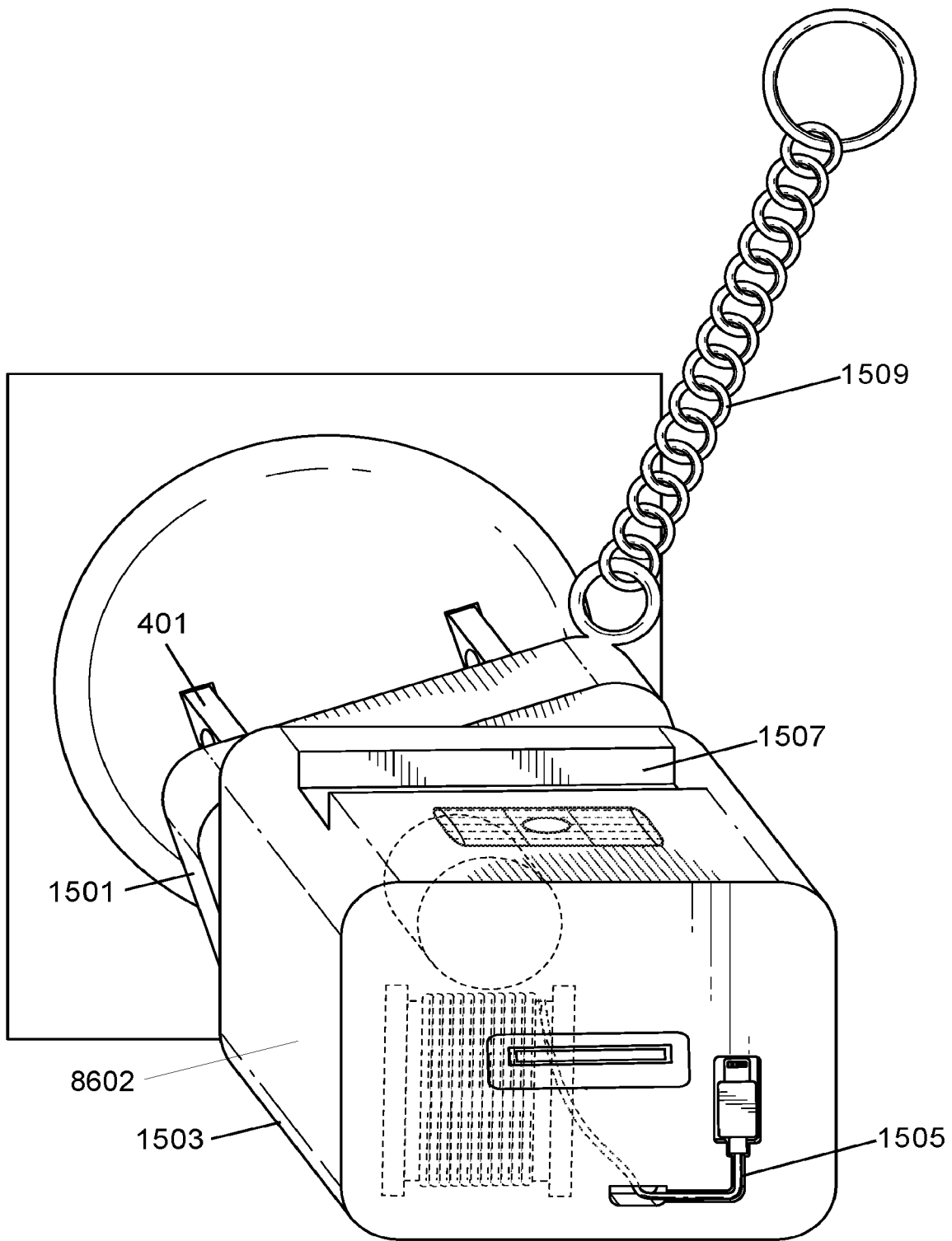
FIG. 84 depicts an embodiment adjustable keychain device holder in non-horizontal electrical outlet.

In an embodiment, FIGS. 76 to 84 depicts a portable electronic charging device keychain held electrical charger device to address non-horizontal electrical outlets. FIG. 76 depicts top view of the embodiment having adjustable keychain charger and also has retractable plug. FIG. 76a shows a flush bubble level. An electrical device charger with means of holding a plurality of electrical devices (not shown in the picture) which comprises: a main unit/housing with at least one holding slot 1507; a retractable cable cord 1512 for connecting main unit with said electrical devices; and pins 401 for fitting said main unit with an electric power source. The main unit/housing has two main parts, 1501 and 1503, these two parts can be connected/attached by threads or snap-on spring loaded mechanism. The electrical device charger (i.e. main unit) in the present embodiment is 110 V electrical plug. The holding slot 1507 in this embodiment is channel type and it is vertical. The holding slot 1507 is located at the top side of the main unit. The pins 401 in the present embodiment are of straight as used in 110 V outlets. The electrical devices can be held vertically in the holding slot 1507, in the present embodiment it is of channel type, in which an electrical device can held securely. FIG. 77 depicts label parts A (1501) and B (1503), where part A (1501) has elevated bubble level (not shown flush level bubble). FIG. 78 depicts defective drawing label parts A (1507) and B (1503), where part B (1503) has elevated level bubble. FIG. 79 depicts elevated bubble level (not shown flush level bubble) and also show retractable plug. FIG. 80 depicts a pressed fit snap ring 1506 with a concentric groove to fit into (not shown). Small magnetic parts 1502 and 1504 are located inside the parts 1501 and 1503. Further, the parts 1504 and 1502 have threads which secure these pieces into 1501 and 1503. FIG. 81 depicts Snap-on arrangement (inside snap ring). FIG. 82 depicts retractable cable plug for electrical device. FIG. 83 depicts rear view embodiment adjustable keychain (for non-horizontal outlets). FIG. 84 depicts embodiment adjustable keychain in non-horizontal electrical outlet.

CONCLUSION

It is to be understood that the above description is intended to be illustrative, and not restrictive. For example, the above-discussed embodiments may be used in combination with each other. Many other embodiments will be apparent to those of skill in the art upon reviewing the above description.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the embodiments.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention.

The product names used in this document are for identification purposes only. All trademarks and registered trademarks are the property of their respective owners.

What is claimed is:

1. An electrical device charger, comprising:
   at least one housing defined by an outer surface from which a plurality of prongs are configured to protrude perpendicularly from to couple to and receive power from an electrical power source, where the outer surface is defined by at least one stopper comprising a channel and/or a protrusion with parallel opposing side walls, no end walls, and extending across a top of the housing that is configured to hold securely at least one electrically powered device in position on the housing while the at least one housing is coupled to the power source;
   wherein along an entire length of the protrusion and/or the channel, the protrusion or channel is defined by an open-ended rectangle with a cross-sectional shape of right angles and/or a curve;
   a payment processing system comprising, an electrical circuit configured within the housing, comprising: at least one processor; a memory; a wireless transceiver; an electric power sensor for determining a quantity of power used to recharge the electrically powered device; a transaction mechanism able to process a wireless card payment online or via a card swipe reader for the power rate charge; and
      wherein the at least one processor comprises a rate charging processor able to calculate a power rate to charge the user based on the quantity of power used and an additional vendor fees.

2. The electrical device charger of claim 1, further comprising an electrical cord for connecting the housing to each electrically powered device; and a connector for electrically connecting each electrical cord to each electrically powered device.

3. The electrical device charger of claim 1, wherein the at least one stopper comprises a protrusion extending outward from a top of the at least one housing.

4. The electrical device charger of claim 1, wherein the at least one stopper comprises a channel extending into a top of the at least one housing, and wherein along an entire length of the channel, the channel is defined by a cross-sectional shape selected from the group consisting of a right angle, an angle other than a right angle, a curve, and a combination thereof.

5. The electrical device charger of claim 1, wherein the at least one housing is comprised of an electrically connected 220 V part and a 110 V part; and/or wherein the plurality of prongs are configured to couple to a 220 V or 110 V wall outlet.

6. The electrical device charger of claim 1, wherein the electrically powered device, comprises: a mobile phone; an i-Pad computer device; a music player device; a CD player; a tablet computer; or a laptop computer.

7. The electrical device charger of claim 1, wherein the payment processing system further comprises a non-transitory computer-readable medium storing a set of computer instructions for execution by the at least one processor, for: displaying on the charger and/or on the electrically powered device, how much time left for complete charging; and the amount of a payment due.

8. The electrical device charger of claim 7, wherein the payment processing system further comprises a non-transitory computer-readable medium storing a set of computer instructions for execution by the at least one processor, for: receiving user input for debit/credit card billing information; wirelessly transmitting the billing information to a remote payment processing computer; and wirelessly receiving confirmation of a payment.

9. The electrical device charge of claim 1, further comprising a debit/credit card swipe reader configured on the housing outer surface.

10. The electrical device charge of claim 1, further comprising a USB port or an audio port able to attach a third-party debit/credit card swipe reader device.

11. The electrical device charger of claim 1, further comprising a user adjustable mechanism coupled to the channel and configured to adjust the angle of the channel.

12. The electrical device charger of claim 1, wherein the power source comprises a vertical surface, and wherein when the electrical device charger is mounted against the vertical surface, the angle of the channel is adjustable relative to the vertical surface.

13. The electrical device charger of claim 1, the electrical power source is selected from a group consisting of: an alternating current (AC) source and a direct current (DC) source.

14. The electrical device charger of claim 1, wherein the at least one housing is comprised of a first part and a second part, wherein the second part comprises the at least one stopper, and wherein the second part is configured to rotate relative to the first part.

15. The electrical device charger of claim 14, further comprising a securing mechanism configured to maintain the rotation of the first part relative to the second part.

16. The electrical device charger of claim 15, wherein the at least one stopper comprises a channel.

17. The electrical device charger of claim 14, wherein the securing mechanism is configured to maintain the stopper in a horizontal orientation when the at least one housing is coupled to the power source.

18. The electrical device charger of claim 1, wherein the at least one housing is comprised of a first part and a second part that are connected by a press-fit mechanism.

19. The electrical device charger of claim 17, wherein the securing mechanism comprises a dial with and indicator.

20. The electrical device charger of claim 18, wherein the press-fit comprises a spring.

* * * * *